US011662796B2

(12) United States Patent
Pathak et al.

(10) Patent No.: US 11,662,796 B2
(45) Date of Patent: May 30, 2023

(54) USER INTERFACES FOR INDICATING BATTERY INFORMATION ON AN ELECTRONIC DEVICE

(71) Applicant: Apple Inc., Cupertino, CA (US)

(72) Inventors: Abhinav Pathak, Campbell, CA (US); Amit K. Vyas, San Jose, CA (US); Albert S. Liu, Sunnyvale, CA (US); Conor J. O'Reilly, San Jose, CA (US); Anand Ramadurai, Los Gatos, CA (US); Craig M. Federighi, Los Altos Hills, CA (US); Aakriti Mittal, Sunnyvale, CA (US); Daniel J. Etter, Mountain View, CA (US); Tianhe Wu, Sunnyvale, CA (US); Patrick L. Coffman, San Francisco, CA (US); Nicholas D. Felton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1124 days.

(21) Appl. No.: 16/178,307

(22) Filed: Nov. 1, 2018

(65) Prior Publication Data
US 2019/0369699 A1 Dec. 5, 2019

Related U.S. Application Data

(60) Provisional application No. 62/679,567, filed on Jun. 1, 2018.

(51) Int. Cl.
*G06F 1/3212* (2019.01)
*G06F 1/3234* (2019.01)
(Continued)

(52) U.S. Cl.
CPC .......... *G06F 1/3212* (2013.01); *G06F 1/3265* (2013.01); *G06F 3/0482* (2013.01);
(Continued)

(58) Field of Classification Search
CPC .... G06F 1/3212; G06F 1/3265; G06F 3/4817; G06F 3/0482; G06F 11/30; G06F 11/302;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Shourjo Dasgupta
(74) *Attorney, Agent, or Firm* — Kubota & Basol LLP

(57) ABSTRACT

In some embodiments, an electronic device displays one or more representations of power usage of the electronic device, including across various periods of time and subperiods of time within those periods. In some embodiments, the displayed information reflects power usage both for periods of the display being on and periods of the display being off. In some embodiments, the displayed information includes power usage attributed to various mobile applications running on the electronic device. In some embodiments, the electronic device displays recommendations to reduce the usage of power by the electronic device, which a user has the option of applying. In some embodiments, the electronic device displays prose insight into power usage, indicating causes of the power usage.

72 Claims, 60 Drawing Sheets

(51) Int. Cl.
*G06F 11/30* (2006.01)
*G06F 11/34* (2006.01)
*G06F 3/04817* (2022.01)
*G06F 3/0482* (2013.01)

(52) U.S. Cl.
CPC .......... *G06F 3/04817* (2013.01); *G06F 11/30* (2013.01); *G06F 11/302* (2013.01); *G06F 11/3072* (2013.01); *G06F 11/34* (2013.01); *G06F 11/3409* (2013.01); *G06F 11/3013* (2013.01)

(58) Field of Classification Search
CPC .. G06F 11/3072; G06F 11/34; G06F 11/3409; G06F 11/3013
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,643,951 B2* | 1/2010 | Stewart | G06K 19/0712 702/63 |
| 7,663,607 B2 | 2/2010 | Hotelling et al. | |
| 8,172,147 B2* | 5/2012 | Smith | G01D 5/39 235/487 |
| 8,479,122 B2 | 7/2013 | Hotelling et al. | |
| 8,768,419 B2* | 7/2014 | Sivaraman | H04W 52/0261 455/573 |
| 9,009,502 B2* | 4/2015 | Udeshi | G06F 9/5094 713/300 |
| 9,026,819 B2* | 5/2015 | Nguyen Tien | G06F 9/5061 713/320 |
| 9,229,522 B1* | 1/2016 | Tian | G06F 11/3062 |
| 9,247,502 B2* | 1/2016 | Xie | H04W 52/0261 |
| 9,354,686 B2* | 5/2016 | Kim | G06F 1/3265 |
| 9,772,672 B2* | 9/2017 | Li | G06F 1/30 |
| 9,942,855 B2* | 4/2018 | Kim | H04W 52/0261 |
| 10,120,428 B2* | 11/2018 | Kim | G06F 3/04817 |
| 10,180,857 B2* | 1/2019 | Choi | G06F 9/4893 |
| 2002/0178387 A1* | 11/2002 | Theron | G06F 1/32 713/300 |
| 2006/0197753 A1 | 9/2006 | Hotelling | |
| 2009/0040033 A1* | 2/2009 | Uchida | H01M 10/4285 340/439 |
| 2009/0164152 A1* | 6/2009 | Creus | G06F 1/3203 702/63 |
| 2010/0048139 A1* | 2/2010 | Seo | H04W 52/0277 455/67.11 |
| 2012/0015695 A1* | 1/2012 | Hackborn | G06F 11/3409 455/566 |
| 2013/0088411 A1* | 4/2013 | Reeves | E05D 3/12 345/1.3 |
| 2013/0138989 A1* | 5/2013 | Jang | G06F 1/28 713/340 |
| 2014/0025322 A1* | 1/2014 | Yang | G06F 1/3234 702/63 |
| 2014/0068314 A1* | 3/2014 | Kim | G06F 1/3212 713/340 |
| 2014/0173319 A1* | 6/2014 | Zeng | G06F 11/3409 713/340 |
| 2015/0233985 A1* | 8/2015 | Chen | G01R 21/133 702/60 |
| 2015/0241519 A1* | 8/2015 | Lee | G01R 31/367 702/63 |
| 2015/0338469 A1* | 11/2015 | Lee | G01R 31/382 324/427 |
| 2016/0048682 A1* | 2/2016 | Gou | G06F 1/329 726/22 |
| 2016/0132225 A1* | 5/2016 | Lee | G06F 40/106 715/731 |
| 2016/0146866 A1* | 5/2016 | Houlette | G01R 21/133 702/62 |
| 2017/0269167 A1* | 9/2017 | Willey | G01R 31/3648 |
| 2018/0267701 A1* | 9/2018 | Rigg | G06F 3/0482 |
| 2018/0351373 A1* | 12/2018 | Behzadi | H02J 7/0047 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

USER INTERFACES FOR INDICATING BATTERY INFORMATION ON AN ELECTRONIC DEVICE

CROSS-REFERENCE TO RELATED APPLICATIONS

This application claims the benefit under 35 USC 119(e) of U.S. Provisional Patent Application No. 62/679,567, filed Jun. 1, 2018 the contents of which are incorporated herein by reference in their entirety for all purposes.

FIELD OF THE DISCLOSURE

This relates generally to electronic devices that allow for displaying battery information associated with time periods and applications, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users wish to understand how their usage of such devices consumes the batteries of those devices. Thus, it can be desirable to efficiently and effectively provide such information to users.

SUMMARY OF THE DISCLOSURE

Some embodiments described in this disclosure are directed to one or more electronic devices that display battery status and screen time usage for time periods and applications on the devices, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
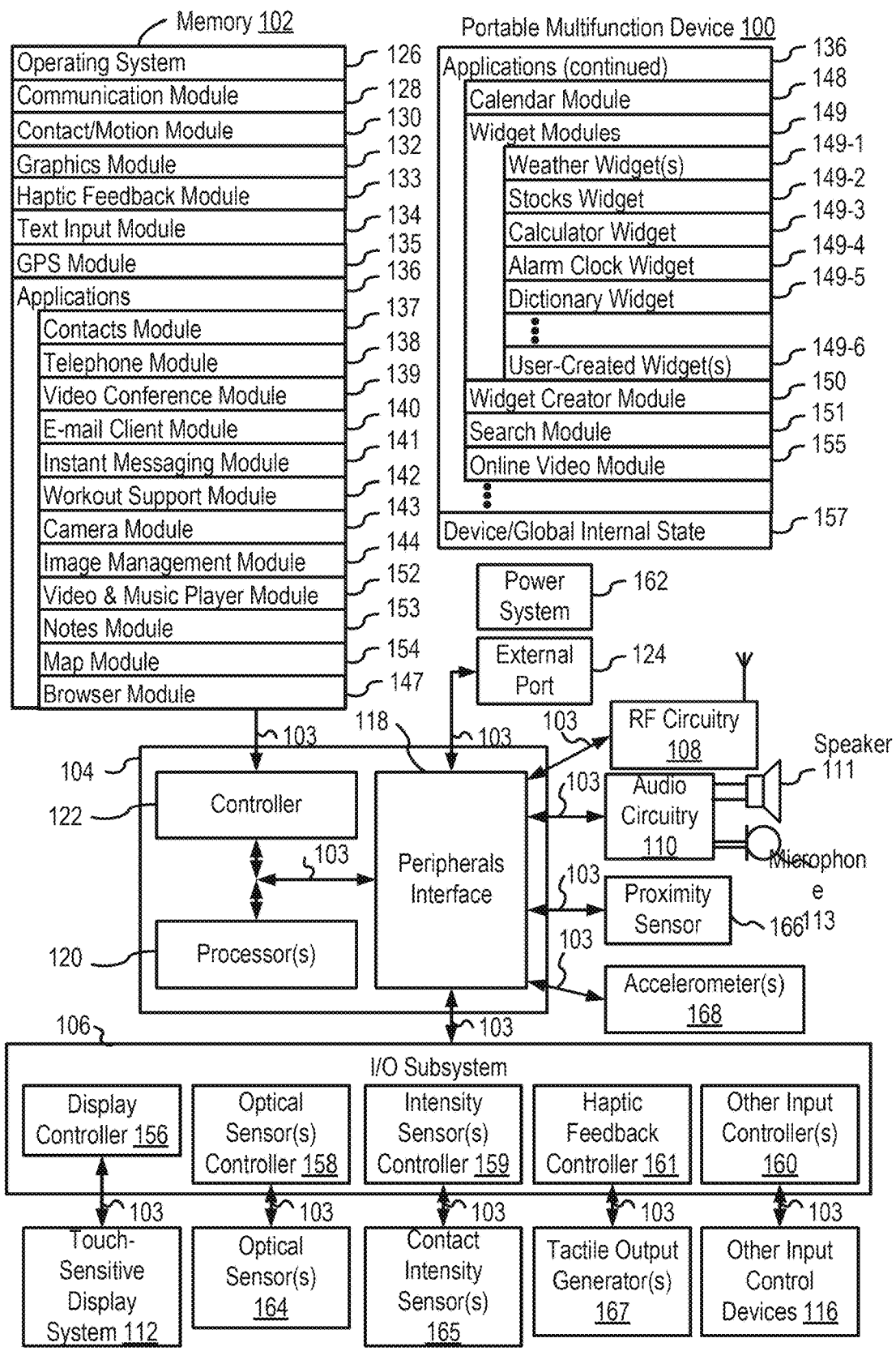
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying battery usage-related information. Such techniques can reduce the cognitive burden on a user who uses the devices, thereby enhancing productivity. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
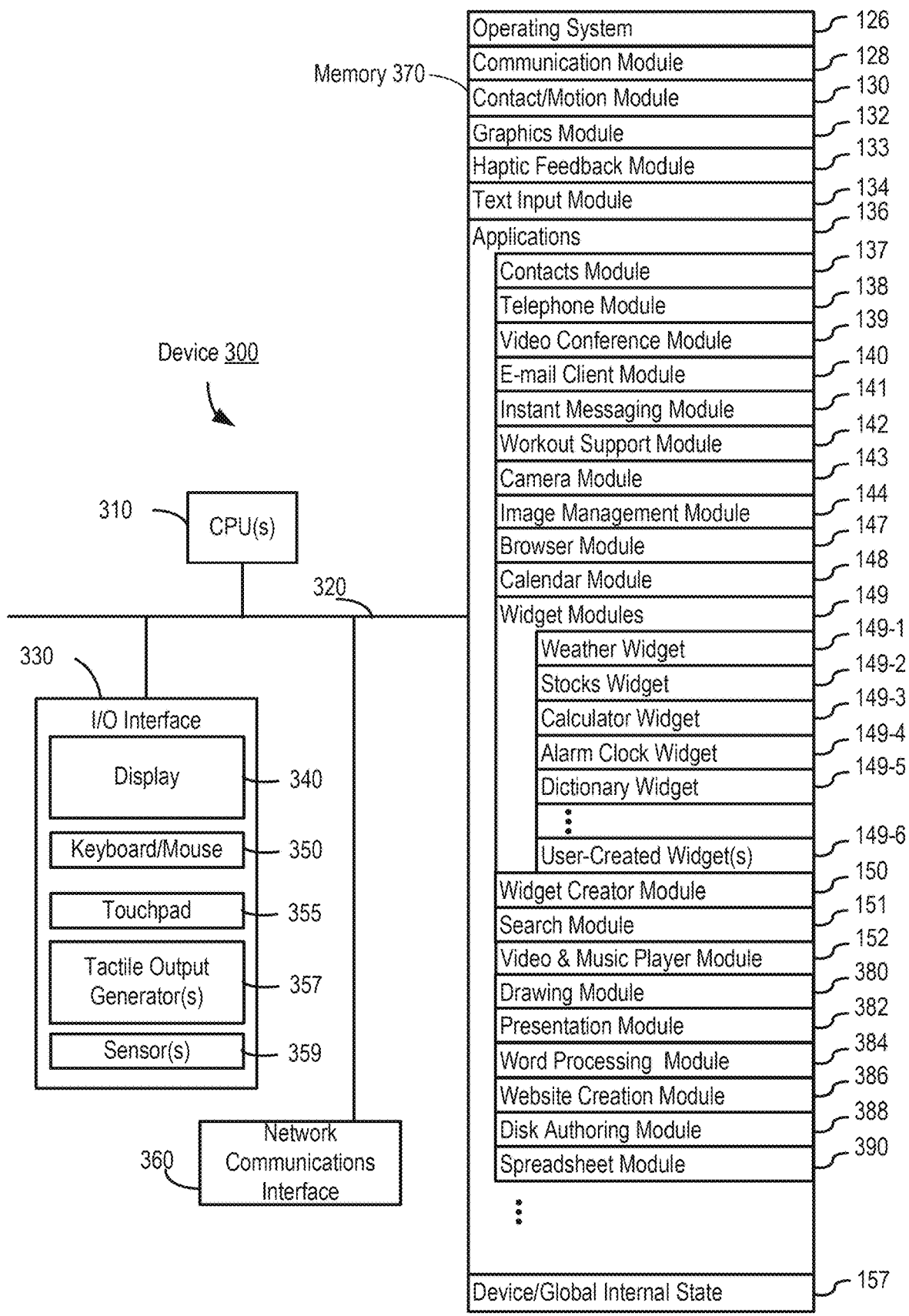
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
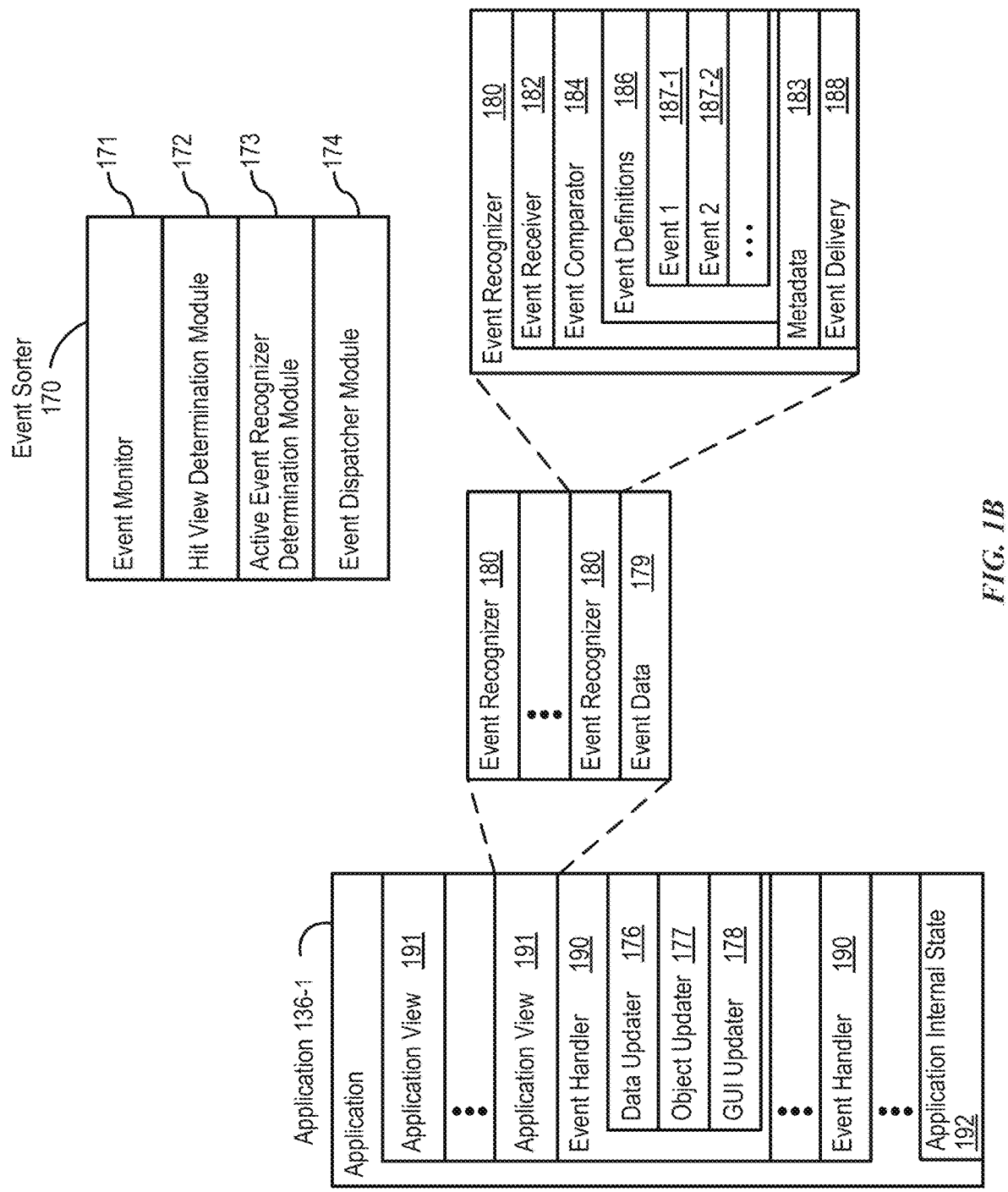
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
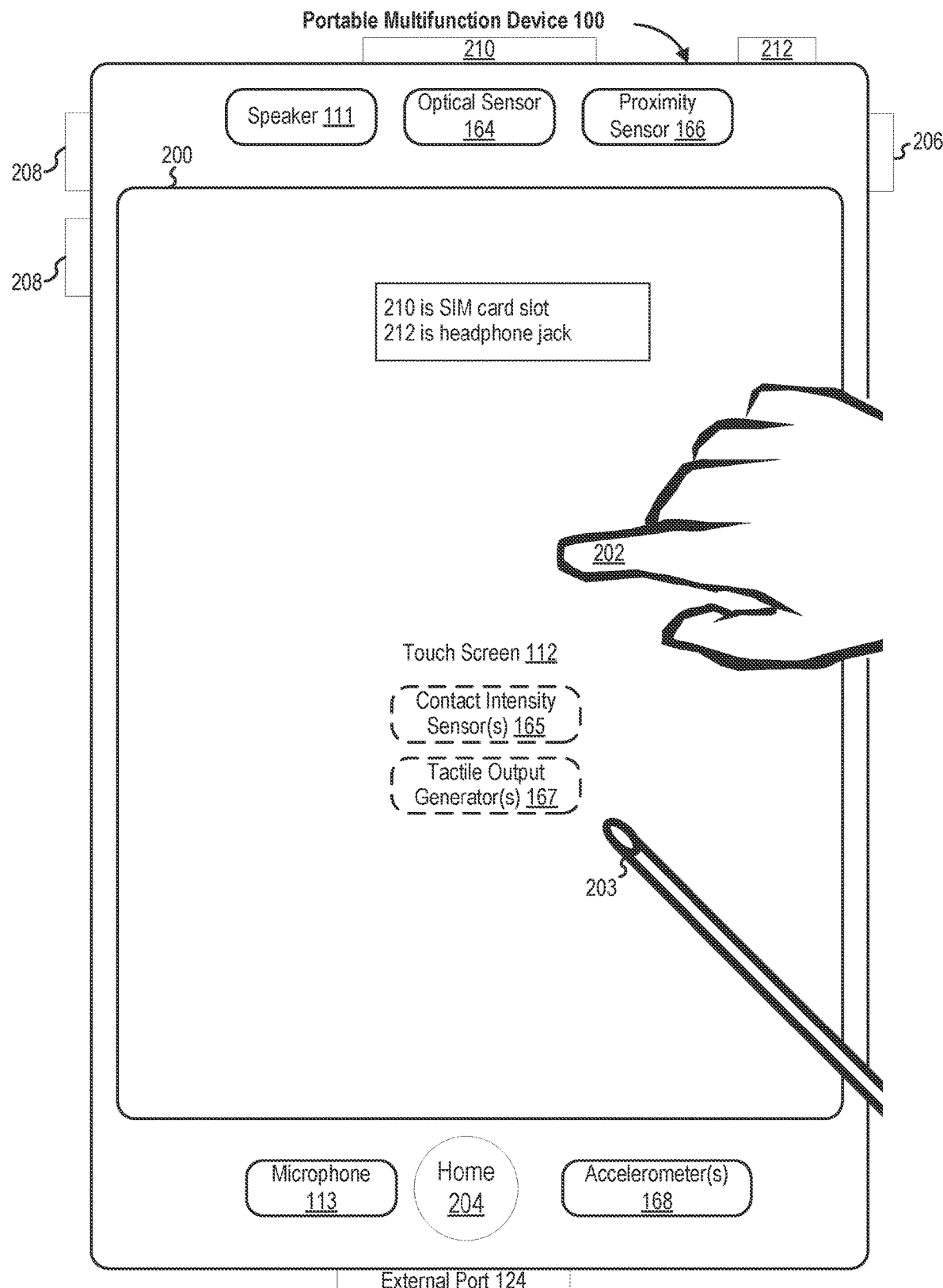
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
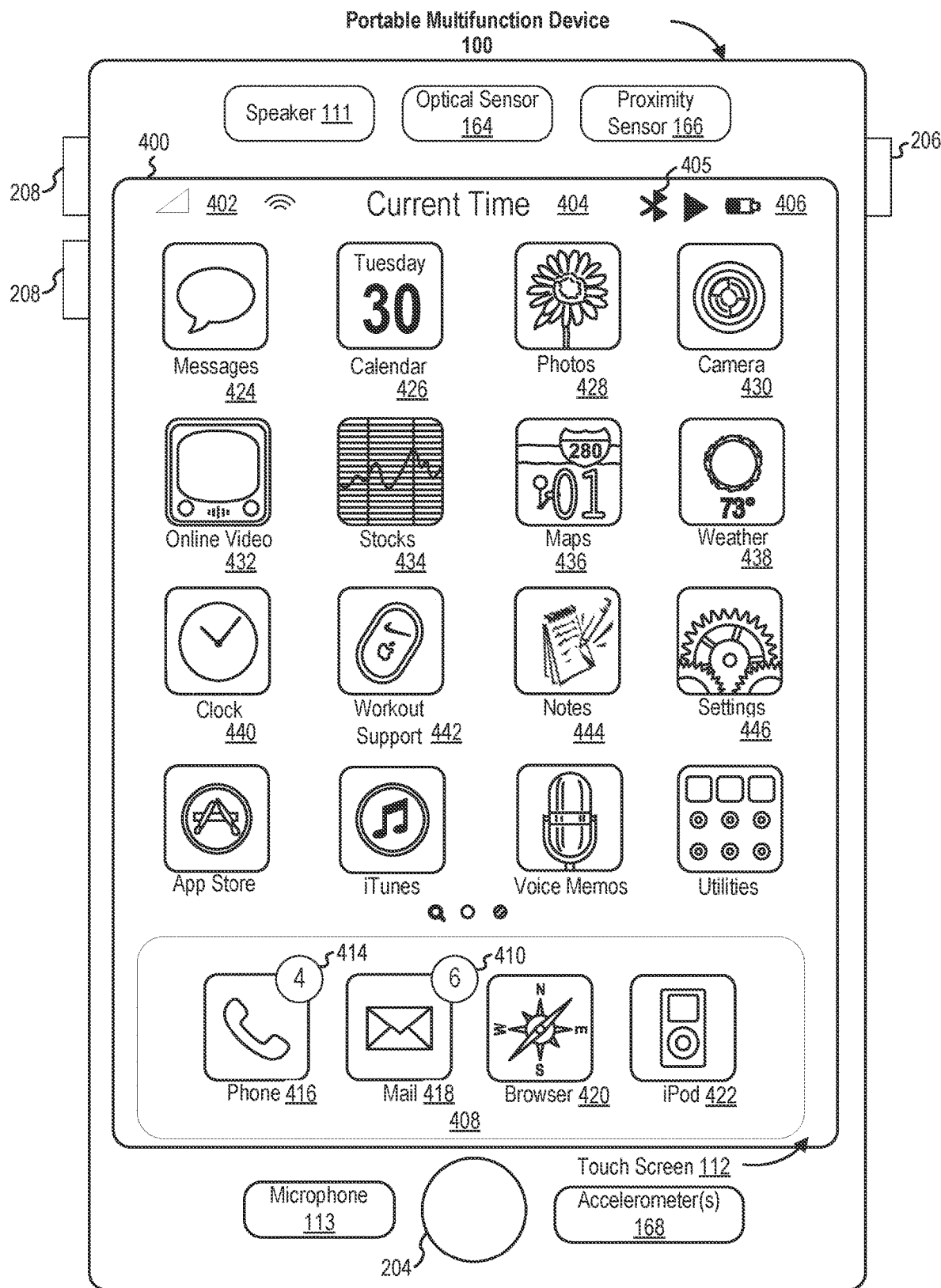
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
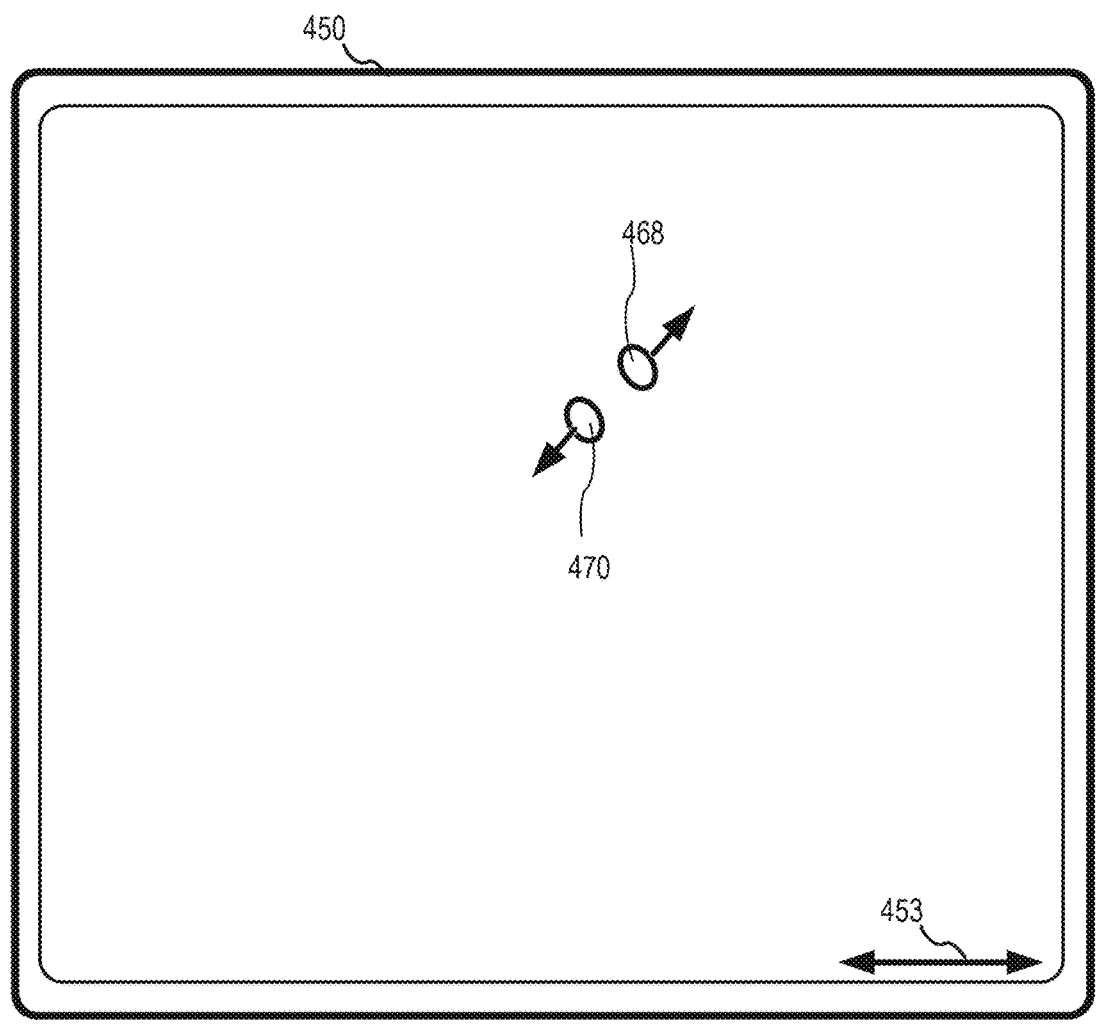
FIG. 4B illustrates an exemplary user interface for a multifunction device with a touch-sensitive surface that is separate from the display in accordance with some embodiments.
Figure 4B:
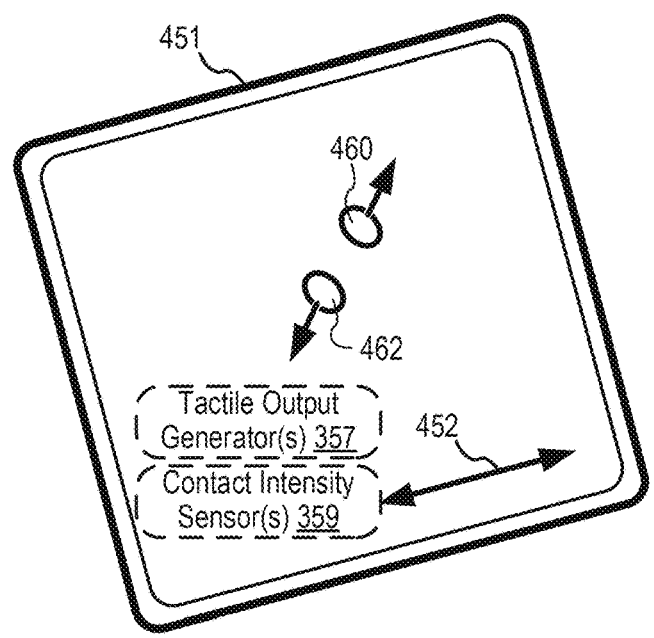

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
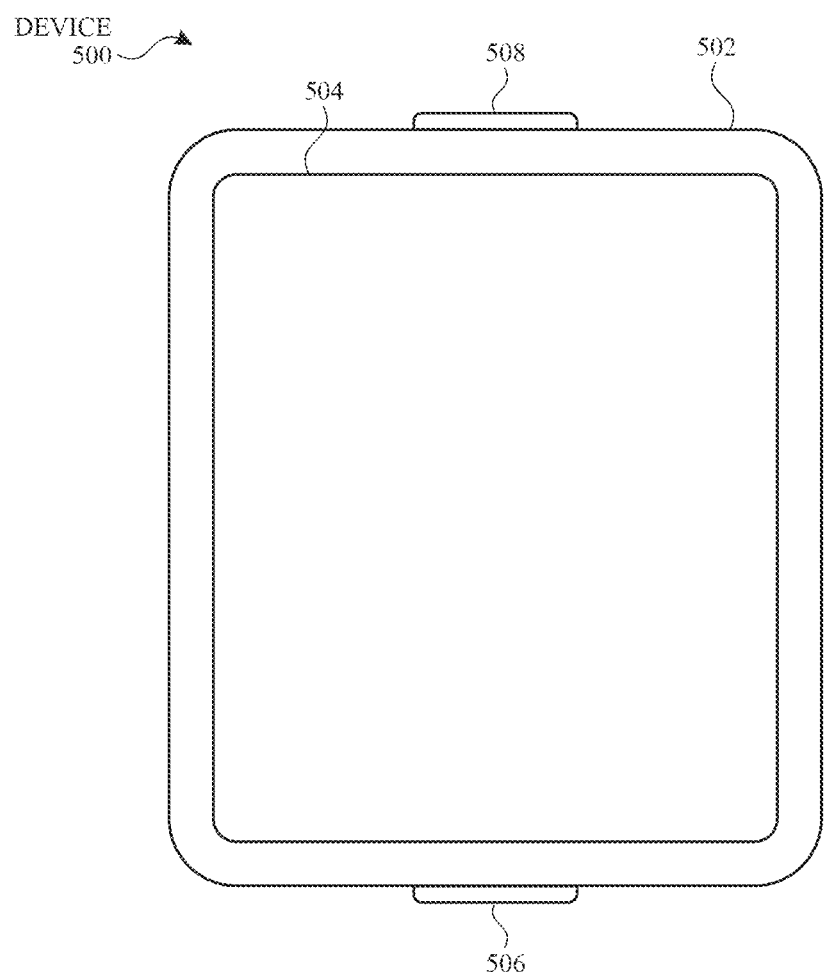
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
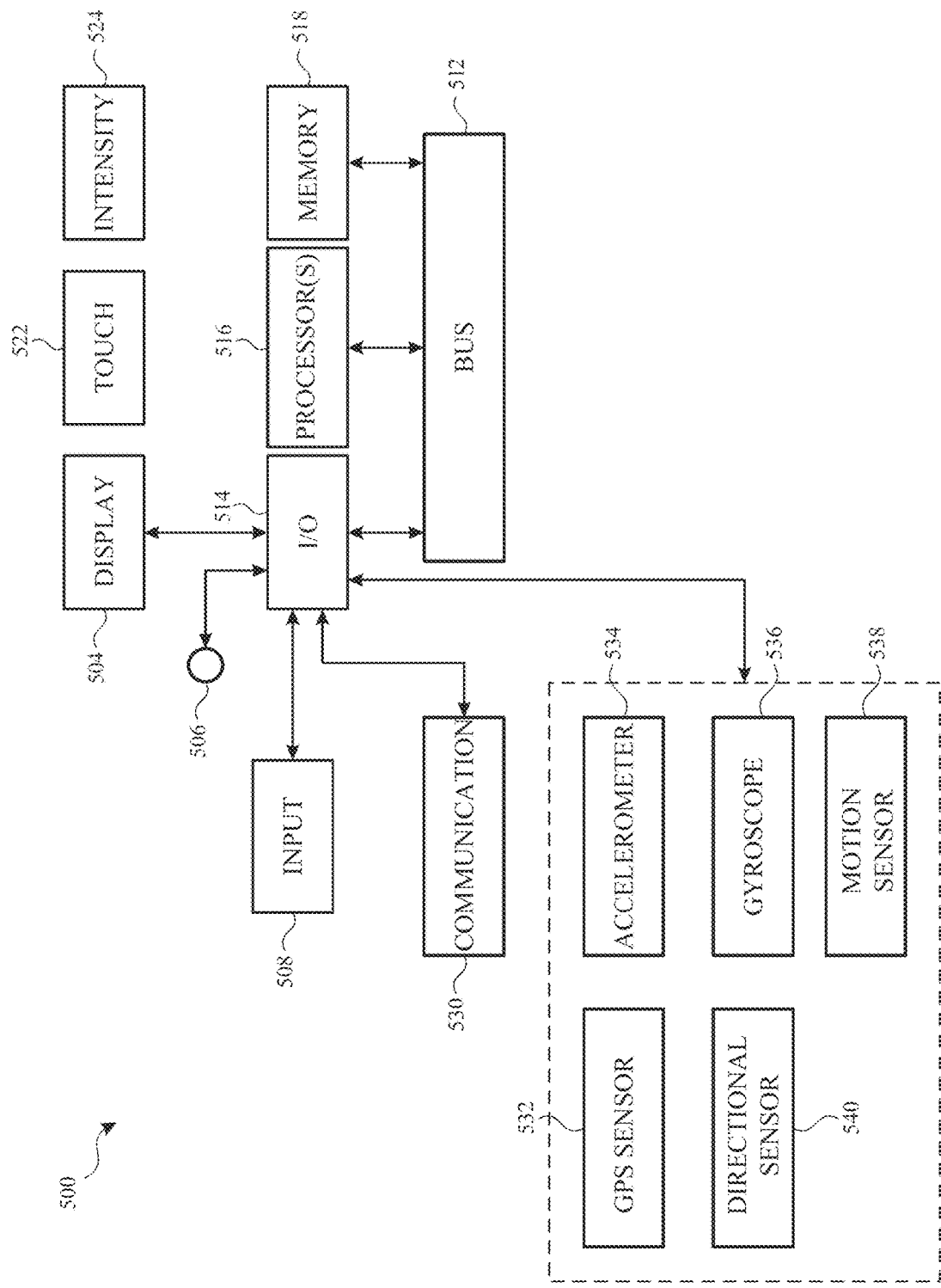
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
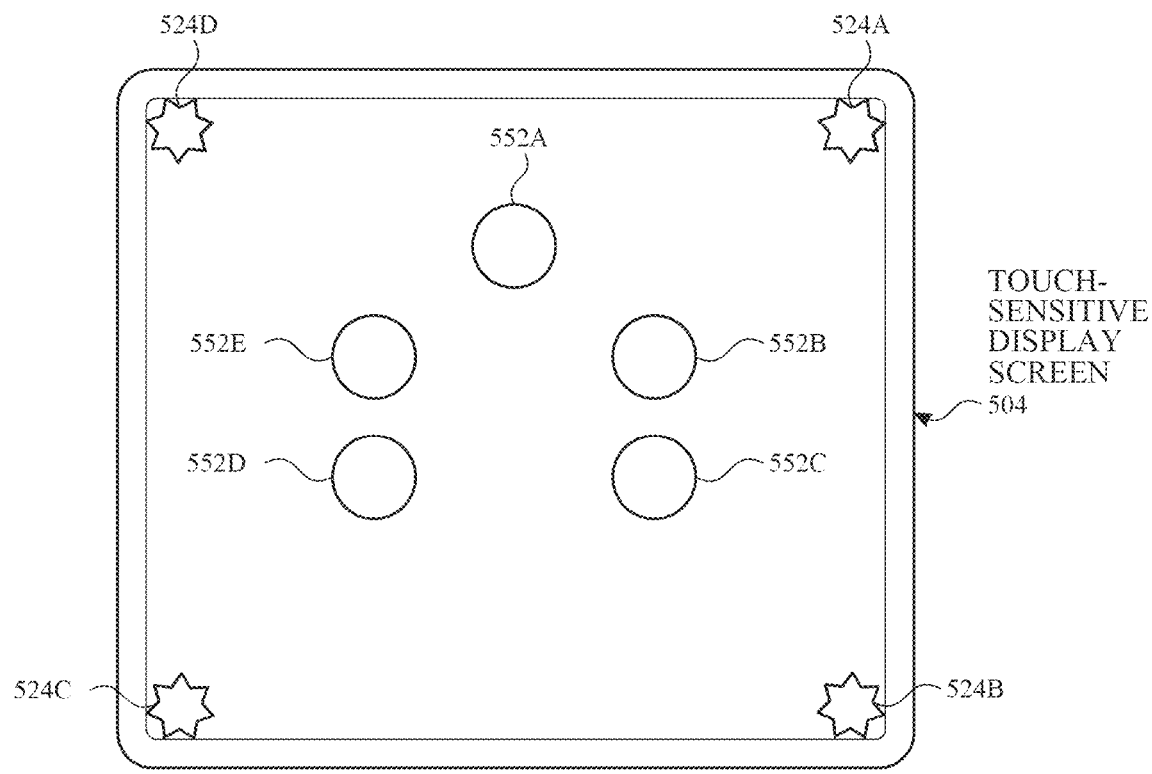
FIGS. 5C-5D illustrate exemplary components of a personal electronic device having a touch-sensitive display and intensity sensors in accordance with some embodiments.
Figure 5C:
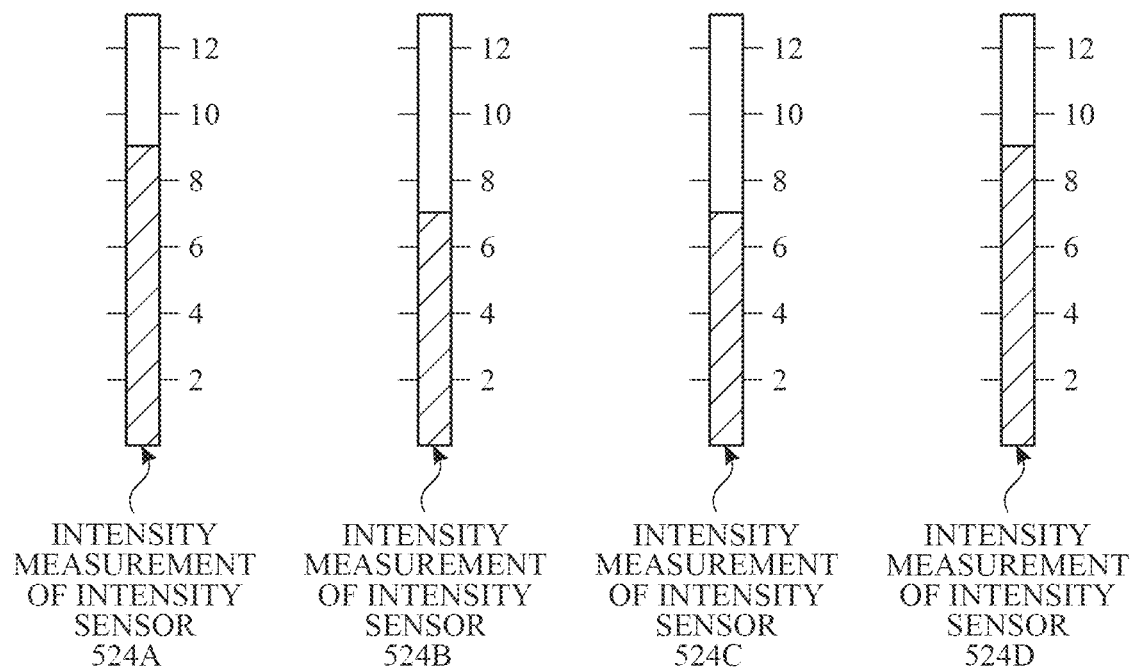
Figure 5D:
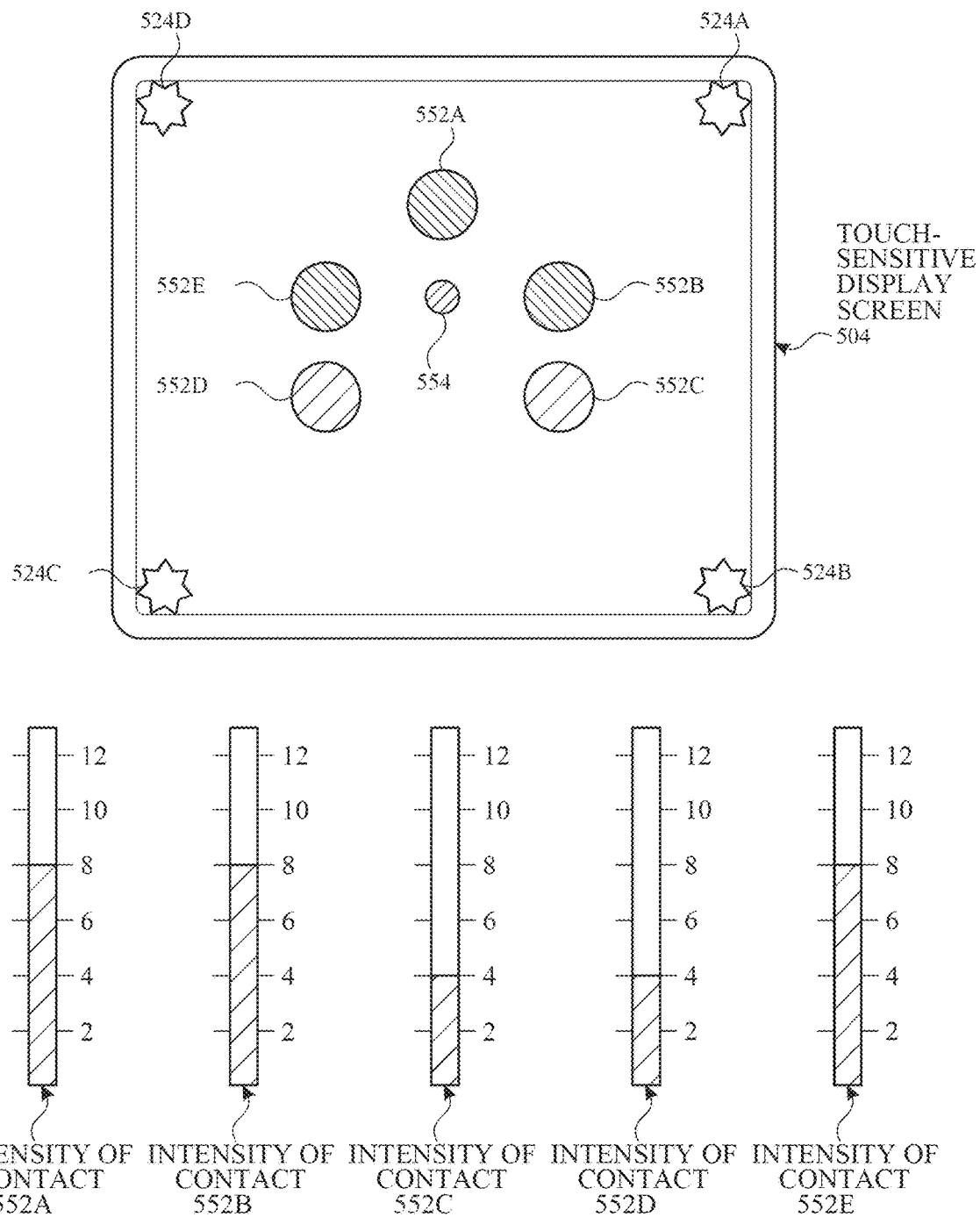

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and/Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
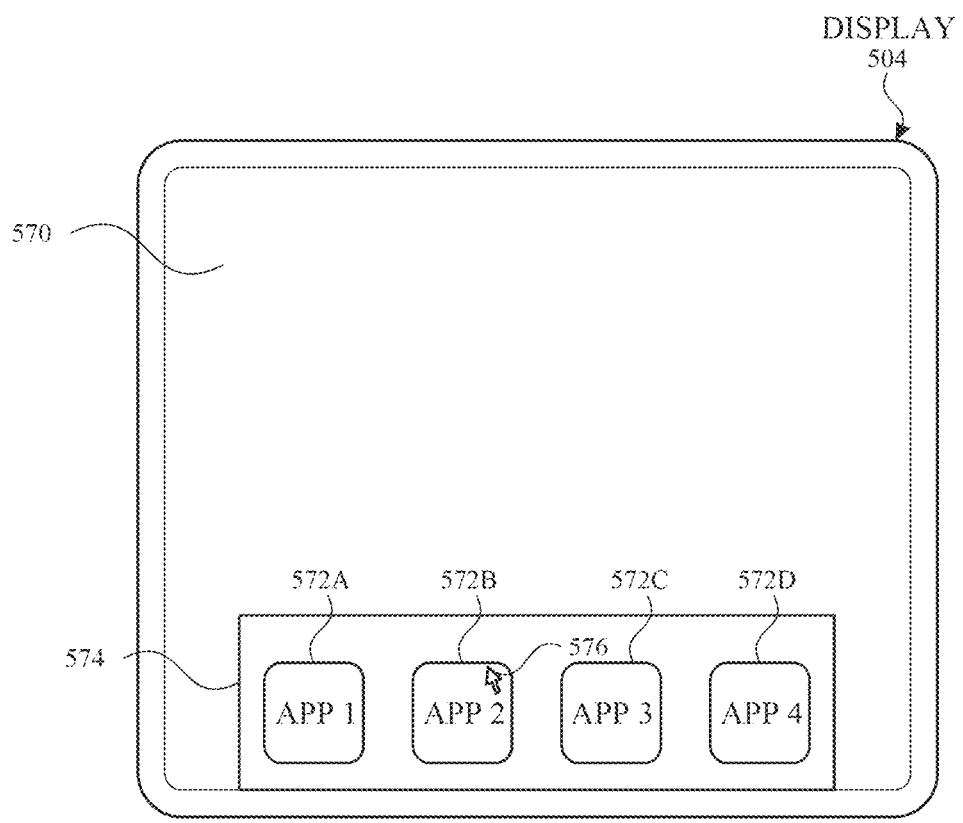
FIGS. 5E-5H illustrate exemplary components and user interfaces of a personal electronic device in accordance with some embodiments.
Figure 5E:
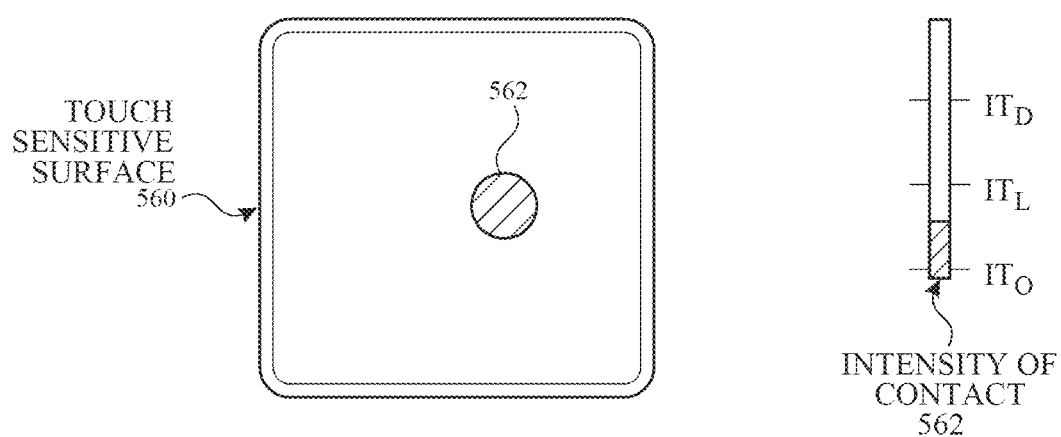
Figure 5F:
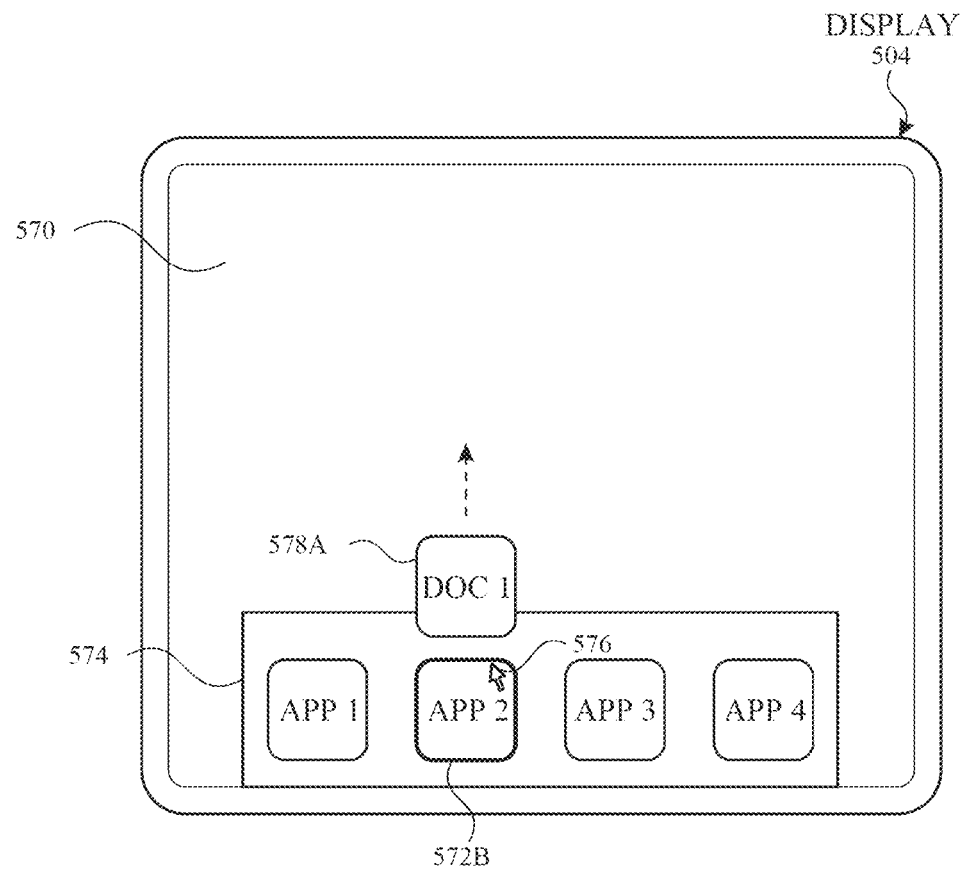
Figure 5F:
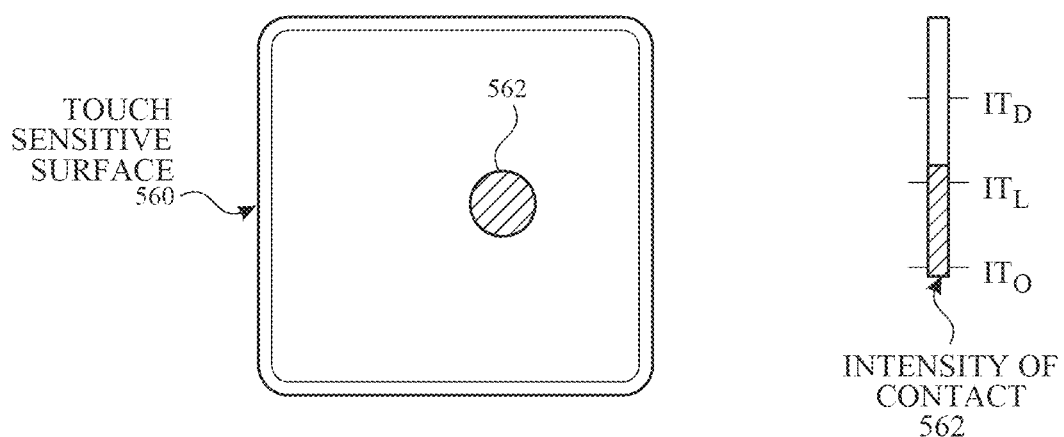
Figure 5G:
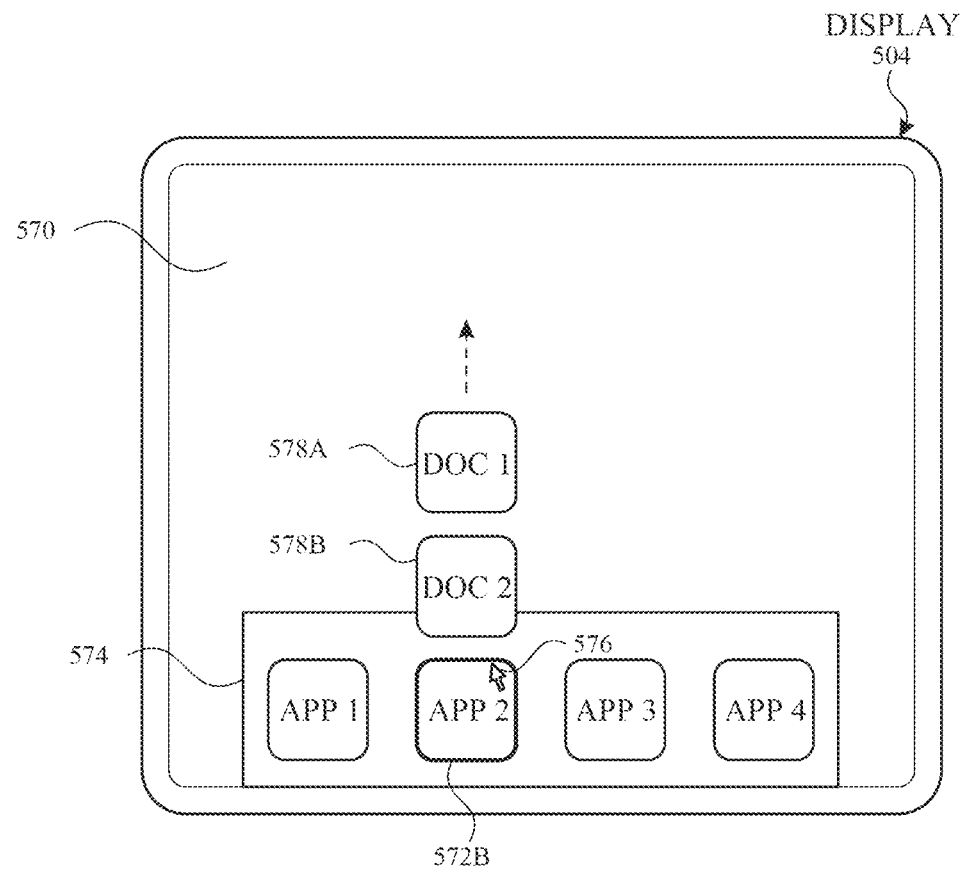
Figure 5G:
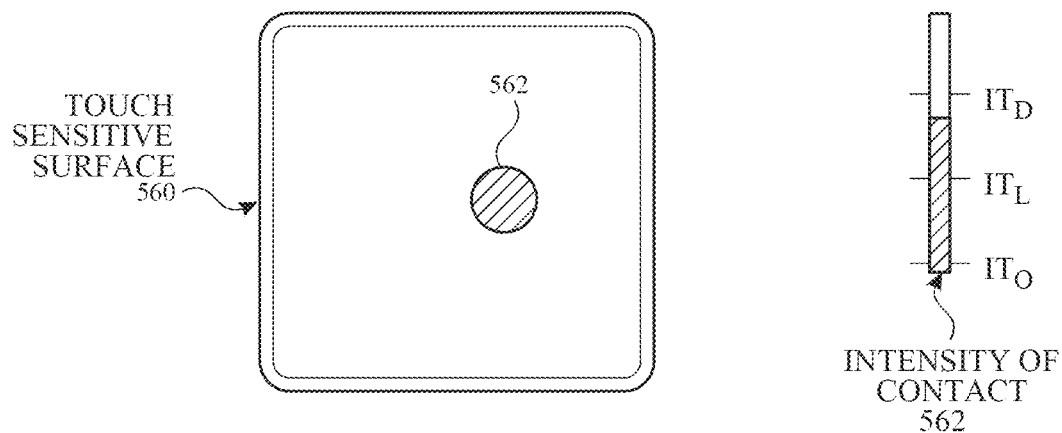
Figure 5H:
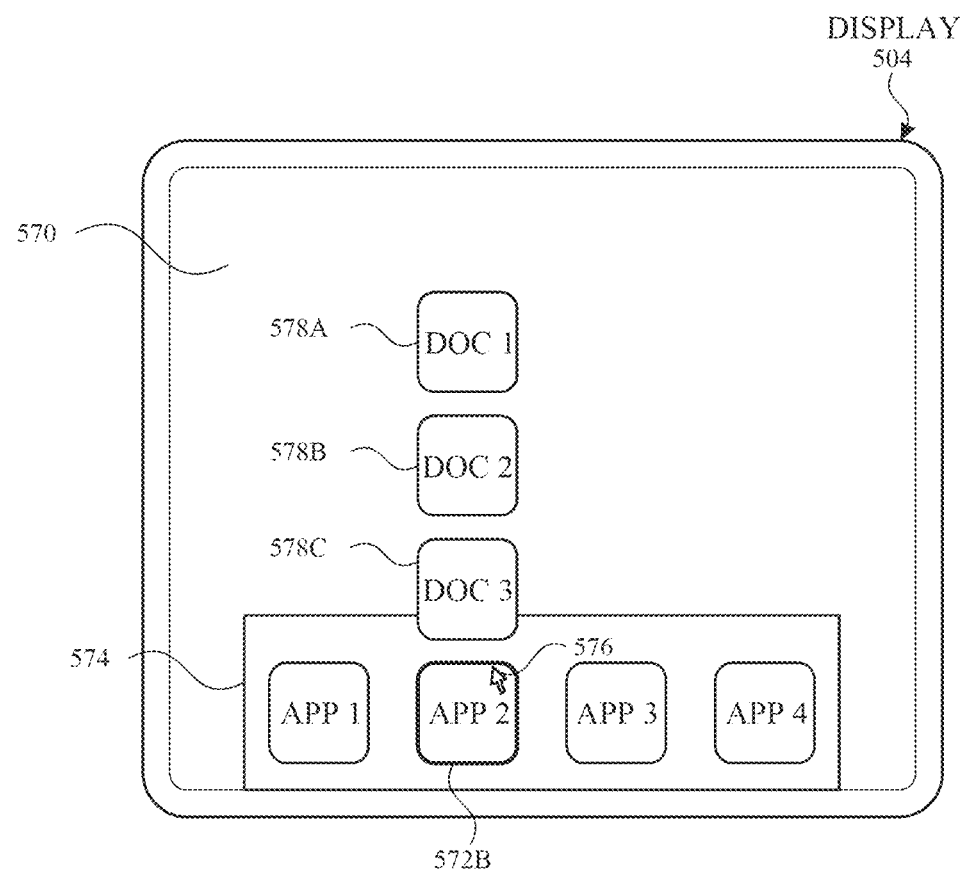
Figure 5H:
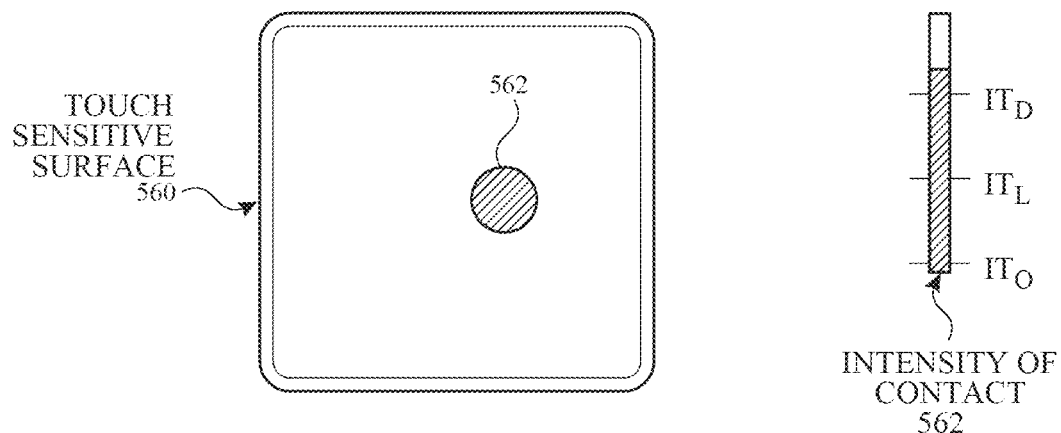

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Battery Usage User Interface

Many processes consume power from the battery of a mobile electronic device. The battery usage may also be affected by external environmental conditions of the device. In some circumstances, it is useful for a user to know how and/or which factors are contributing to battery usage. The embodiments described below provide ways in which an electronic device displays battery status and screen time usage for time periods and applications, displays recommendations and insights on battery usage, and allows for user interactions with the device, which allows the electronic device to simplify the presentation of battery usage information to the user and interactions with the user. This enhances the operability of the device and makes the user-device interface more efficient, which, additionally, reduces power usage and improves battery life of the device by enabling the user to use the device more quickly and efficiently. It is understood that people use devices. When a person uses a device, that person is optionally referred to as a user of the device.

Figure 6A:
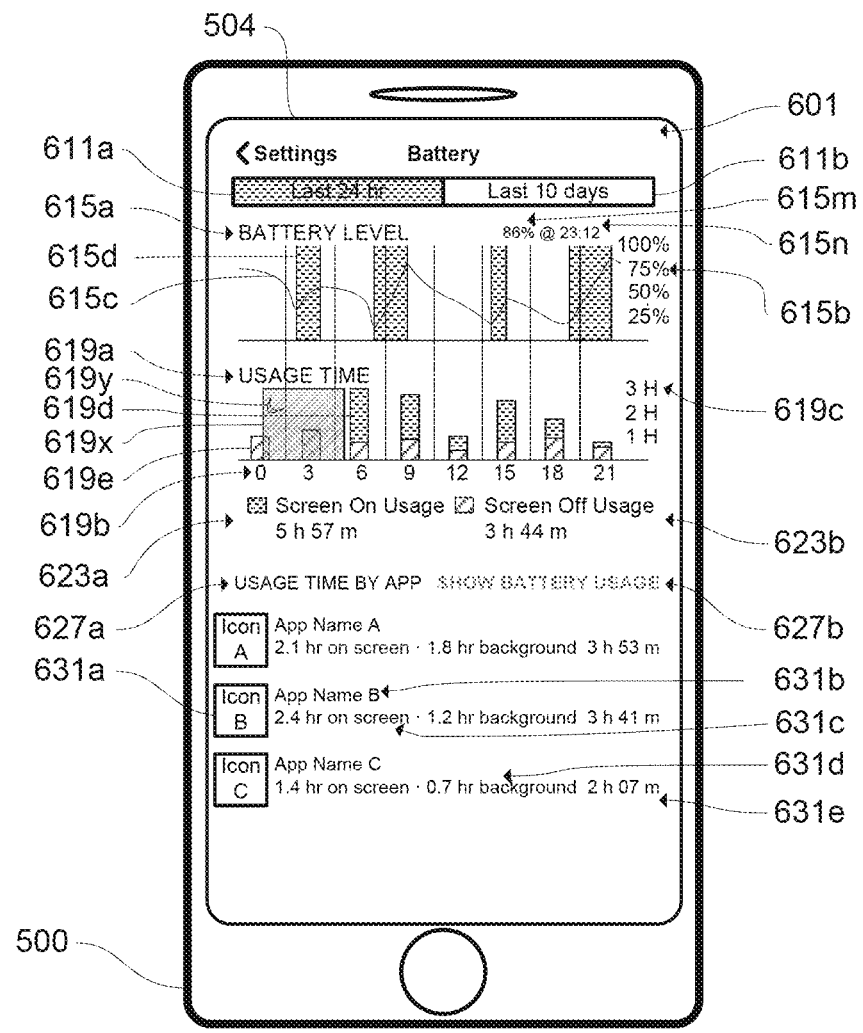
FIGS. 6A-6CC illustrate exemplary ways in which an electronic device displays battery status and screen time usage for time periods and applications in accordance with some embodiments of the disclosure.
Figure 6B:
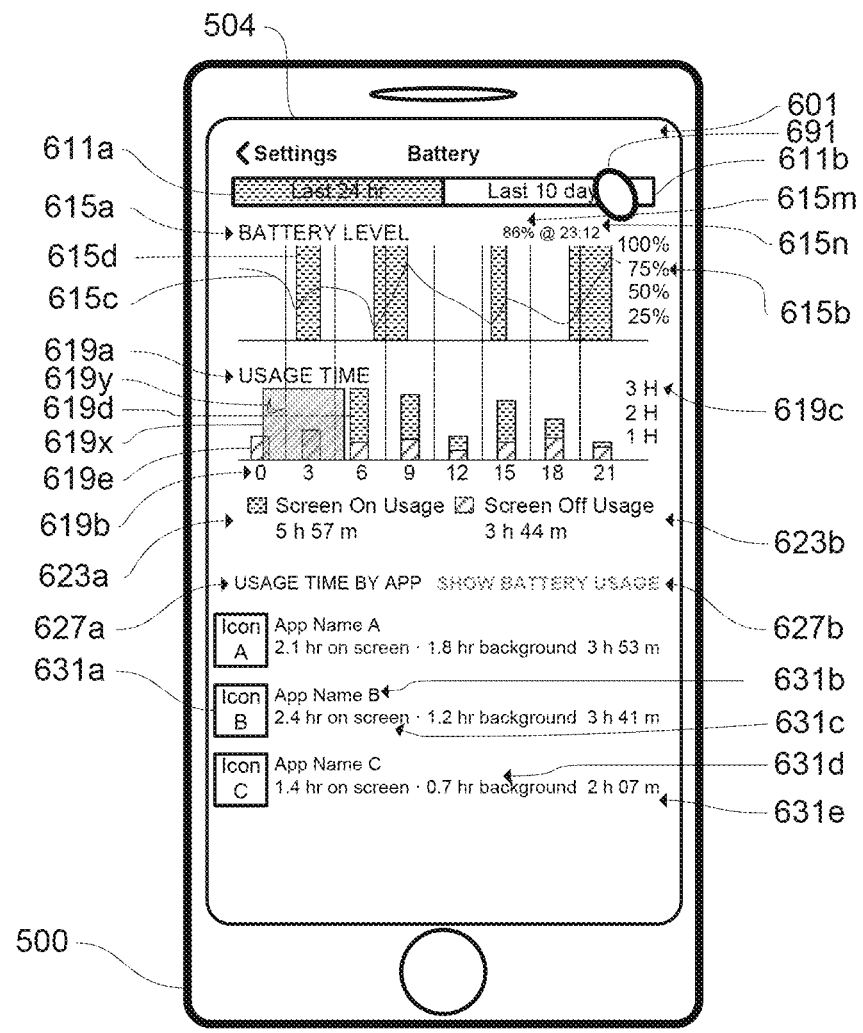
Figure 6C:
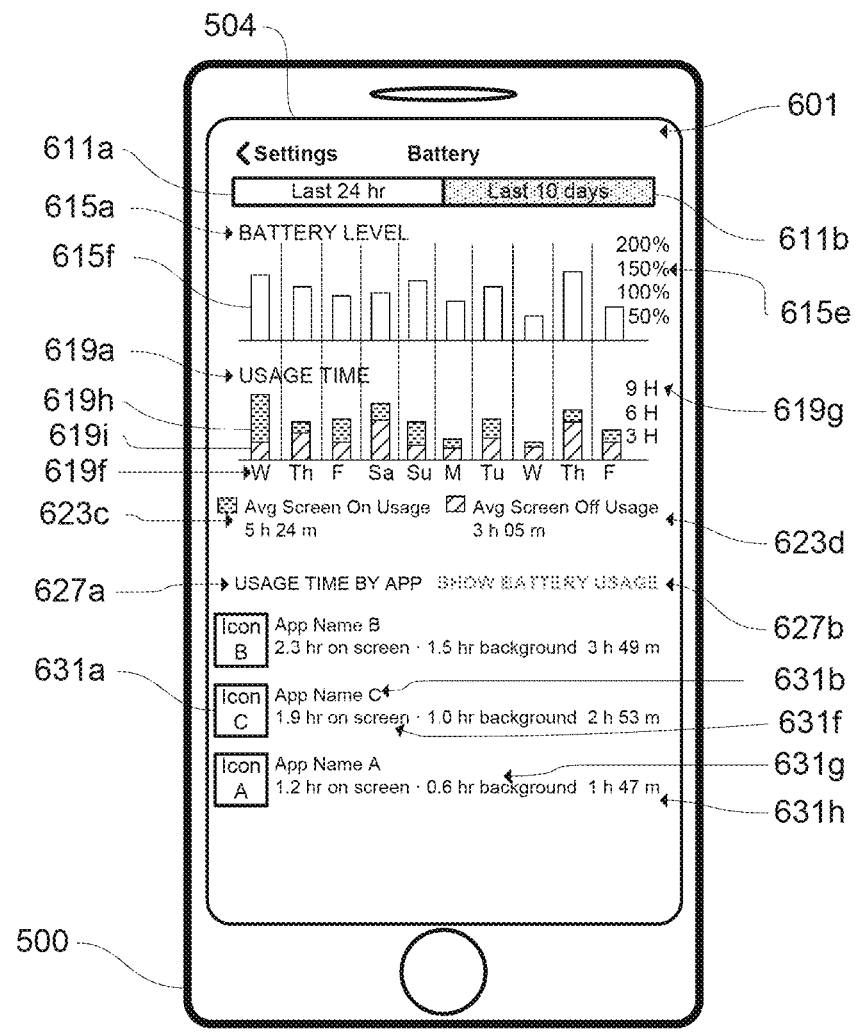

FIGS. 6A-6CC illustrate exemplary ways in which an electronic device displays battery status and screen time usage for time periods and applications in accordance with some embodiments of the disclosure. The embodiments in these figures are used to illustrate the processes described below, including the processes described with reference to FIGS. 7A-7Q.

FIG. 6A illustrates exemplary device 500 with touch screen 504, such as described with reference to FIGS. 5A-5H. Touch screen 504 optionally displays one or more user interfaces that include various content. In the example illustrated in FIG. 6A, touch screen 504 displays various battery or power-usage related information for exemplary device 500 in user interface 601. The user interface 601 in FIG. 6A includes a battery level chart 615a for the currently-selected time period, a usage time chart 619a for the currently-selected time period, and a list of applications that used the battery of device 500 during the currently-selected time period.

As mentioned previously, the user interface in FIG. 6A includes battery level chart 615a, which illustrates a visual representation of the battery level of the electronic device over the selected time period (e.g., 24 hours), where the x-axis is the time over the selected time period, and the y-axis is the energy in the battery expressed as a percentage 615b of the total capacity of the battery (e.g., battery level). Line 615c shows the battery level as a function of time. As shown in FIG. 6A, the minimum and maximum values of the battery level over time in battery level graph 615a are 0% and 100%, respectively.

Shaded regions 615d illustrate time subperiods within the currently-displayed 24-hour period during which the battery is/was being charged (e.g., the battery was being charged from 3:21 a.m.-5:13 a.m., 8:18 a.m.-10:29 a.m., etc.), which are visually emphasized relative to time subperiods within the currently-displayed 24 hours period during which the battery is/was being discharged. In some embodiments, battery level chart 615a includes the display of a representation of the time 615n that charging of a power source of electronic device 500 was last stopped, and the display of a representation of a charge level 615m of the power source when charging of the power source of electronic device 500 was last stopped. In some embodiments, the time that charging of the battery of the electronic device was last stopped is displayed (e.g., last charged at 11:12 p.m.) concurrently with the battery level of the battery when the charging was last stopped (e.g., last charged to 86%).

The user interface in FIG. 6A also includes usage time chart 619a, which provides visual indications of the amount of time the electronic device was used while touch screen 504 was on (e.g., displaying content) and while touch screen 504 was off (e.g., not displaying content) during the currently-displayed 24-hour period. In particular, usage time chart 619a in FIG. 6A includes bars for each of certain subperiods of time (e.g., 0-3 hours, 3-6 hours, etc.) labeled by the beginning of each subperiod 619b, the height of which correspond to the total screen-on and screen-off usage time of the electronic device during those subperiods of time, and a y-axis that represents the usage time. For example, the total screen-on and screen-off usage of the electronic device during the 9-12 hours subperiod is approximately 3 hours, and the minimum and maximum values of the usage time in the usage time chart 619a are 0 hours and 3 hours, respectively, as shown in FIG. 6A.

In usage time chart 619a as shown in FIG. 6A, one or more of the bars are divided into a portion 619d that represents and corresponds to screen-on time during the corresponding subperiod of time (if any) and a portion 619e that represents and corresponds to screen-off time during the corresponding subperiod of time (if any). For example, the bar corresponding to the 0-3 hours subperiod only includes screen-off usage, and thus does not include a portion corresponding to screen-on usage. However, the bar corresponding to the 6-9 hours subperiod includes both screen-on and screen-off usage, and is thus divided into a screen-on usage portion and a screen-off usage portion. The bars of the bar graph are optionally color-coded such that portions of the bars that correspond to display-on usage are displayed with a different visual characteristic than portions of the bars that correspond to display-off usage, such as being displayed with different colors. In some embodiments, as shown in FIG. 6A, the portions of the bars that correspond to display-on usage are in the top portion of each bar, and the portions of the bars that correspond to display-off usage are in the bottom portion of each bar. The sum of display-on usage 623a and the sum of display-off usage 623b for the currently-selected time period are optionally also displayed, as shown in FIG. 6A.

In usage time chart 619a as shown in FIG. 6A, shaded regions 619x illustrate time subperiods within the currently-displayed 24-hour period during which electronic device 500 is in device downtime portions of the first period of time. For example, usage time chart 619a over the currently-displayed 24-hour period includes an indication (e.g., a shaded portion of the chart, or a portion that is visually distinguished from the non-downtime portions) during that 24-hour time period of when electric device 500 was in a downtime operating mode (e.g., a period of time designated as the user's bedtime or a period of time designated as a period of time when usage of electronic device 500 should be or is somewhat limited, such as limiting or not generating notifications in response to events occurring at the device that would otherwise cause electronic device 500 to generate notifications, where notifications include receiving text messages, receiving emails, and receiving phone calls). In some embodiments, the device downtime (e.g., bedtime) is based on a bedtime clock or setting set by the user of electronic device 500, or is based on an automatically determined bedtime, by electronic device 500, based on when electronic device 500 detects that usage of electronic device 500 generally ceases for the night, when the usage of electronic device 500 generally begins in the morning (the time between which is optionally designated as "bedtime"), and/or what time alarms in the mornings are generally set for, etc. In some embodiments, the portions of usage time chart 619a that correspond to the device bedtime also include an icon 619y that represents the device bedtime, and the portions of the battery usage chart that do not correspond to the device bedtime do not include icon 619y that represents the device bedtime. In some embodiments, the icon that represents the device bedtime is also used elsewhere in the user interface to indicate to the user when the device is in a bedtime state and/or designate controls for adjusting the bedtime state (e.g., reducing a frequency of notifications during a bedtime time range, setting an alarm at the end of the bedtime time range, setting a bedtime reminder for the beginning of the bedtime time range, and adjusting the bedtime time range, etc.).

The user interface 601 in FIG. 6A also includes a list of applications that used the battery during the currently-selected time period. When the indicator 627a "usage time by app" is active, as shown in FIG. 6A, information displayed for each application includes an icon 631a that represents the application, the name 631b of the application, the total on-screen time 631c for the application during the currently-selected time period, the total off-screen time 631d for the application during the currently-selected time period, and the sum 631e of the total on-screen time 631c and the total off-screen time 631d for the application during the currently-selected time period. In some embodiments, the various applications are listed in descending order of their corresponding sum 631e of the total on-screen time 631c and the total off-screen time 631d. For example, over the last 24 hours, application A ("App Name A") has had 2.1 hours of on-screen time and 1.8 hours of off-screen time (or "background" time), for a total of 3 hours and 53 minutes of usage time; application B ("App Name B") has had 2.4 hours of on-screen time and 1.2 hours of off-screen time, for a total of 3 hours and 41 minutes of usage time; and application C ("App Name C") has had 1.4 hours of on-screen time and 0.7 hours of off-screen time, for a total of 2 hours and 7 minutes of usage time. Applications A, B, and C are listed in descending order of their corresponding total usage times: 3 hours and 53 minutes, 3 hours and 41 minutes, and 2 hours and 7 minutes, respectively.

The user interface 601 in FIG. 6A also includes time period indicators 611a and 611b that are selectable to display, in the user interface, battery usage information for two different time periods. In particular, when one of time period indicator 611a or 611b is selected, the user interface 601 displays battery information over the time period corresponding to the selected indicator 611a or 611b. In response to selection of the other time period indicator 611a or 611b, the user interface is optionally updated to display battery usage information over the other selected time period. For example, as shown in FIG. 6A, indicator 611a displays "last 24 hours" and indicator 611b displays "last 10 days," where indicator 611a is currently-selected; thus, user interface 601 displays battery and/or power usage information corresponding to the last 24 hours, as described above.

Selection of various elements in the usage interface 601 will now be described. For example, in FIG. 6B, selection of the indicator 611b which displays "last 10 days" is detected (e.g., by a tap of contact 691 detected on the indicator 611b, as shown in FIG. 6B). In response to the selection of the indicator 611b, the user interface 601 is updated to display battery usage information over the last 10 days as shown in FIG. 6C. When indicator 611b is currently-selected, the user interface 601 in FIG. 6C includes a battery level chart 615a, which illustrates a visual representation of the battery usage of the electronic device over the selected time period (e.g., 10 days). In particular, battery level chart 615a in FIG. 6C includes bars 615f for each of certain subperiods of time (e.g., days during the 10-day period, such as Wednesday, Thursday, etc.), the height of which correspond to the battery used during those subperiods of time, and a y-axis that represents the energy in the battery expressed as a percentage 615e of the total capacity of the battery (e.g., battery level). As shown in FIG. 6C, the minimum and maximum values of the battery usage in battery level chart 615a are 0% and 200%, respectively, though other ranges are possible. For example, approximately 100% of the capacity of the battery was consumed on Saturday, and approximately 125% of the capacity of the battery was consumed on Sunday (e.g., because the device was at least partially recharged during Sunday and then more battery power was used to bring the total usage above 100% of the battery capacity).

The user interface in FIG. 6C also includes usage time chart 619a, which provides visual indications of the amount of time the electronic device was used while touch screen 504 was on (e.g., displaying content) and while touch screen 504 was off (e.g., not displaying content) during the currently-displayed 10-day period. The content of usage time chart 619a in FIG. 6C is optionally the same as described in FIG. 6A, except that instead of corresponding to subperiods within a 24-hour period, the bars in the usage time chart 619a in FIG. 6C correspond to subperiods (e.g., days) within a 10-day period. Other details of the usage time chart 619a in FIG. 6A are analogously shown the usage time chart 619a in FIG. 6C. For example, usage time chart 619a in FIG. 6C includes bars for each of certain subperiods of time (e.g., days in the 10-day period, such as Wednesday, Thursday, etc.), the height of which correspond to the total screen-on and screen-off usage time of the electronic device during those subperiods of time, and a y-axis that represents the usage time. In contrast to the usage time chart 619a shown in FIG. 6A with respect to the 24-hour period, the usage time chart 619a shown in FIG. 6C with respect to the 10-day period is displayed with the average (rather than the total) display-on usage 623c per subperiod (e.g., day) of time and the average (rather than the total) display-off usage 623d per subperiod (e.g., day), as shown in FIG. 6C.

The user interface 601 in FIG. 6C also includes a list of applications that used the battery during the currently-selected time period. When the indicator 627a "usage time by app" is active, as shown in FIG. 6C, information displayed for each application includes an icon 631a that represents the application, the name 631b of the application, the average on-screen time 631f per subperiod of time for the application during the currently-selected time period, the average off-screen time 631g per subperiod of time for the application during the currently-selected time period, and the sum 631h of the average on-screen time 631f and the average off-screen time 631g for the application during the currently-selected time period. In some embodiments, the various applications are listed in descending order of their corresponding sum 631h of the average on-screen time 631f and the average off-screen time 631g. For example, over the last 10 days, application A ("App Name A") has had 1.2 hours of average daily on-screen time and 0.6 hours of average daily off-screen time (or "background" time), for a total of 1 hour and 47 minutes of average daily usage time; application B ("App Name B") has had 2.3 hours of average daily on-screen time and 1.5 hours of average daily off-screen time, for a total of 3 hours and 49 minutes of average daily usage time; and application C ("App Name C") has had 1.9 hours of average daily on-screen time and 1.0 hours of average daily off-screen time, for a total of 2 hours and 53 minutes of average daily usage time. Applications B, C, and A are listed in descending order of their corresponding average daily usage times: 3 hours and 49 minutes, 2 hours and 53 minutes, and 1 hour and 47 minutes, respectively. In this example, the order of the three applications has changed compared to the same applications in the last 24 hours example in FIG. 6A because the average daily amount of usage for an application over the last 10 days is different from the amount of usage for the same application over the last 24 hours.

Figure 6D:
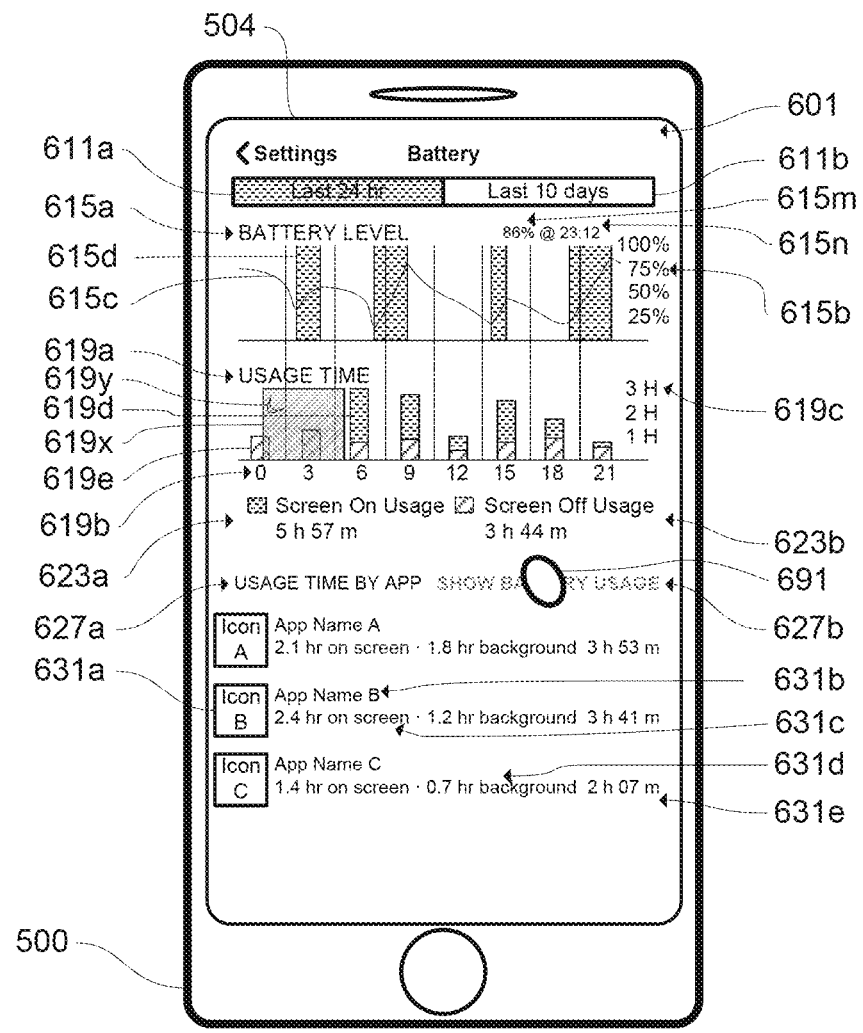
Figure 6E:
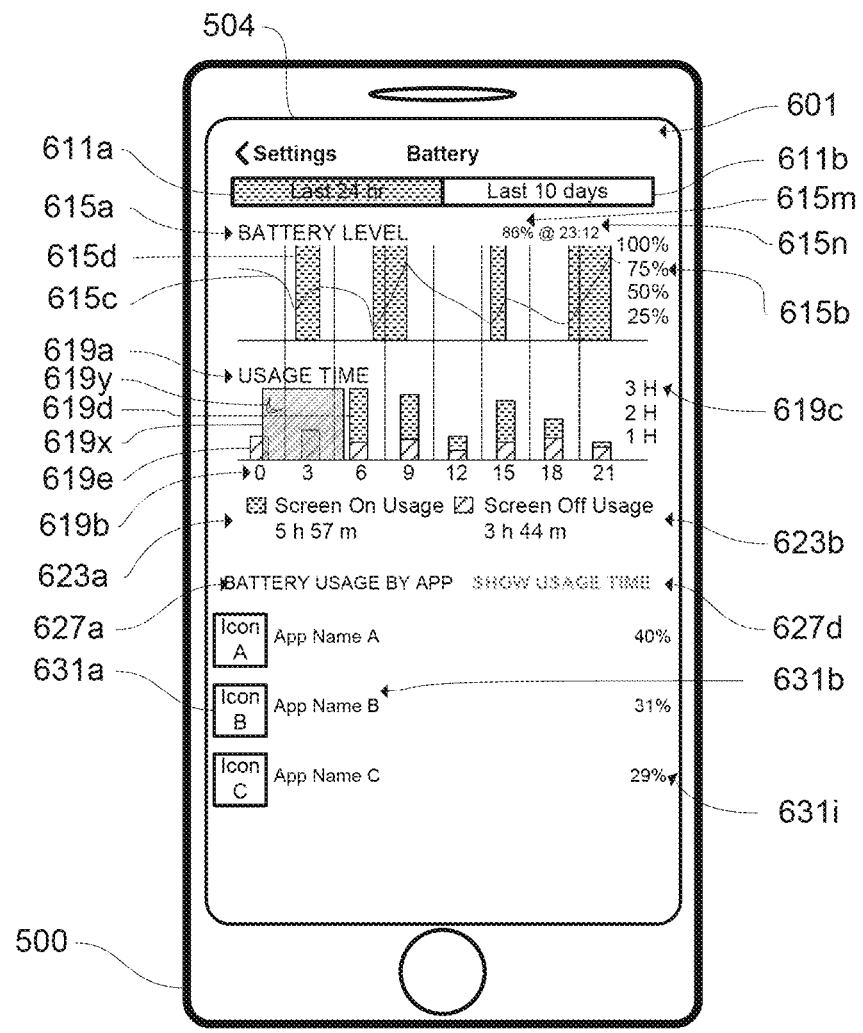

Returning to FIG. 6A, the list of applications at the bottom of user interface 601 is optionally switchable from displaying usage time by application (as in FIG. 6A) to displaying battery usage by application. For example, in FIG. 6D, selection of the indicator 627b which displays "show battery usage" is detected (e.g., by a tap of contact 691 detected on the indicator 627b, as shown in FIG. 6D). In response to the selection of the indicator 627b, the user interface 601 is updated to display the portion of the total battery usage during the currently-selected time period (e.g., 24 hours) that is attributable to each application, as shown in FIG. 6E. In FIG. 6E, information displayed for each application includes an icon 631a that represents the application, the name 631b of the application, and the percentage 631i of the total battery usage during the currently-selected time period (e.g., 24 hours) that is attributable to that application. In some embodiments, the various applications are listed in descending order of their corresponding percentage 631i of the total battery usage during the currently-selected time period. For example, over the last 24 hours, 40% of the battery's usage was attributable to application A ("App Name A"), 31% of the battery's usage was attributable to application B ("App Name B"), and 29% of the battery's usage was attributable to application C ("App Name C").

Figure 6F:
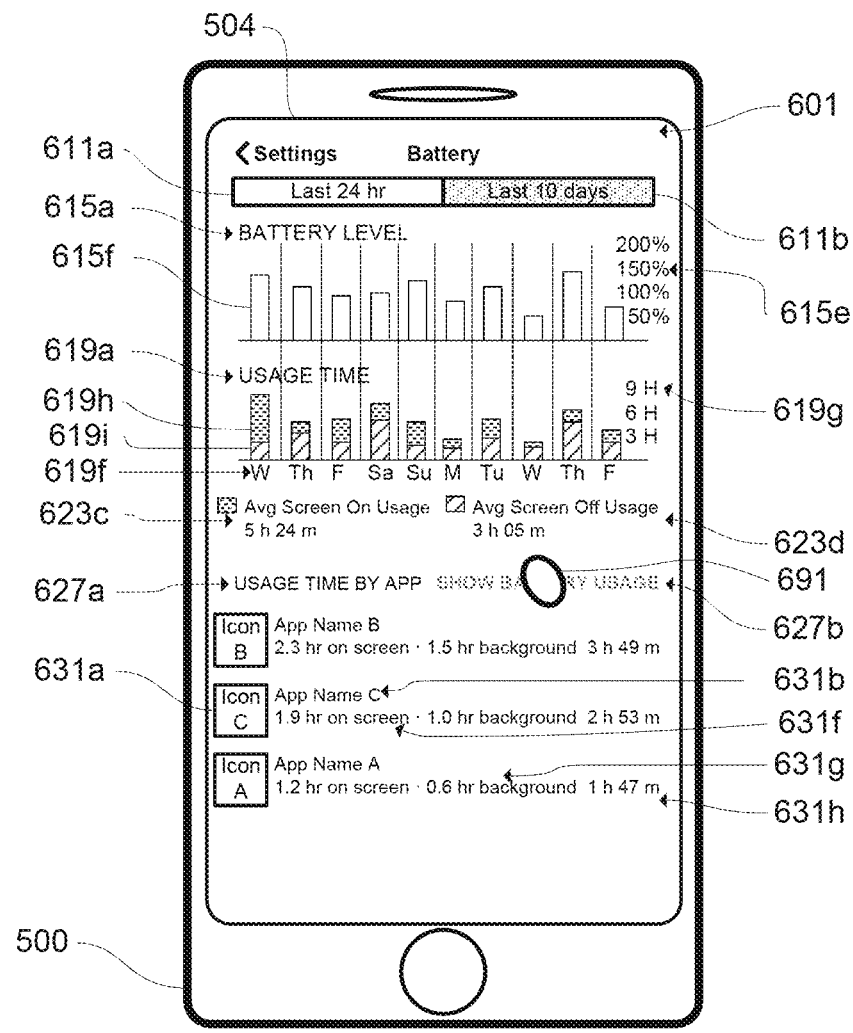
Figure 6G:
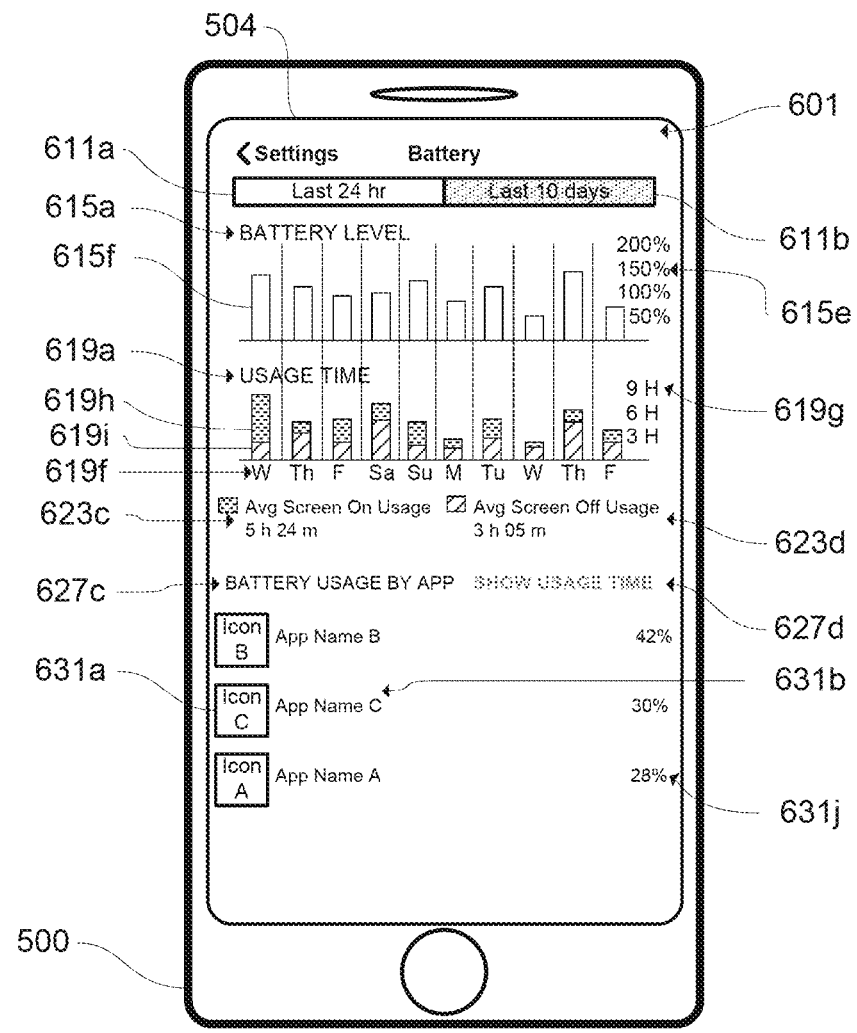

Returning to FIG. 6C, the list of applications at the bottom of user interface 601 is optionally switchable from displaying usage time by application (as in FIG. 6C) to displaying battery usage by application. For example, in FIG. 6F, selection of the indicator 627b which displays "show battery usage" is detected (e.g., by a tap of contact 691 detected on the indicator 627b, as shown in FIG. 6F). In response to the selection of the indicator 627b, the user interface 601 is updated to display the portion of the total battery usage during the currently-selected time period (e.g., 10 days) that is attributable to each application, as shown in FIG. 6G. In FIG. 6G, information displayed for each application includes an icon 631a that represents the application, the name 631b of the application, and the percentage 631j of the total battery usage during the currently-selected time period (e.g., 10 days) that is attributable to that application. In some embodiments, the various applications are listed in descending order of their corresponding percentage 631j of the total battery usage during the currently-selected time period. For example, over the last 10 days, 42% of the battery's usage was attributable to application B ("App Name B"), 30% of the battery's usage was attributable to application C ("App Name C"), and 28% of the battery's usage was attributable to application A ("App Name A"). In this example, the order of the three applications has changed compared to the same applications in the last 24 hours example in FIG. 6E because the percentage of the total battery usage that is attributable to an application over the last 10 days is different from the percentage of the total battery usage that is attributable to the same application over the last 24 hours.

Figure 6H:
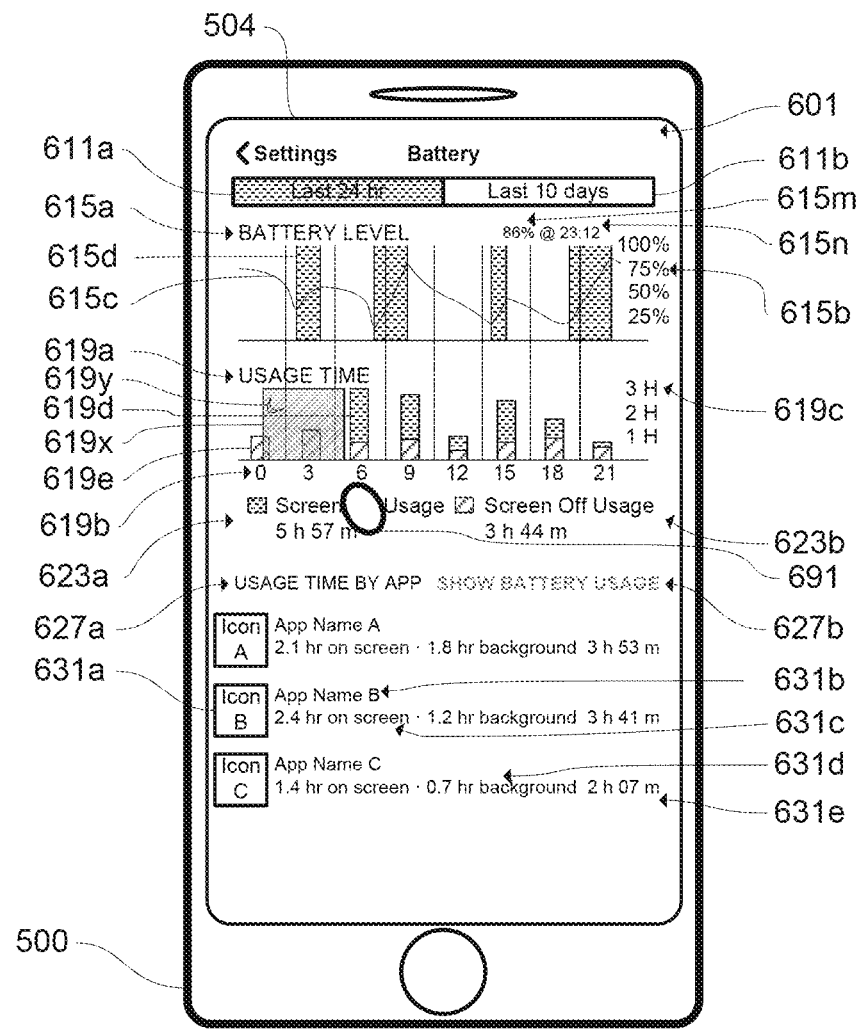
Figure 6I:
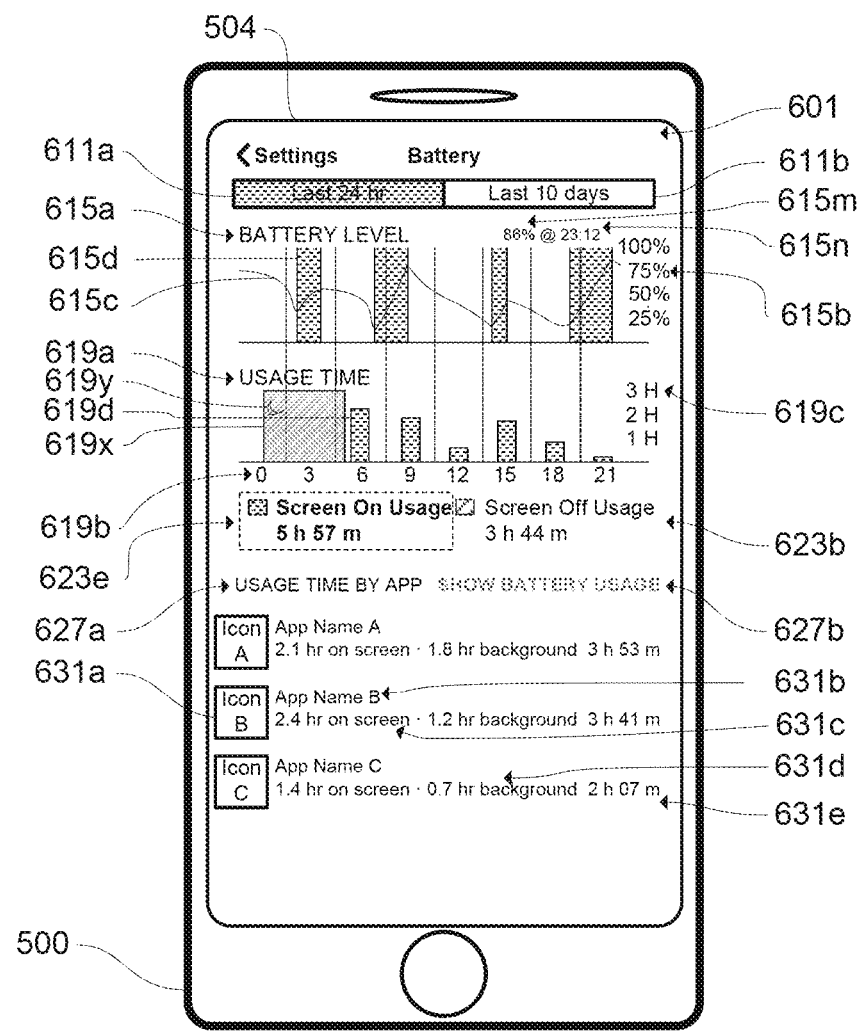

Returning to FIG. 6A, usage time chart 619a in the last 24 hours view is optionally switchable from displaying both screen-on usage and screen-off usage (as in FIG. 6A) to displaying only screen-on usage without displaying screen-off usage. For example, in FIG. 6H, selection of the indicator 623a which displays the aggregate "screen on usage" is detected (e.g., by a tap of contact 691 detected on the indicator 623a, as shown in FIG. 6H). In response to the selection of the indicator 623a, usage time chart 619a is updated to display only screen-on usage without displaying screen-off usage, as shown in FIG. 6I. In FIG. 6I, the sum of display-on usage 623e over the currently-selected time period (e.g. last 24 hours) is optionally visually emphasized relative to the sum of display-off usage 623b over the currently-selected time period. Furthermore, the usage time chart 619a includes only the bar portions 619d that represent and correspond to screen-on time during the corresponding subperiods of time (if any); there are no bar portions that represent and correspond to screen-off time during the corresponding subperiods of time (if any). For example, in the 0-3 hours and 3-6 hours subperiods, there is no screen-on usage, and thus the usage time chart 619a does not include any bars corresponding to those subperiods. However, the 6-9 hours subperiod includes approximately 2.5 hours of screen-on usage, and the bar portion corresponding to that usage time is displayed as a bar portion.

Figure 6J:
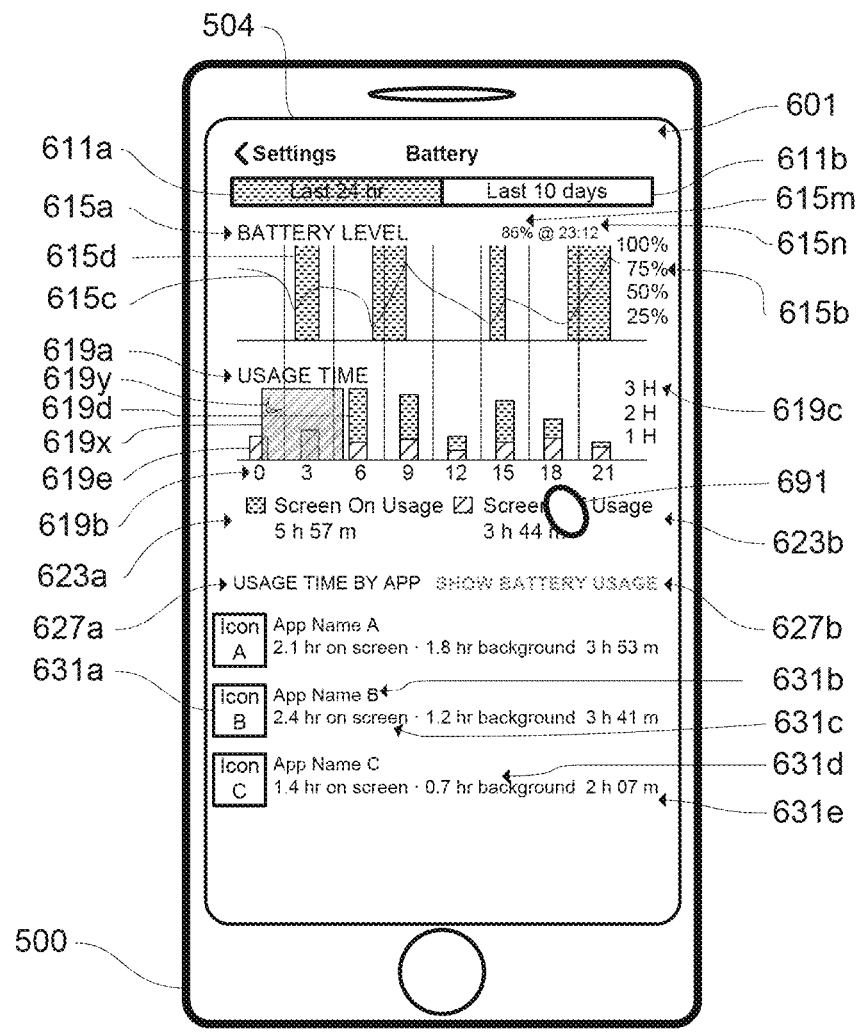
Figure 6K:
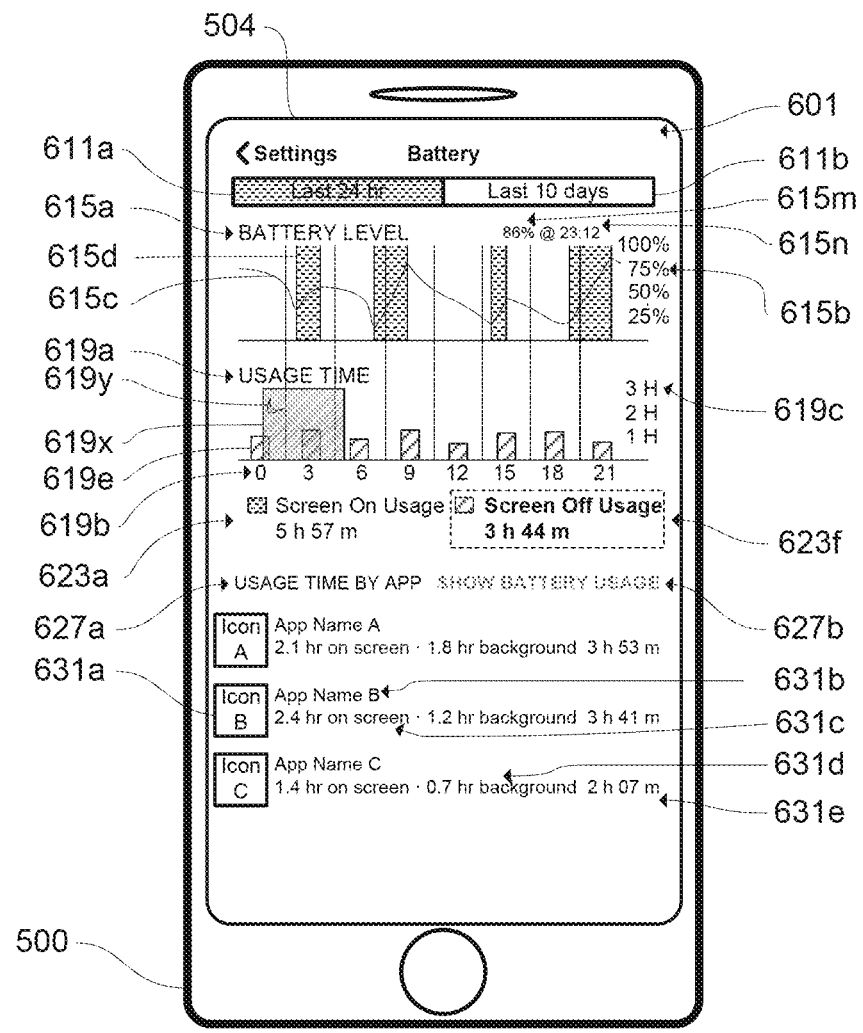

Returning to FIG. 6A, usage time chart 619a in the last 24 hours view is optionally switchable from displaying both screen-on usage and screen-off usage (as in FIG. 6A) to displaying only screen-off usage without displaying screen-on usage. For example, in FIG. 6J, selection of the indicator 623b which displays the aggregate "screen off usage" is detected (e.g., by a tap of contact 691 detected on the indicator 623b, as shown in FIG. 6J). In response to the selection of the indicator 623b, usage time chart 619a is updated to display only screen-off usage without displaying screen-on usage, as shown in FIG. 6K. In FIG. 6K, the sum of display-off usage 623f over the currently-selected time period (e.g. last 24 hours) is optionally visually emphasized relative to the sum of display-on usage 623a over the currently-selected time period. Furthermore, the usage time chart 619a includes only the bar portions 619e that represent and correspond to screen-off time during the corresponding subperiods of time (if any); there are no bar portions that represent and correspond to screen-on time during the corresponding subperiods of time (if any). For example, in the 6-9 hours subperiod includes approximately 1 hour of screen-on usage, and the bar portion corresponding to that usage time is displayed as a bar portion.

Figure 6L:
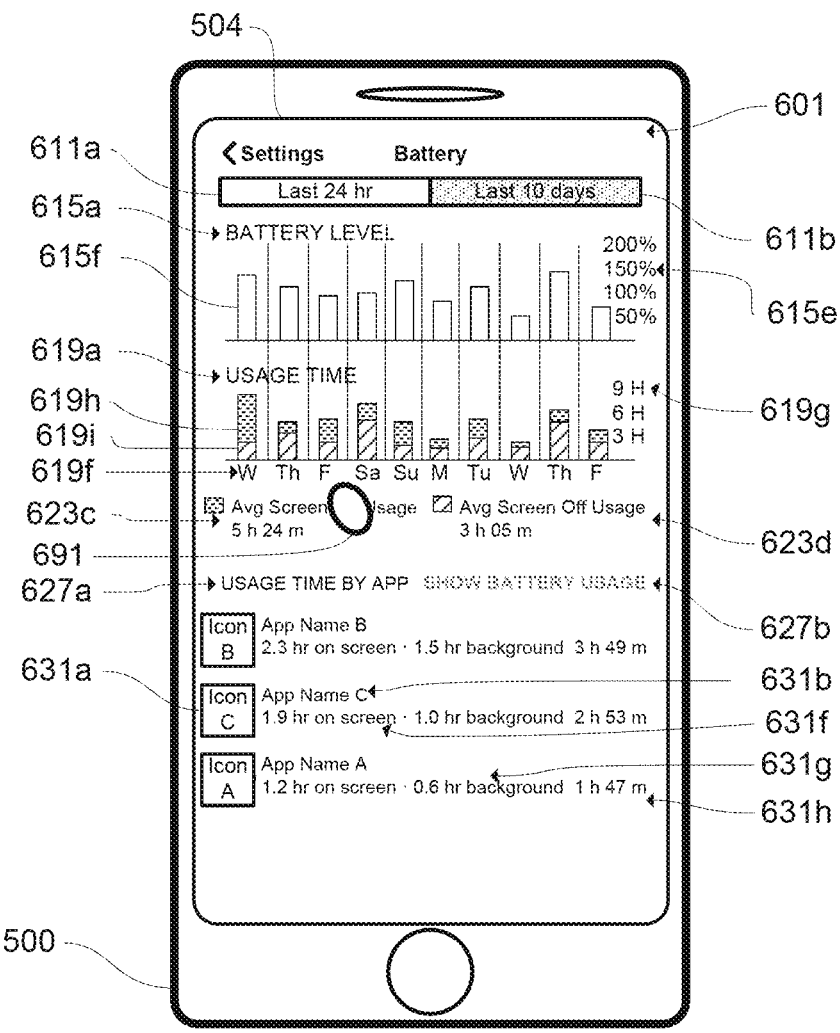
Figure 6M:
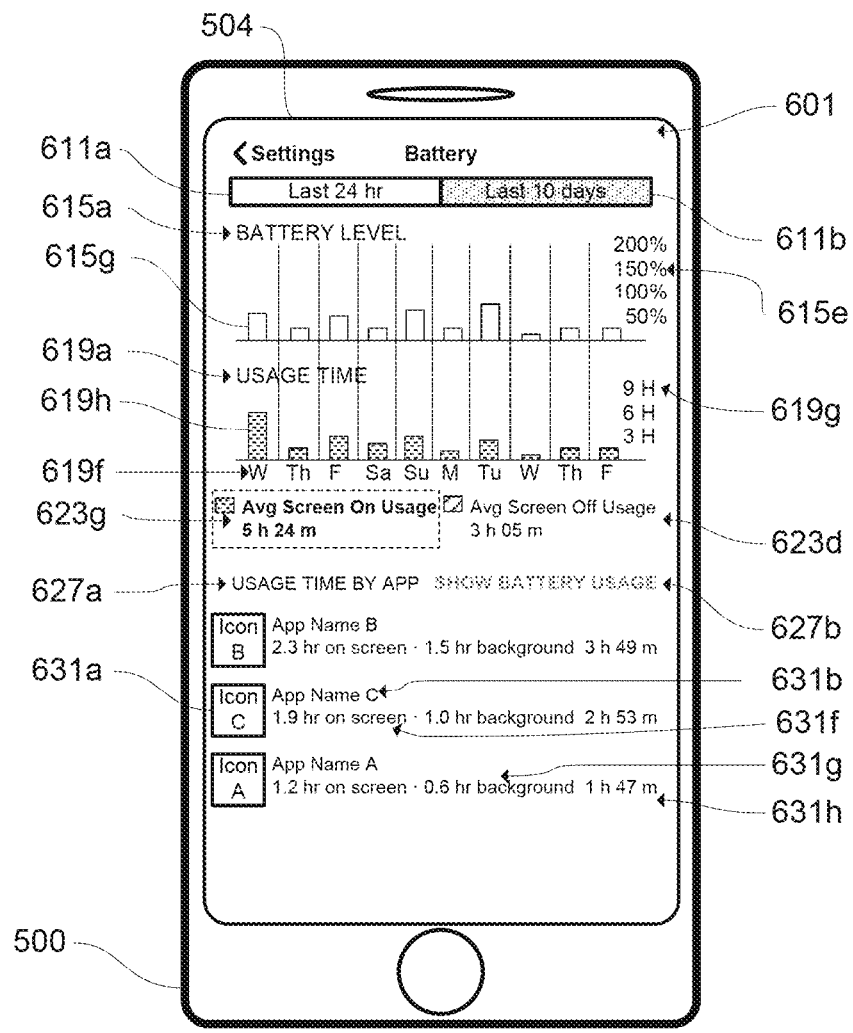

Returning to FIG. 6C, usage time chart 619a in the last 10 days view is optionally switchable from displaying both screen-on usage and screen-off usage (as in FIG. 6C) to displaying only screen-on usage without displaying screen-off usage. For example, in FIG. 6L, selection of the indicator 623c which displays "avg screen on usage" is detected (e.g., by a tap of contact 691 detected on the indicator 623c, as shown in FIG. 6L). In response to the selection of the indicator 623c, the user interface 601 is updated to display only screen-on usage without displaying screen-off usage in battery level chart 615a and usage time chart 619a, as shown in FIG. 6M. In FIG. 6M, the average display-on usage 623g over the currently-selected time period (e.g. last 10 days) is optionally visually emphasized relative to the average display-off usage 623d over the currently-selected time period. Furthermore, the usage time chart 619a includes only the bar portions 619h that represent and correspond to screen-on time during the corresponding subperiods of time (if any); there are no bar portions that represent and correspond to screen-off time during the corresponding subperiods of time (if any). For example, the Saturday subperiod includes approximately 2 hours of screen-on usage, and the bar portion corresponding to that usage time is displayed as a bar portion.

Furthermore, as shown in FIG. 6M, battery level chart 615a is optionally updated to include bars 615g for each of certain subperiods of time (e.g., days during the 10-day period, such as Wednesday, Thursday, etc.), the height of which correspond to the battery used during those subperiods of time when the screen was on.

Figure 6N:
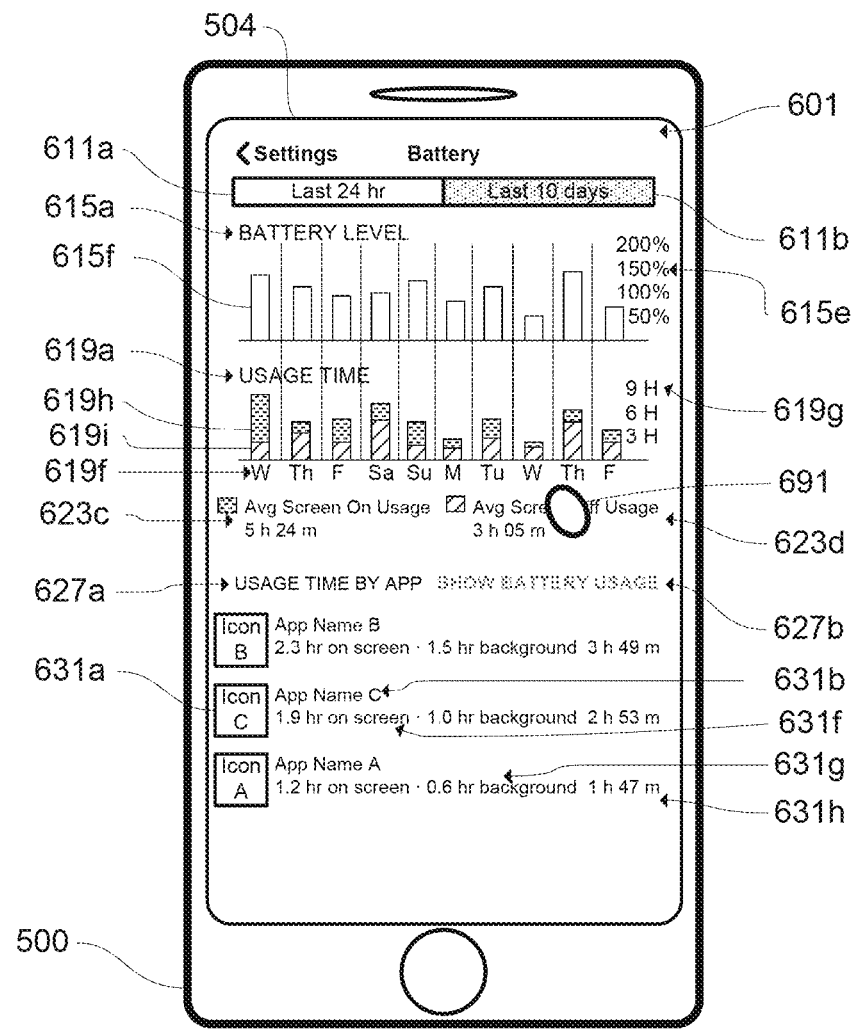
Figure 6O:
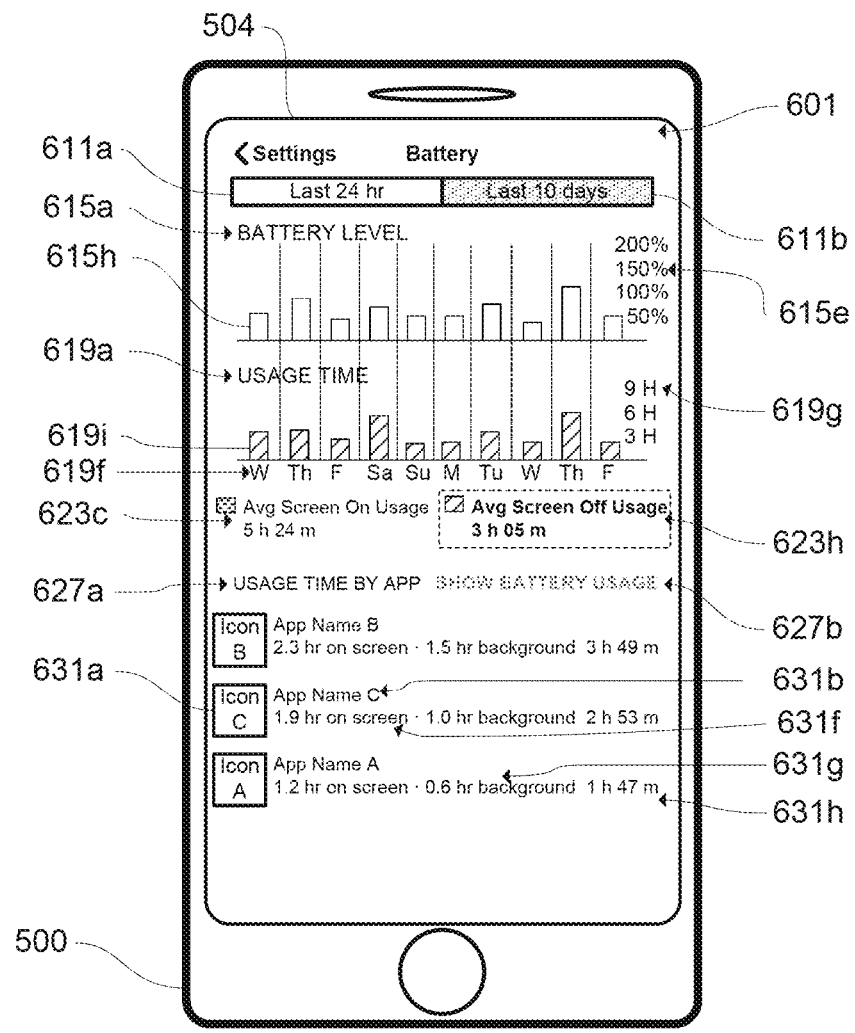

Returning to FIG. 6C, usage time chart 619a in the last 10 days view is optionally switchable from displaying both screen-on usage and screen-off usage (as in FIG. 6C) to displaying only screen-off usage without displaying screen-on usage. For example, in FIG. 6N, selection of the indicator 623d which displays "avg screen off usage" is detected (e.g., by a tap of contact 691 detected on the indicator 623d, as shown in FIG. 6N). In response to the selection of the indicator 623d, the user interface 601 is updated to display only screen-off usage without displaying screen-on usage in battery level chart 615a and usage time chart 619a, as shown in FIG. 6O. In FIG. 6O, the average display-off usage 623h over the currently-selected time period (e.g. last 10 days) is optionally visually emphasized relative to the average display-on usage 623c over the currently-selected time period. Furthermore, the usage time chart 619a includes only the bar portions 619i that represent and correspond to screen-off time during the corresponding subperiods of time (if any); there are no bar portions that represent and correspond to screen-on time during the corresponding subperiods of time (if any). For example, the Saturday subperiod includes approximately 6 hours of screen-off usage, and the bar portion corresponding to that usage time is displayed as a bar portion.

Furthermore, as shown in FIG. 6O, battery level chart 615a is optionally updated to include bars 615h for each of certain subperiods of time (e.g., days during the 10-day period, such as Wednesday, Thursday, etc.), the height of which correspond to the battery used during those subperiods of time when the screen was off.

Figure 6P:
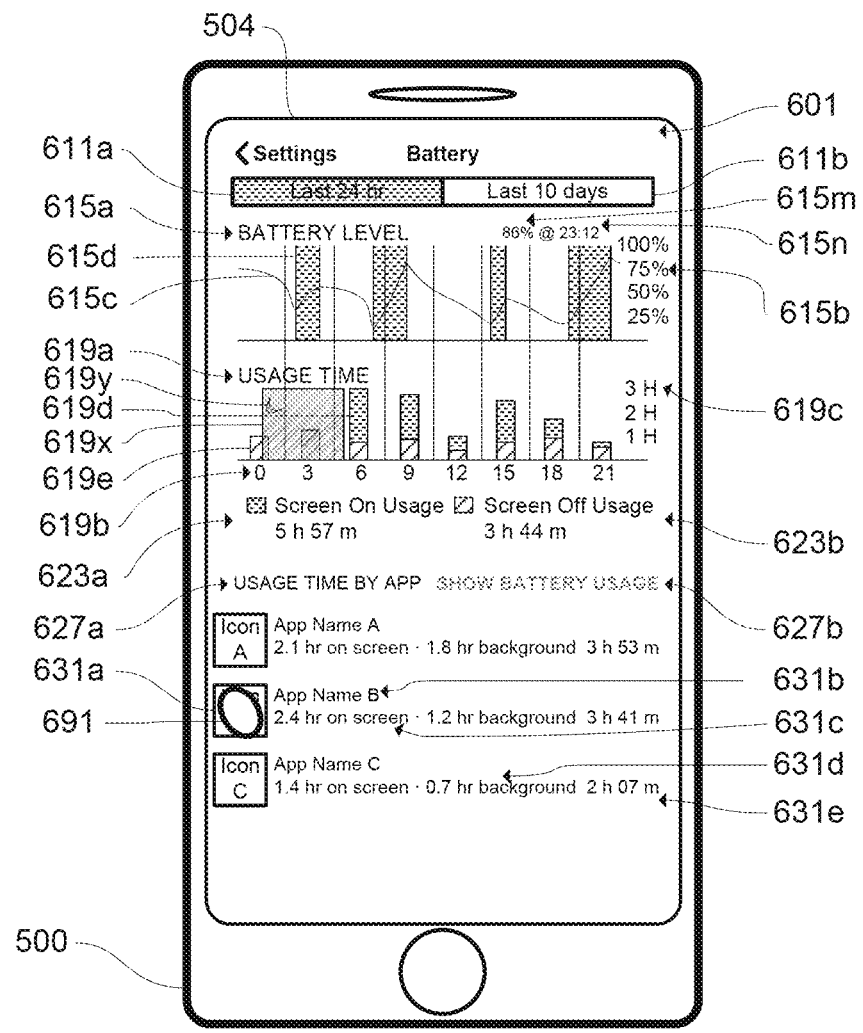
Figure 6Q:
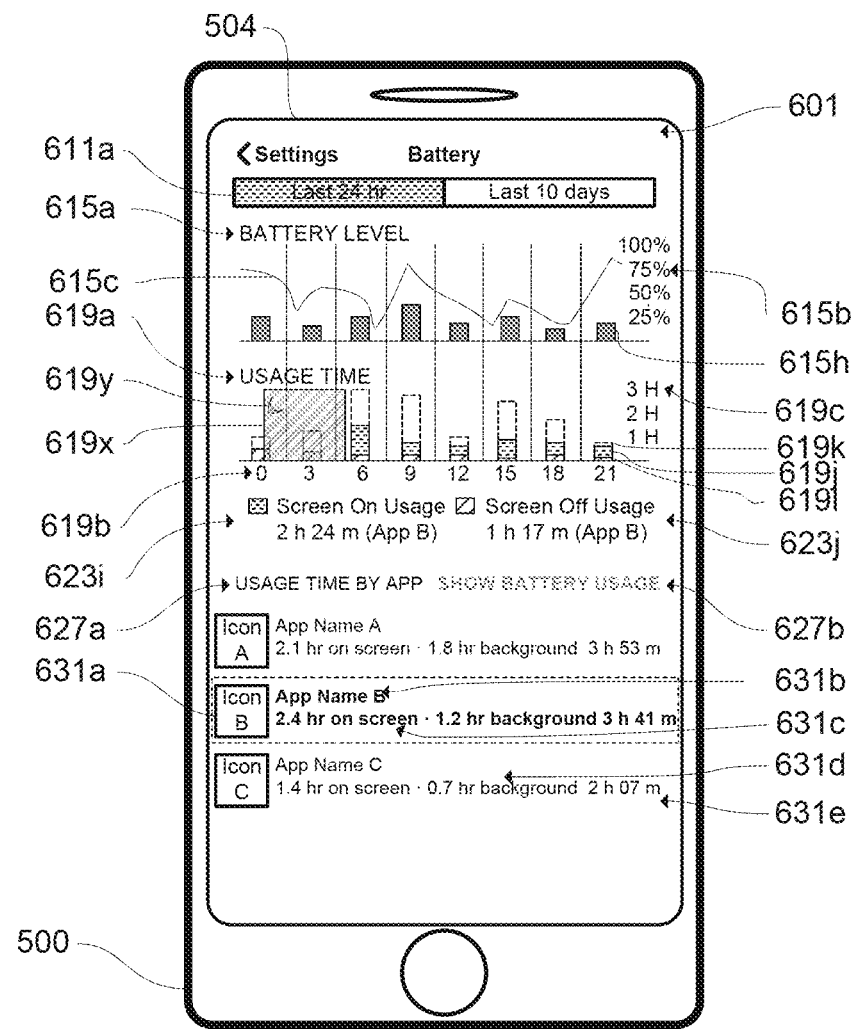

Returning to FIG. 6A, user interface 601 is optionally switchable from displaying battery usage information for all the applications (as in FIG. 6A) to displaying more detailed battery usage information for one or more selected applications. For example, in FIG. 6P, selection of the icon 631a corresponding to application B is detected (e.g., by a tap of contact 691 detected on the icon 631a, as shown in FIG. 6P). In response to the selection of the indicator 631a, the user interface 601 is updated to display more detailed battery usage information for application B, as shown in FIG. 6Q. In FIG. 6Q, the icon 631a that represents selected application B, the name 631b of selected application B, the total on-screen time 631c for selected application B during the currently-selected time period (e.g. 24 hours), the total off-screen time 631d for selected application B during the currently-selected time period, and the sum 631e of the total on-screen time 631c and the total off-screen time 631d for selected application B during the currently-selected time period are optionally visually emphasized relative to analogous information for the other applications A and C.

Furthermore, as shown in FIG. 6Q, battery level chart 615a is updated to include a bar 615h for each subperiod (e.g. 0-3 hours) during the currently-selected time period that corresponds to the percentage of the total capacity of the battery consumed by selected application B during the subperiod. For example, during the 6-9 hours subperiod, approximately 25% of the total capacity of the battery was consumed by selected application B.

Finally, as shown in FIG. 6Q, usage time chart 619a is updated to show the screen-on and screen-off usage time attributed to selected application B. In particular, one or more of the bars in usage time chart 619a are divided into a portion 619j that represents and corresponds to screen-on time attributed to selected application B during the corresponding subperiod of time (if any), a portion 619l that represents and corresponds to screen-off time during the corresponding subperiod of time (if any), and a portion 619k that represents and corresponds to the total screen-on time and screen-off time attributed to all applications other than selected application B. In some embodiments, portion 619k is visually deemphasized relative to portions 619j and 619k that correspond to selected application B. For example, the bar corresponding to the 0-3 hours subperiod only includes screen-off usage attributed to selected application B and total screen-on time and screen-off time attributed to all applications other than selected application B, and thus does not include a portion corresponding to screen-on usage attributed to selected application B, because selected application B optionally had no screen-on usage during the 0-3 hours subperiod. However, the bar corresponding to the 6-9 hours subperiod includes both screen-on and screen-off usage attributed to selected application B as well as total screen-on time and screen-off time attributed to all applications other than selected application B, and is thus divided into three portions representing all three types of usage. The bars of the bar graph are optionally color-coded or marked such that portions of the bars that correspond to display-on usage attributed to selected application B, portions of the bars that correspond to display-off usage attributed to selected application B, and portions of the bars that correspond to the total display-on usage and display-off usage attributed to all applications other than selected application B are displayed with three different combinations of visual characteristics, such as being displayed with different colors (e.g. green, blue, and white) or border styles (e.g. solid and dashed). The sum of display-on usage 623i attributed to selected application B and the sum of display-off usage 623j attributed to selected application B for the currently-selected time period are optionally also displayed, as shown in FIG. 6Q, instead of sums of the display-off and display-on usage attributed to all applications as in FIG. 6A.

Figure 6R:
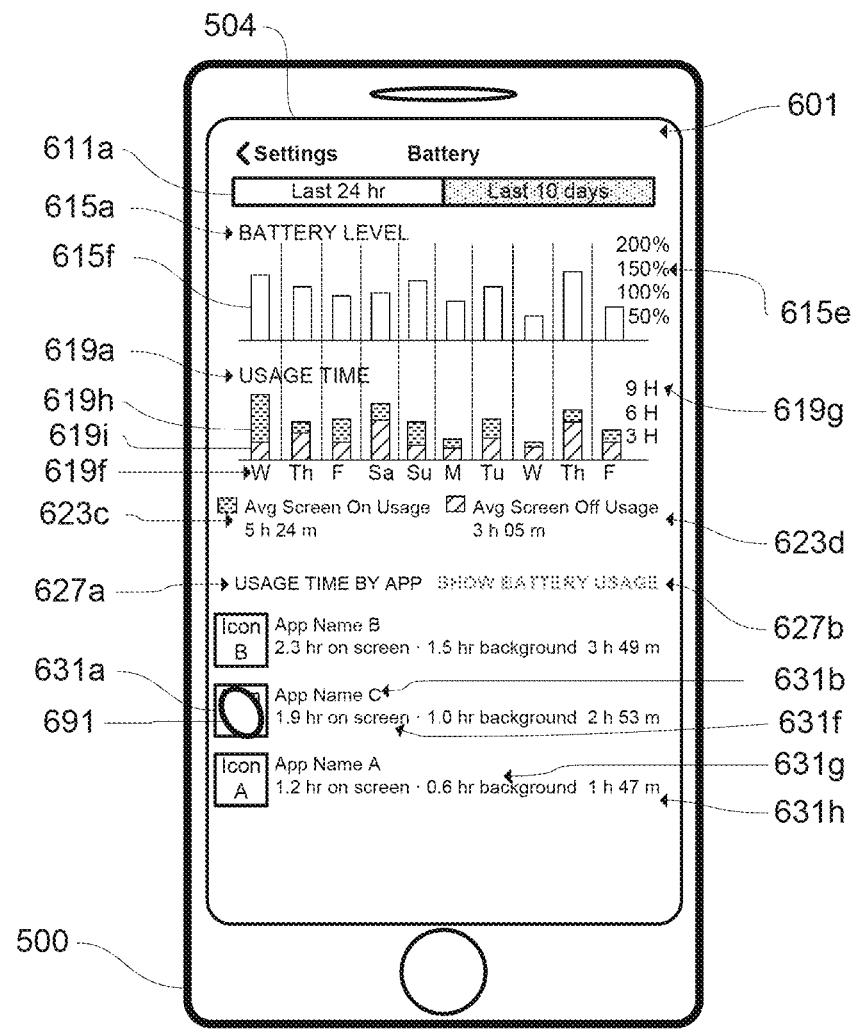
Figure 6S:
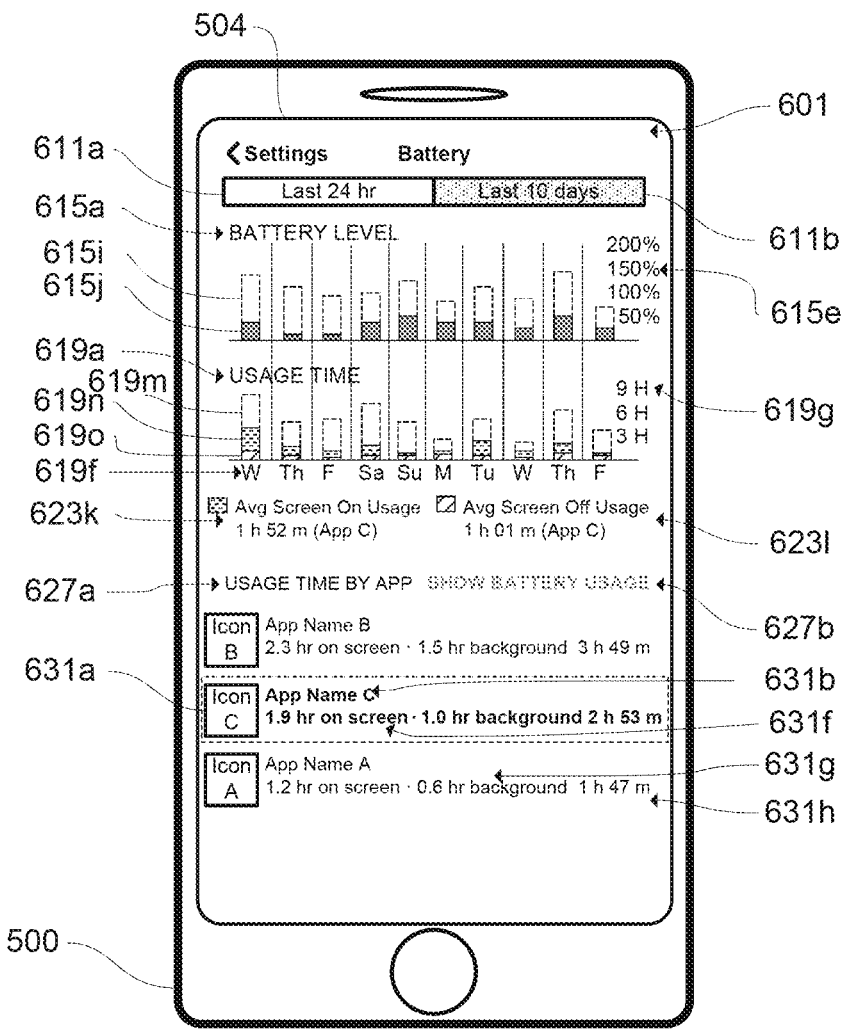

Returning to FIG. 6C, user interface 601 is optionally switchable from displaying battery usage information for all the applications (as in FIG. 6C) to displaying more detailed battery usage information for one or more selected applications. For example, in FIG. 6R, selection of the icon 631a corresponding to application C is detected (e.g., by a tap of contact 691 detected on the icon 631a, as shown in FIG. 6R). In response to the selection of the indicator 631a, the user interface 601 is updated to display more detailed battery usage information for application C, as shown in FIG. 6S. In FIG. 6S, the icon 631a that represents selected application C, the name 631b of selected application C, the total on-screen time 631f for selected application C during the currently-selected time period (e.g. 10 days), the total off-screen time 631*g* for selected application C during the currently-selected time period, and the sum 631*h* of the total on-screen time 631*c* and the total off-screen time 631*d* for selected application C during the currently-selected time period are optionally visually emphasized relative to analogous information for the other applications A and B.

Furthermore, as shown in FIG. 6S, each bar in battery level chart 615*a* is updated to be divided into a portion 615*j* that represents and corresponds to battery usage consumed by selected application C during the corresponding subperiod of time (if any) and a portion 615*i* that represents and corresponds to battery usage consumed by all applications other than selected application C during the corresponding subperiod of time (if any). The bars of the battery level chary 615*a* are optionally color-coded or marked such that portions of the bars that correspond to battery usage consumed by selected application C and portions of the bars that correspond to battery usage consumed by all applications other than selected application C are displayed with two different combinations of visual characteristics, such as being displayed with different colors (e.g. gray and white) or border styles (e.g. solid and dashed). For example, during the Sunday subperiod, approximately 50% of the total capacity of the battery was consumed by selected application C and 75% of the total capacity of the battery was consumed by all applications other than selected application C.

Finally, as shown in FIG. 6S, usage time chart 619*a* is updated to show the screen-on and screen-off usage time attributed to selected application C. In particular, one or more of the bars in usage time chart 619*a* are divided into a portion 619*n* that represents and corresponds to screen-on time attributed to selected application C during the corresponding subperiod of time (if any), a portion 6190 that represents and corresponds to screen-off time during the corresponding subperiod of time (if any), and a portion 619*m* that represents and corresponds to the total screen-on time and screen-off time attributed to all applications other than selected application C. In some embodiments, portion 619*m* is visually deemphasized relative to portions 619*n* and 6190 that correspond to selected application C. For example, the bar corresponding to the Sunday subperiod includes both screen-on and screen-off usage attributed to selected application C as well as total screen-on time and screen-off time attributed to all applications other than selected application C, and is thus divided into three portions representing all three types of usage. The bars of the bar graph are optionally color-coded or marked such that portions of the bars that correspond to display-on usage attributed to selected application C, portions of the bars that correspond to display-off usage attributed to selected application C, and portions of the bars that correspond to the total display-on usage and display-off usage attributed to all applications other than selected application C are displayed with three different combinations of visual characteristics, such as being displayed with different colors (e.g. green, blue, and white) or border styles (e.g. solid and dashed). The average display-on usage 623*k* per subperiod of time attributed to selected application C and the average display-off usage 6231 per subperiod of time attributed to selected application C for the currently-selected time period are optionally also displayed, as shown in FIG. 6S, instead of the average display-off usage and average display-on usage attributed to all applications as in FIG. 6C.

Figure 6T:
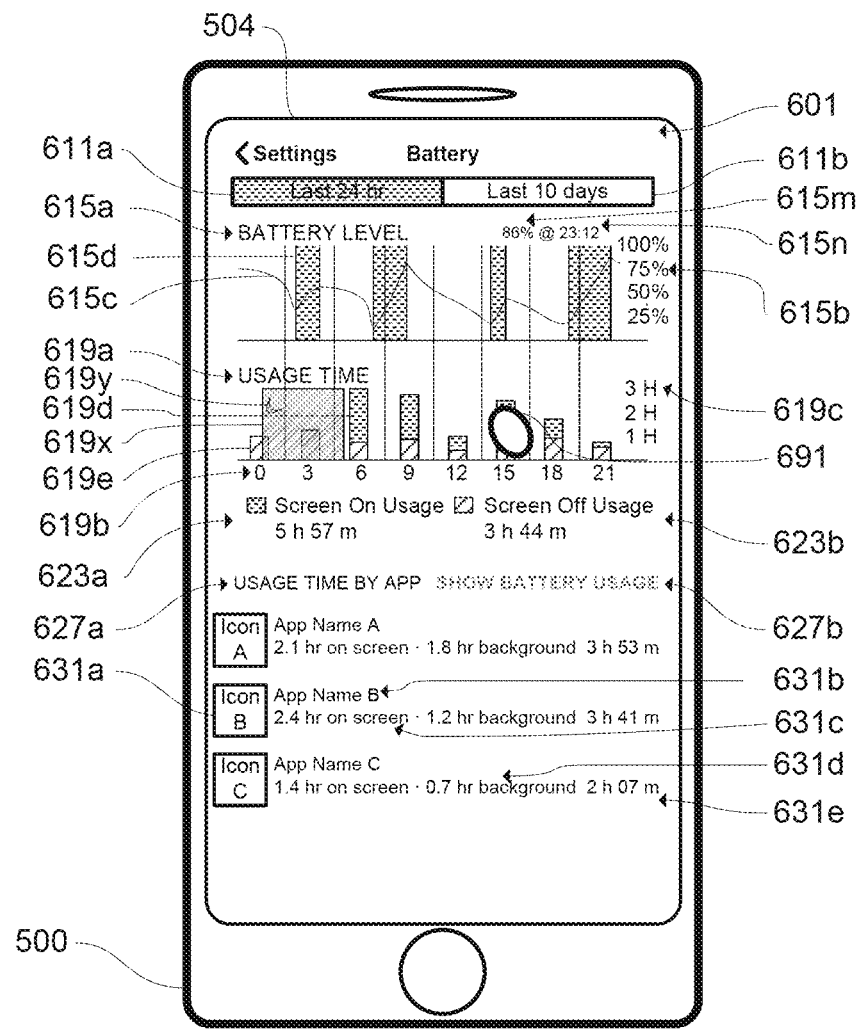

Returning to FIG. 6A, user interface 601 is optionally switchable from displaying battery usage information across the currently-selected time period (as in FIG. 6A) to displaying battery usage information for one or more selected subperiods within the currently-selected time period. For example, in FIG. 6T, selection of the bar (e.g., bar portion 619*d* and/or bar portion 619*e*) corresponding to the 15$^{th}$ hour in usage time chart 619*a* is detected (e.g., by a tap of contact 691 detected on bar portion 619*d* and/or bar portion 619*e* corresponding to the 15$^{th}$ hour, as shown in FIG. 6T). In response to the selection of bar portion 619*d* and/or bar portion 619*e* corresponding to the 15$^{th}$ hour, the user interface 601 is updated to display battery usage information for the 15$^{th}$ hour, as shown in FIG. 6U.

Figure 6U:
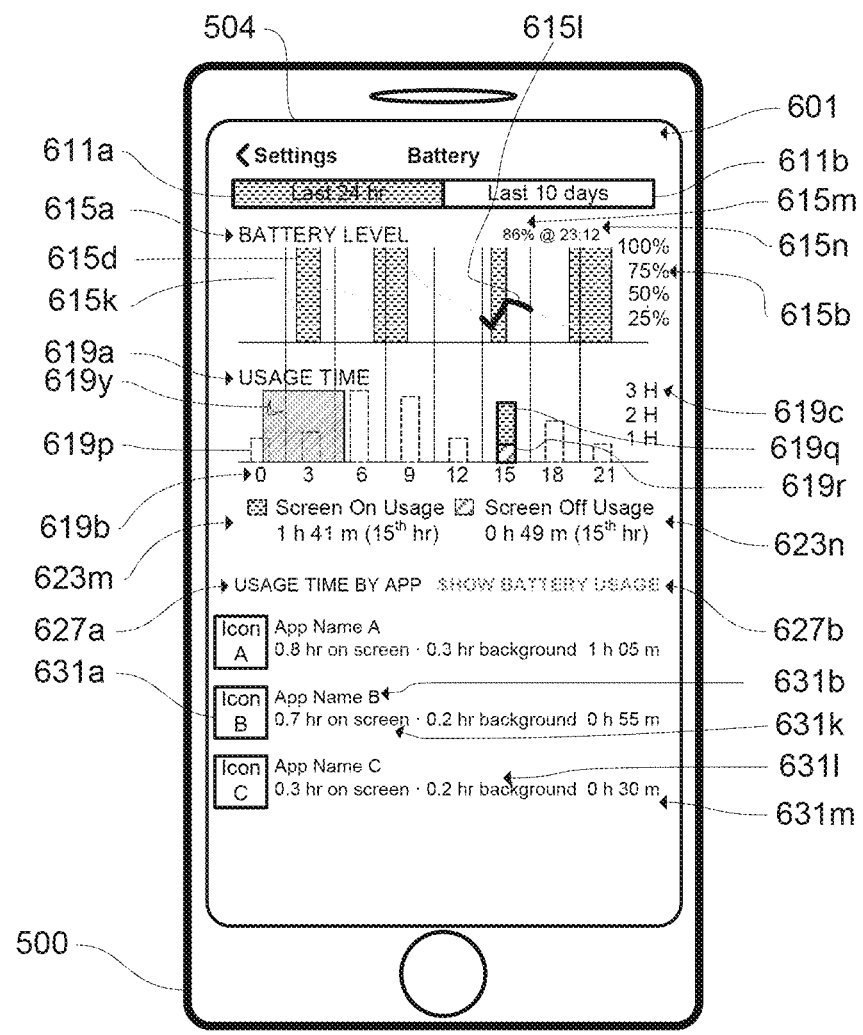

In FIG. 6U, the section 6151 of the battery level line that corresponds to the selected subperiod (e.g. 15$^{th}$ hour) and the sections 615*k* of the battery level line that correspond to subperiods of the currently-selected time period other than the selected subperiod are optionally visually emphasized or deemphasized, respectively, relative to each other and/or to battery level line 615*c* that corresponds to displaying battery usage information across the currently-selected time period when no subperiod is selected, as shown in FIG. 6A. In particular, in some embodiments, the section 6151 of the battery level line that corresponds to the selected subperiod (e.g. 15$^{th}$ hour) is optionally visually emphasized (e.g., thicker, in color vs. grayscale for the other portions, etc.) relative to the sections 615*k* of the battery level line that correspond to subperiods of the currently-selected time period other than the selected subperiod. In some embodiments, the section 6151 of the battery level line that corresponds to the selected subperiod, as shown in FIG. 6U, is further visually emphasized (e.g. by thickening) relative to battery level line 615*c* that corresponds to displaying battery usage information across the currently-selected time period, as shown in FIG. 6A. In some embodiments, the sections 615*k* of the battery level line that correspond to subperiods of the currently-selected time period other than the selected subperiod, as shown in FIG. 6U, is further visually deemphasized (e.g. by thinning, by lightening) relative to battery level line 615*c* that corresponds to displaying battery usage information across the currently-selected time period, as shown in FIG. 6A.

Furthermore, as shown in FIG. 6U, usage time chart 619*a* is optionally updated to visually emphasize the bar portions that correspond to the selected subperiod relative to those that correspond to subperiods of the currently-selected time period other than the selected subperiod. In some embodiments, a bar portion 619*q* that represents and corresponds to screen-on time during the selected subperiod of time (if any) and a bar portion 619*r* that represents and corresponds to screen-off time during the selected subperiod of time (if any), as shown in FIG. 6U, are further visually emphasized (e.g. by thickening the borders, being rendered in color, etc.) relative to bars corresponding to unselected time periods (e.g., which are optionally rendered with thinner lines, in grayscale as opposed to color, etc.). In some embodiments, usage time chart 619*a* includes bars 619*p* that represent and correspond to the sum of screen-on time and screen-off time during each subperiod of the currently-selected time period other than the selected subperiod, as shown in FIG. 6U, instead of bar portions 619*d* that represent and correspond to screen-on time during the corresponding subperiod of time (if any) and bar portion 619*e* that represent and correspond to screen-off time during the corresponding subperiod of time (if any) as in FIG. 6A. In some embodiments, bars 619*p*, as shown in FIG. 6U, are further visually deemphasized (e.g. by using dashes as the borders, by lightening the interior) relative to bar portions 619*d* and 619*e* that represents and corresponds to screen-on time and screen-off time, respectively, during the selected subperiod of time (if any) while displaying battery usage information across the currently-selected time period, as shown in FIG. 6A.

The sum of display-on usage 623m and the sum of display-off usage 623n for the selected subperiod within the currently-selected time period are optionally also displayed, as shown in FIG. 6U, instead of the sum of display-on usage 623a and the sum of display-off usage 623b across the entirety of the currently-selected time period as in FIG. 6A.

Finally, as show in FIG. 6U, the information displayed for each application in application list 627a is optionally updated to display battery usage information for the one or more selected subperiods within the currently-selected time period. In some embodiments, the total on-screen time 631k for an application during the one or more selected subperiods within the currently-selected time period is displayed instead of the total on-screen time 631c for the application across the entirety of the currently-selected time period as in FIG. 6A. In some embodiments, the total off-screen time 631l for an application during the one or more selected subperiods within the currently-selected time period is display instead of the total off-screen time 631d for the application across the entirety of the currently-selected time period as in FIG. 6A. In some embodiments, the sum 631m of the total on-screen time 631k and the total off-screen time 631l for the application during the one or more selected subperiods within the currently-selected time period is displayed instead of the sum 631e of the total on-screen time 631c and the total off-screen time 631d for the application across the entirety of the currently-selected time period as in FIG. 6A. For example, as shown in FIG. 6U, during the 15$^{th}$ hour subperiod, application A ("App Name A") has had 0.8 hours of on-screen time and 0.3 hours of off-screen time (or "background" time), for a total of 1 hour and 5 minutes of usage time; application B ("App Name B") has had 0.7 hours of on-screen time and 0.2 hours of off-screen time, for a total of 55 minutes of usage time; and application C ("App Name C") has had 0.3 hours of on-screen time and 0.2 hours of off-screen time, for a total of 30 minutes of usage time. Applications A, B, and C are listed in descending order of their corresponding total usage times: 1 hour and 5 minutes, 55 minutes, and 30 minutes, respectively.

Figure 6V:
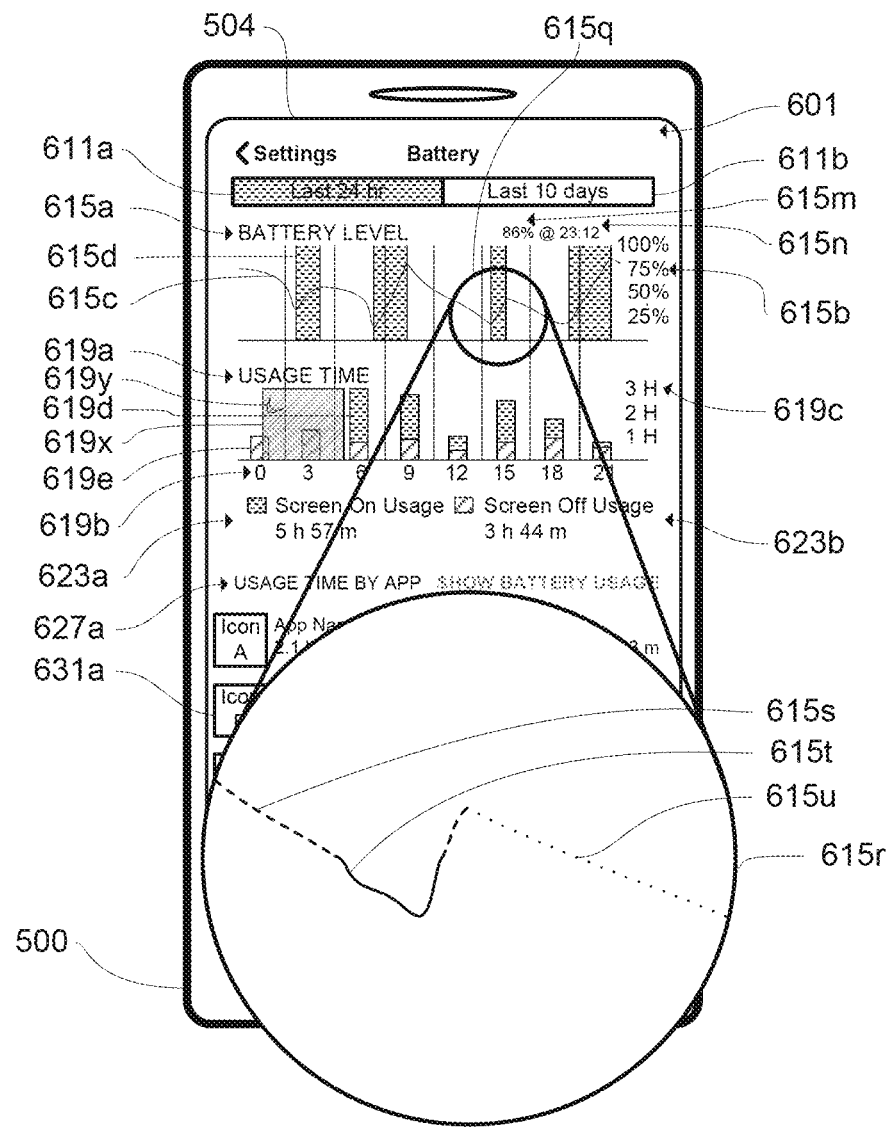

FIG. 6V illustrates a magnified view 615r of portion 615q of battery level chart 615a. In some embodiments, portions of battery level line 615c are displayed with different visual characteristics depending on the operating state and/or the battery level of electronic device 500 during the times corresponding to those portions. For example, when electronic device 500 is operating in a low power mode at the respective time during which one or more functions or components of electronic device 500 operate at less than full speed, such as at slower speeds or not at all, the respective portion 615u of the battery level is displayed with a first visual characteristic (e.g., the portion of the battery level line chart is color-coded yellow).

In some embodiments, combinations of the operating state of electronic device 500 and the battery level of the electronic device determine the visual characteristics of the corresponding portions of battery level line 615c. For example, when the operating state of electronic device 500 at the respective time is a normal power mode during which the one or more functions or components of electronic device 500 operate at their regular or full speed, the visual characteristic of the battery level line optionally depends on the level of the power source. When the level of the power source at the respective time is above a level threshold (e.g., more than 5%, 10%, 15%, 20%, 25%, etc. battery level), the respective representation is optionally displayed with a second visual characteristic (e.g., the portion 615s of the battery level line chart is color-coded green), and when the level of the power source at the respective time was below the level threshold (e.g., less than 5%, 10%, 15%, 20%, 25%, etc. battery level), the respective representation is optionally displayed with a third visual characteristic (e.g., the portion 615t of the battery level line chart is color-coded red). The above-described differentiated display of portions of battery level chart 615a based on device operating mode and/or battery level is optionally used in any or all of the battery level charts 615a described herein, such as in FIG. 6V.

Figure 6W:
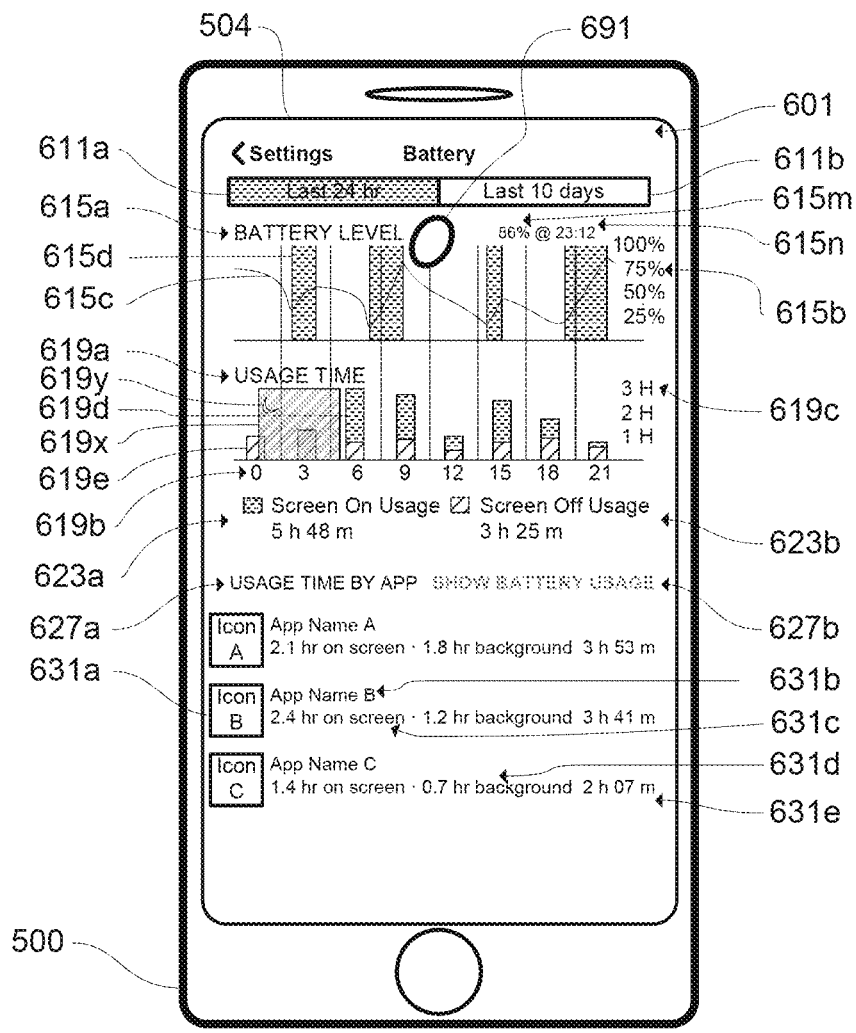
Figure 6X:
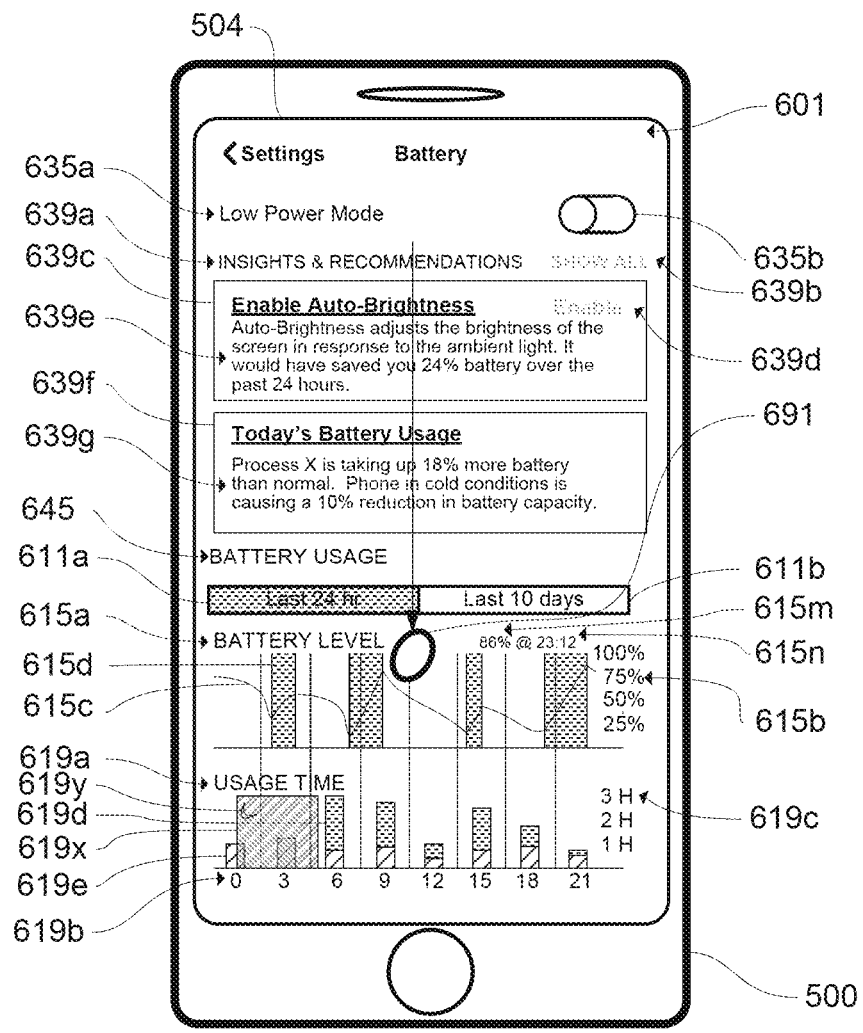

Returning to FIG. 6A, user interface 601 is optionally switchable from displaying battery usage information (as in FIG. 6A) to also displaying one or more representations of recommendations to reduce the usage of power by the electronic device. For example, in FIGS. 6W-6X, device 500 detects an upward scrolling of user interface 601 (e.g., via a downward swipe of contact 691 detected on touch screen 504), and in response, scrolls the display of the battery usage information by a displacement equal to the displacement of the swipe of contact 691 and displays one or more representations of recommendations to reduce the usage of power by the electronic device, as shown in FIG. 6Y.

Figure 6Y:
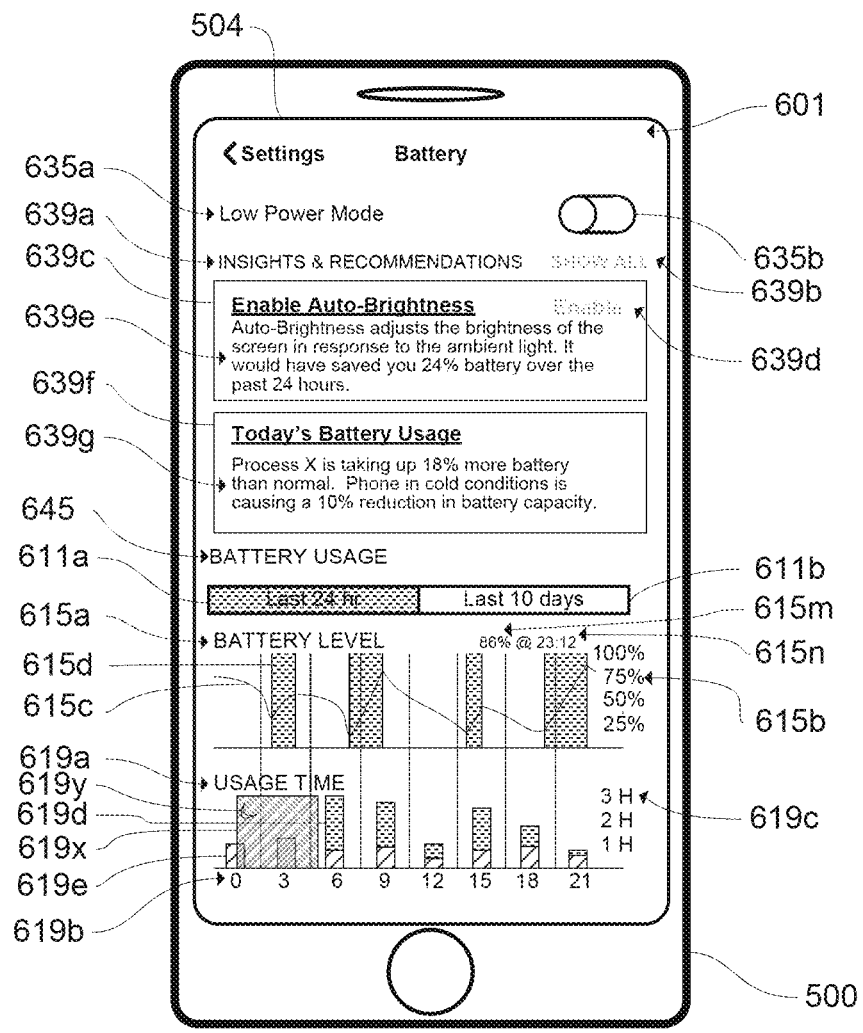

As shown in FIG. 6Y, user interface 601 displays one or more representations of recommendations to reduce the usage of power by electronic device 500. In some embodiments, user interface 601 includes a "low power mode" icon 635a along with a switch 635b. When the user toggles switch 635b, electronic device 500 enters a "low power mode" that optionally includes setting various processes in electronic device 500 to consume less power than when "low power mode" is not toggled.

The one or more representations of recommendations to reduce the usage of power by electronic device 500 optionally includes text 639c describing what setting on device 500 to change that would reduce power usage. In some embodiments, text 639c refers to reducing brightness of display 504 of electronic device 500, enabling auto-brightness for display 504 to set display brightness based on ambient brightness, enabling auto-lock to automatically turn off display 504 after a period of inactivity or to reduce that set period of inactivity, changing location setting for applications with high background location usage to reduce or eliminate the ability of one or more applications to check the location of electronic device 500 while those applications are not running, changing the background setting for applications with high background CPU usage to reduce or eliminate the ability of one or more applications to run in the background, changing mail account settings if there is high power drain due to push email settings or frequent fetching of emails, and changing an option to set less aggressive cellular network searching when the electronic device is in a low signal area. For example, as shown in FIG. 6Y, the text 639c reads "enable auto-brightness." A description 639e explains what enabling the "auto-brightness" recommendation does: auto-brightness, in the embodiment of FIG. 6Y, adjusts the brightness of display 504 in response to the ambient light.

In some embodiments, the recommendations are displayed with information about how much of the power source (e.g., a percentage of the power source, a time-capacity of the power source, etc.) would have been conserved over the current time period (today or last 10 days) had the recommendation corresponding to text 639c been in effect. As shown in FIG. 6Y, enabling auto-brightness would have saved the user 24% battery over the last 24 hours. In some embodiments, respective ones of the recommendations are dismissible by the user.

Figure 6Z:
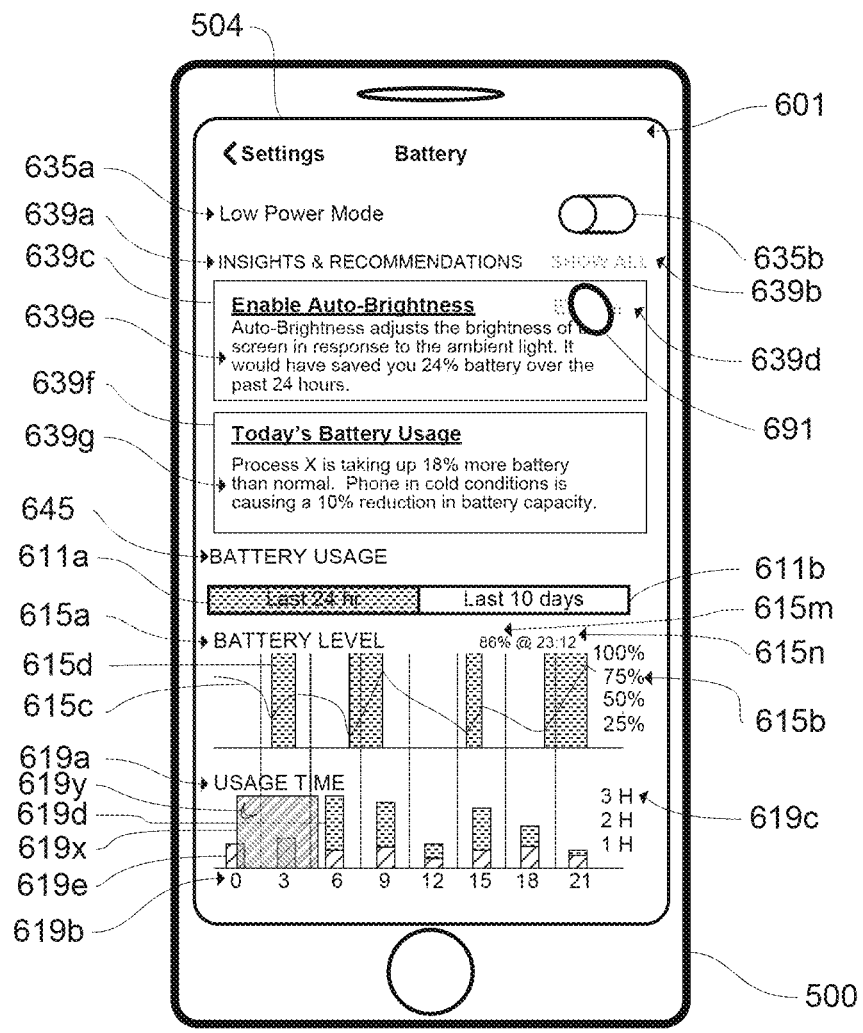
Figure 6A:
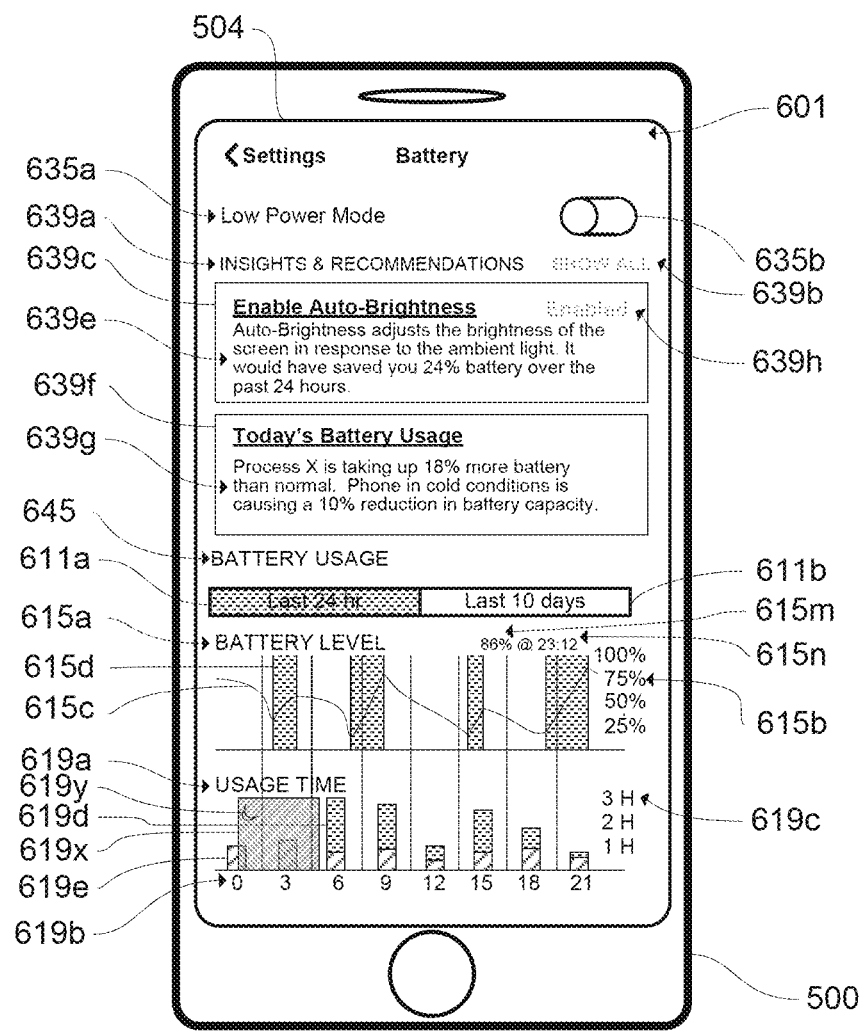
Figure 6B:
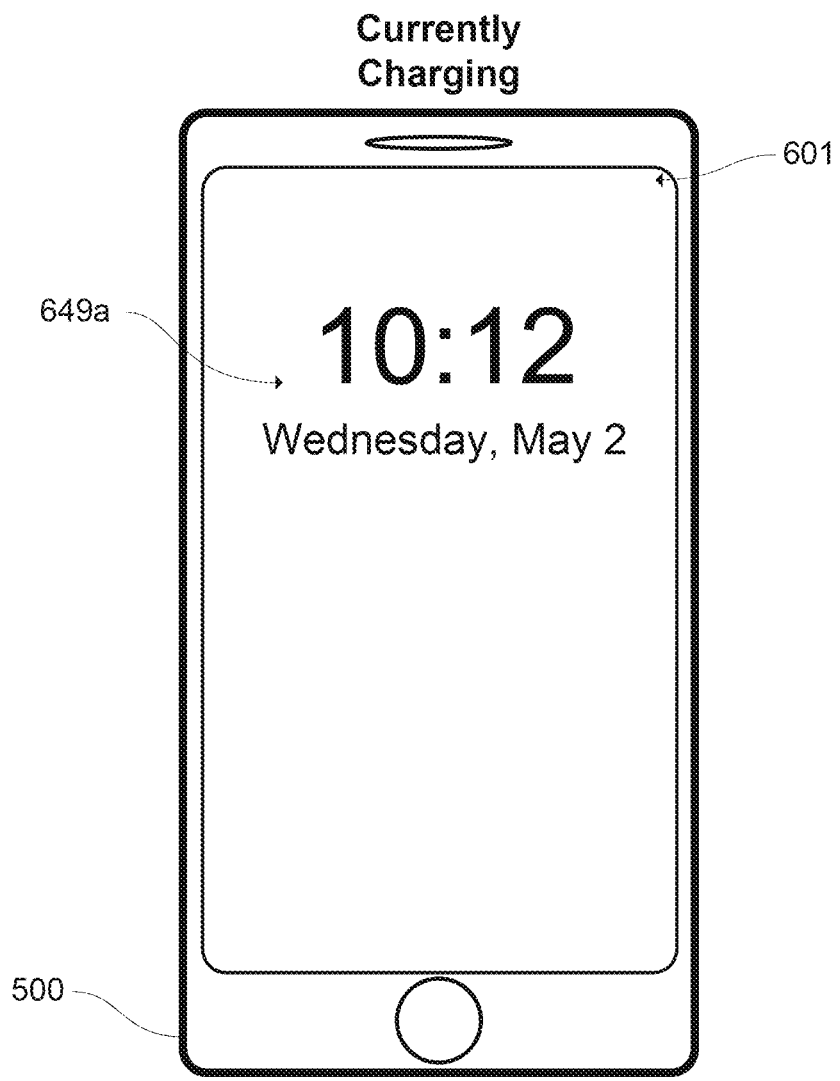
Figure 6C:
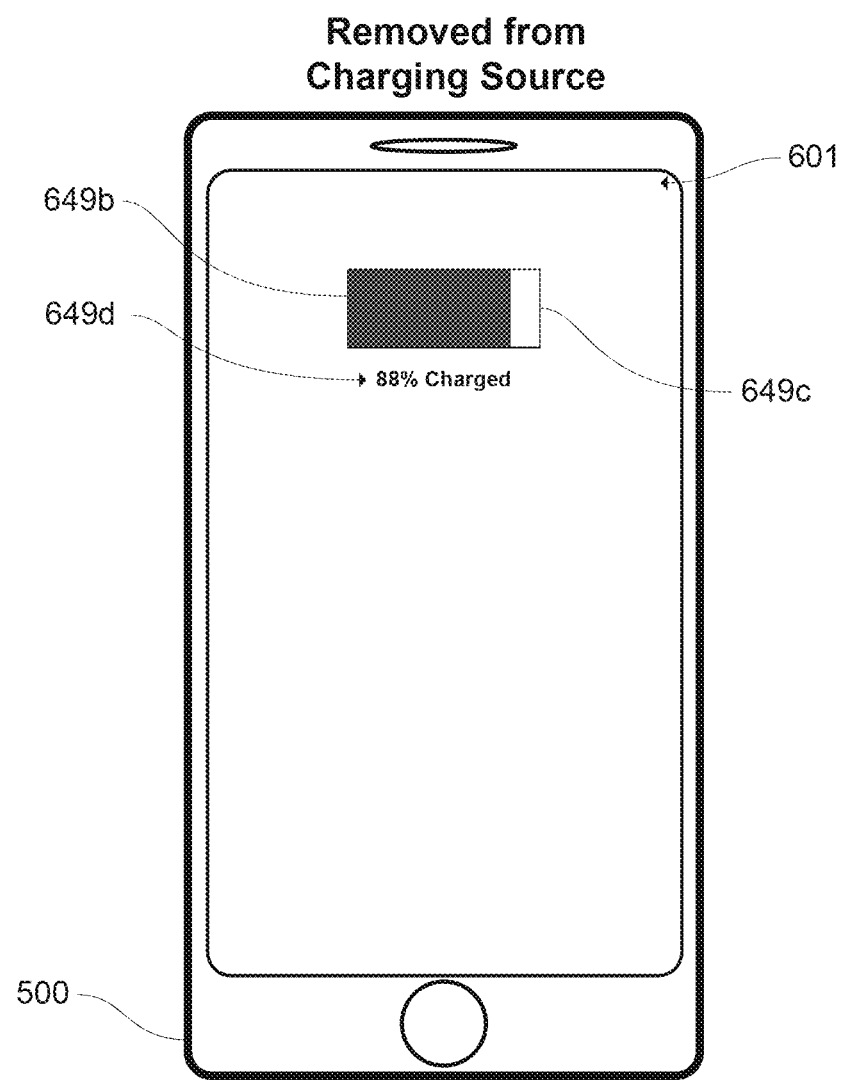

In some embodiments, in response to receiving input corresponding to a request to apply the respective recommendation, electronic device 500 applies the respective recommendation to electronic device 500 (e.g. applying the power-saving recommendation and optionally indicating that the recommendation has been implemented by changing an appearance of the selectable affordance for applying the recommendation, such as by updating an "enable" affordance to "enabled"). For example, as shown in FIG. 6Y, an "enable" affordance 639d allows the user to enable the recommendation corresponding to text 639c. Selecting the affordance 639d labeled "enable" optionally enables the "auto-brightness" recommendation. For example, in FIG. 6Z, selection of affordance 639d which displays "enable" is detected (e.g., by a tap of contact 691 detected on affordance 639d, as shown in FIG. 6Z). In response to the selection of affordance 639d, affordance 639d is updated to display "enabled" (and is optionally no longer selectable) and electronic device 500 implements the recommendation as shown in FIG. 6AA without leaving user interface 601. In some embodiments, the above recommendations are displayed concurrently with respective selectable affordances (as just described) that, when selected, cause the corresponding power-saving change to be implemented on electronic device 500. In some embodiments, this change is implemented without leaving user interface 601 in which the recommendations are displayed (as shown in FIGS. 6Z-6AA).

User interface 601 in FIG. 6AA also displays one or more representations 639f of information indicating causes of the usage of power by electronic device 500 (e.g. prose/natural language descriptions of conditions that are causing the device to use more or less battery than usual or than expected and optionally include an indication of when the conditions will end, such as after an initial cloud backup or indexing operation is complete, or how to avoid the conditions, such as by turning down screen brightness or accessing a Wi-Fi network). In some embodiments, a representation 639f displays the currently-selected time period over which information indicating causes of the usage of power is gathered. For example, in FIG. 6AA, representation 639f reads "today's battery usage," indicating information gathered over the last 24 hours.

In some embodiments, the one or more representations 639f include a representation of information indicating one or more temporary processes on electronic device 500 that used power during the currently-selected period of time (e.g. which applications are consuming more battery than usual or are consuming more battery than other applications are, restoration/backup operations occurring on the device that don't normally occur but are consuming battery during the current time period, uploading of photos from the device to a cloud storage account). For example, in FIG. 6AA, text 639g includes the statement "process X is taking up 18% more battery than normal."

In some embodiments, the one or more representations 639f include a representation of information indicating an environmental condition of electronic device 500 that is affecting the usage of power of electronic device 500 (e.g. low ambient temperature causing a reduction in the capacity of the battery, ambient humidity causing a reduction in the capacity of the battery, poor cellular signal causing the device to use more power to search for the cellular signal than normal). For example, in FIG. 6AA, text 639g includes the statement "phone in cold conditions is causing a 10% reduction in battery capacity."

Finally, in some embodiments, the one or more representations 639f include a representation of information indicating a deviation in normal usage of electronic device 500 that is affecting the usage of power of electronic device 500 (e.g. an indication that the user is interacting with/using the device more than usual, such as after a hardware or software upgrade, an indication that there is higher usage of power by electronic device 500 after setting the display to a higher resolution, an indication that there is higher usage of electronic device 500 after leaving Wi-Fi/Bluetooth on for a continuous period of time).

User interface 601 optionally displays one set of information when electronic device 500 is charging and a different set of information when electronic device 500 is removed from the charging source. For example, as shown in FIG. 6BB, when electronic device 500 is currently charging (e.g., via wired charging, wireless charging, etc.), user interface 601 displays the current time and date 649a. Upon detection that electronic device 500 has been removed from a charging source (e.g. unplugged from a charging cable, removed from a wireless charging source), user interface 601 optionally displays an indication of a level of charge 649d of a power source (e.g., battery) of electronic device 500 (e.g. actual percentage of maximum battery level charged up, a shaded bar 649b whose shaded area corresponds to percentage of maximum battery level 649c charged up) for a predetermined time period (e.g., 3, 5, or 7 seconds). Thus, in some embodiments, as shown in FIG. 6CC, electronic device 500 displays (optionally, on a wake or lock screen of electronic device 500), for a period of time (e.g., 3, 5, or 7 seconds) after being removed from a charging source, an indication of the battery level 649d (e.g. 88%) at the time charging stopped. In some embodiments, the device only displays this indication if the battery level is less than 100% (e.g., fully charged), and otherwise does not display this indication.

Figure 7A:
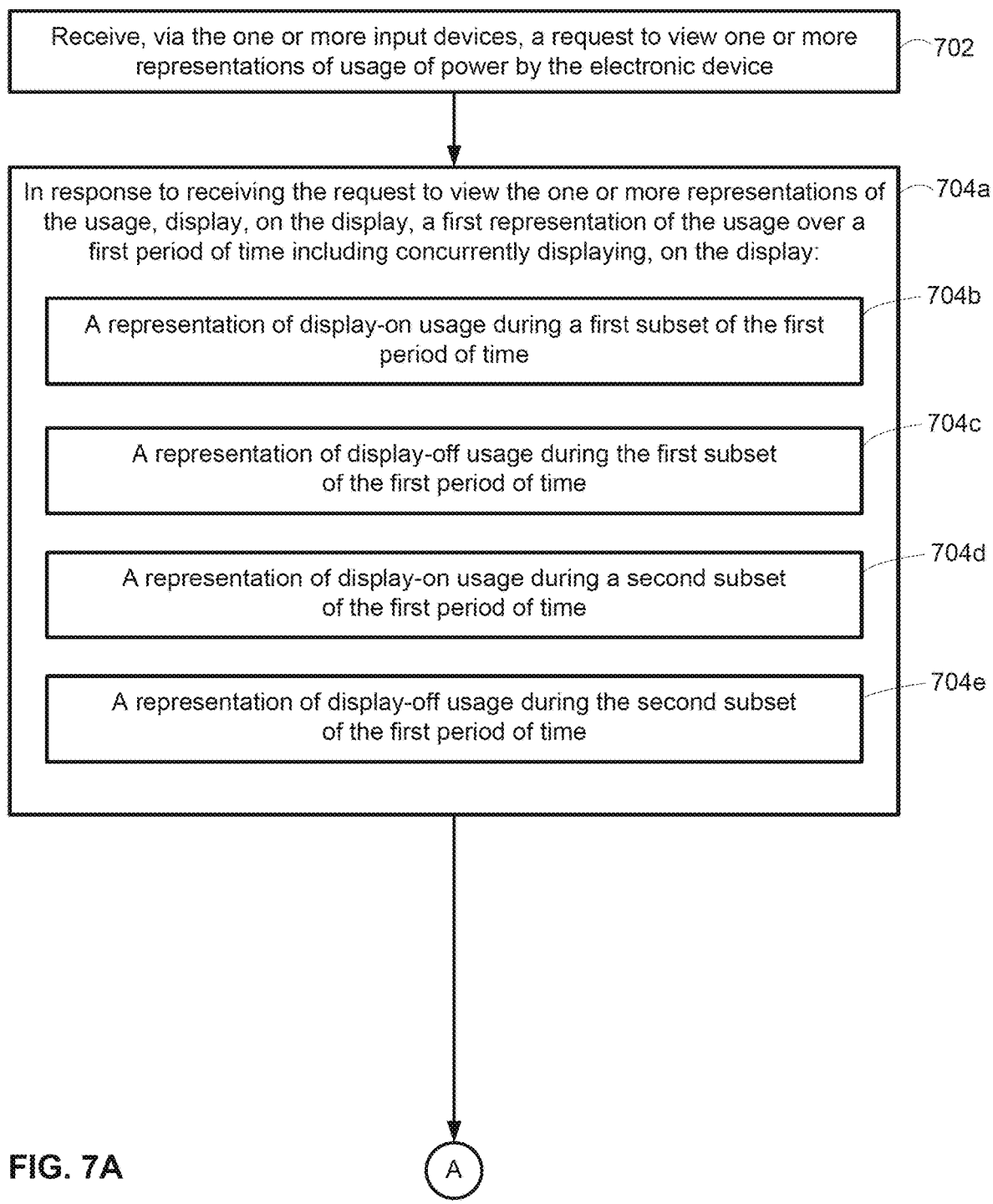
FIGS. 7A-7Q are flow diagrams illustrating a method of displaying battery status and screen time usage for time periods and applications in accordance with some embodiments.
Figure 7B:
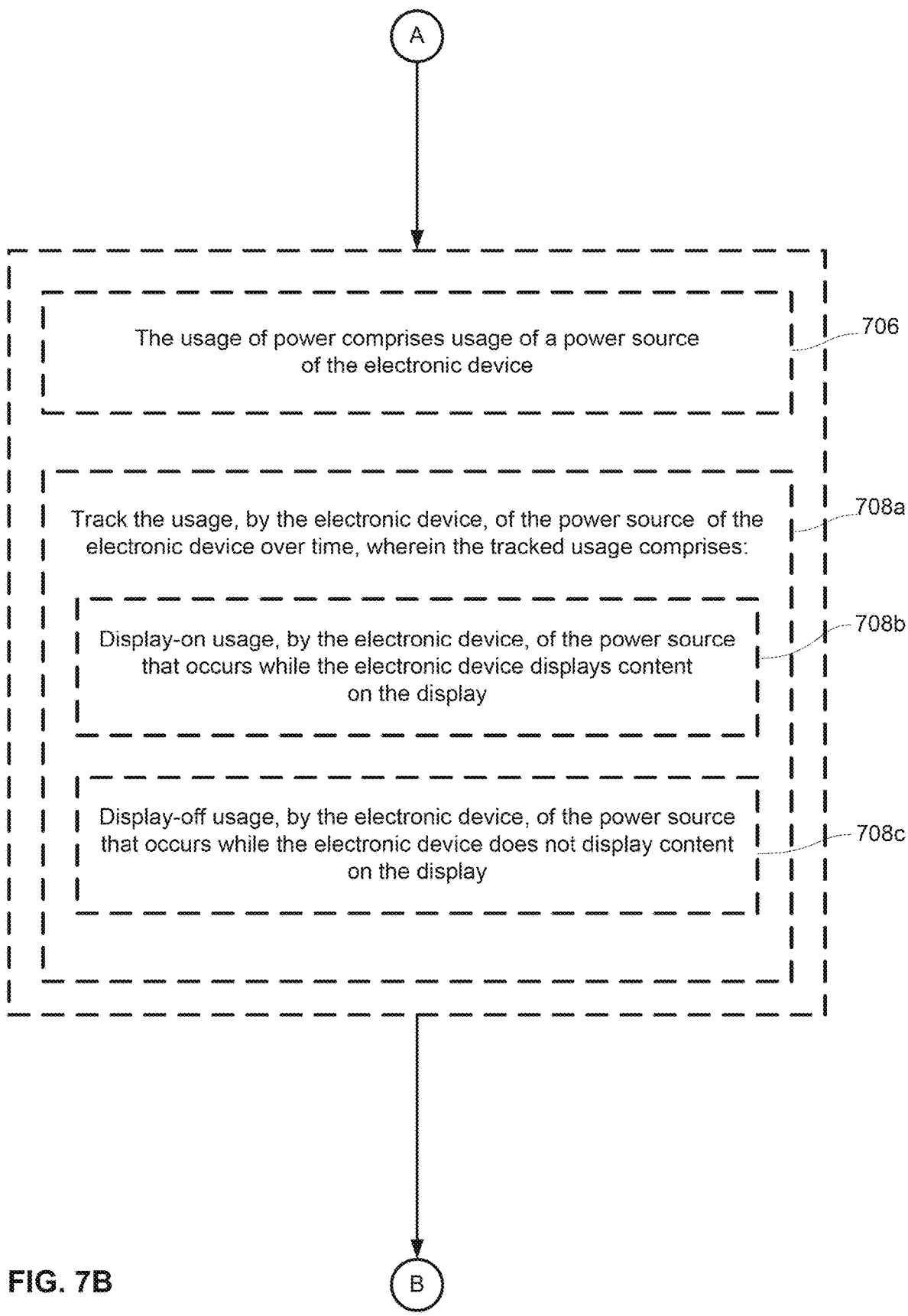
Figure 7C:
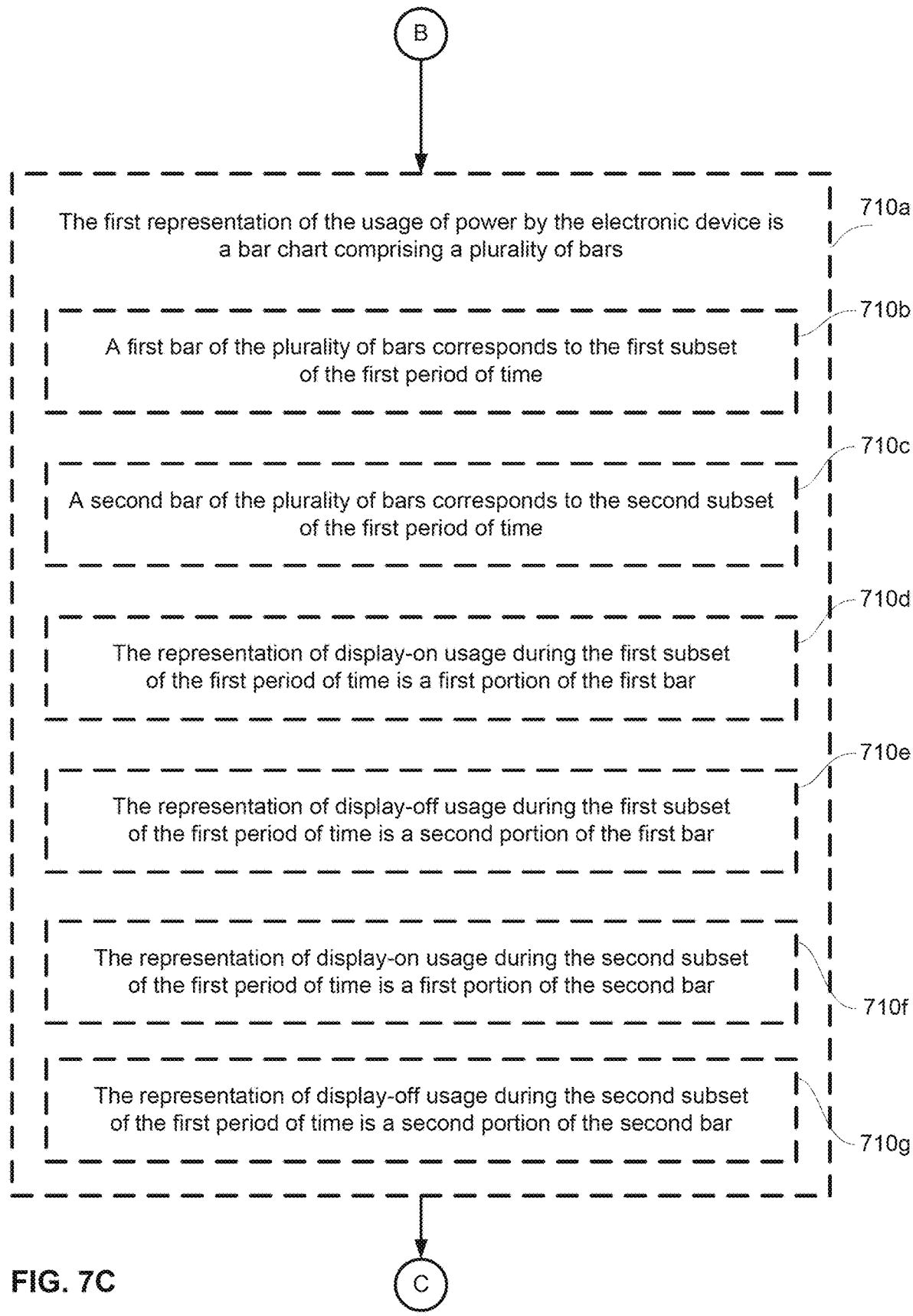
Figure 7D:
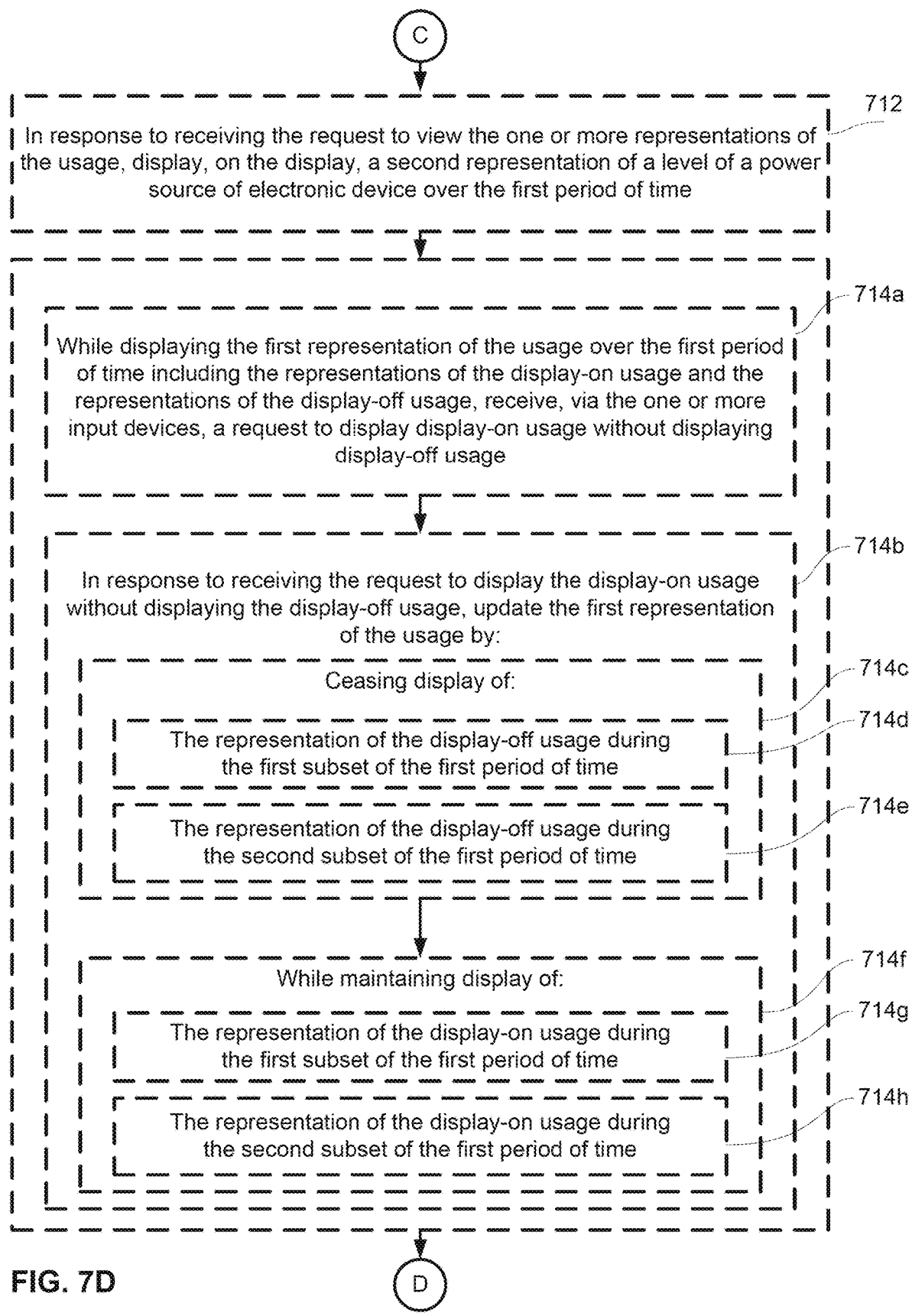
Figure 7E:
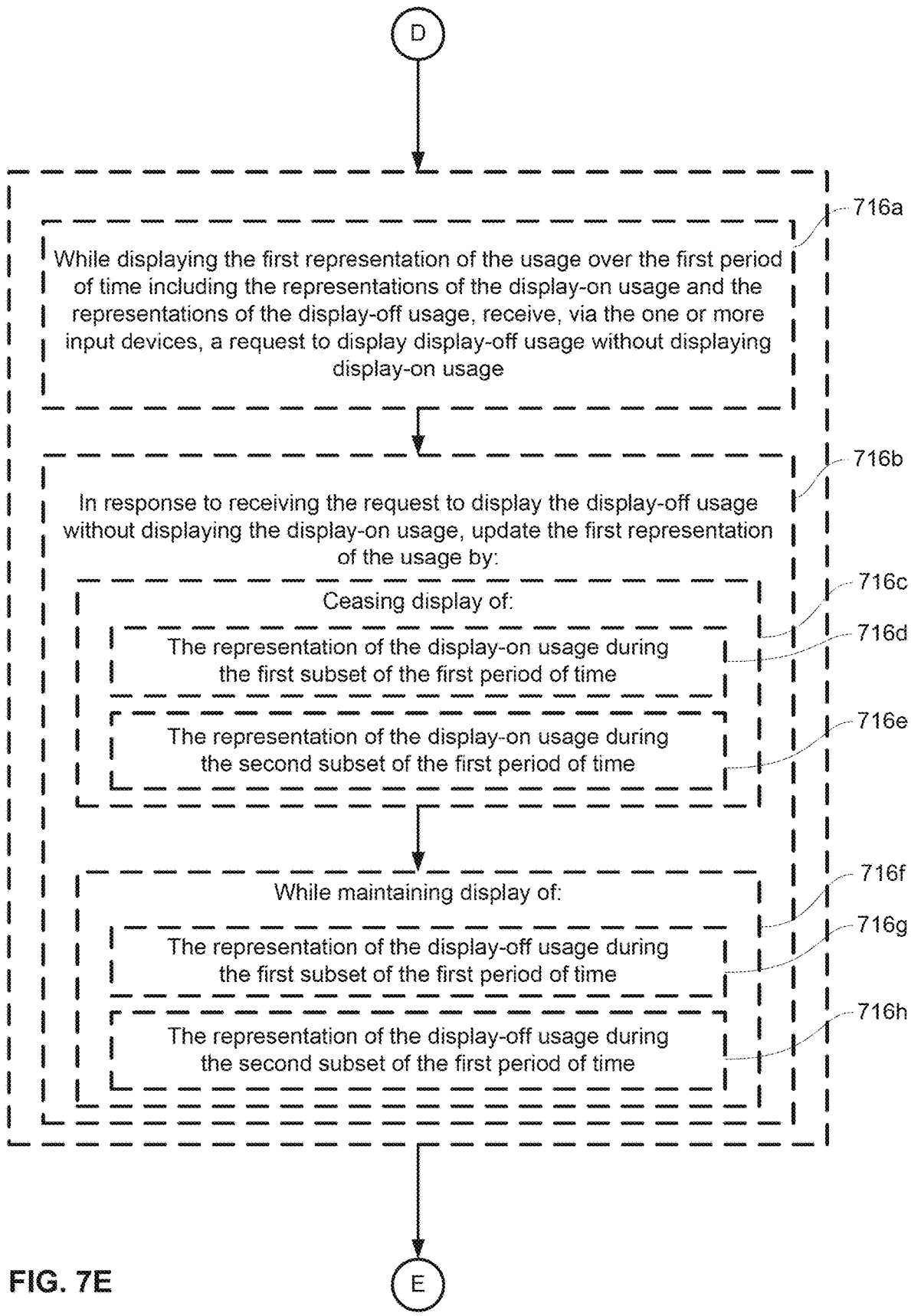
Figure 7F:
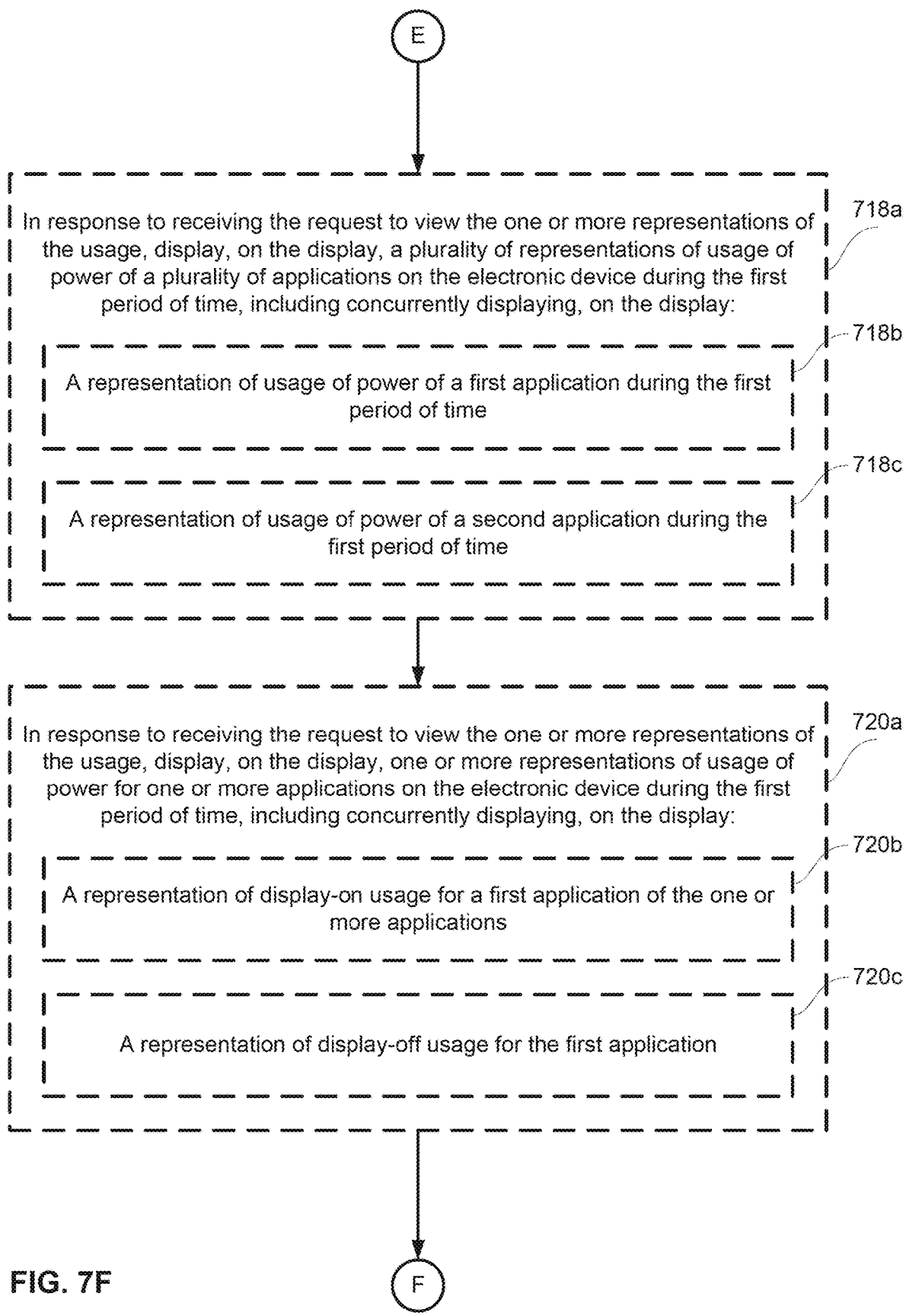
Figure 7G:
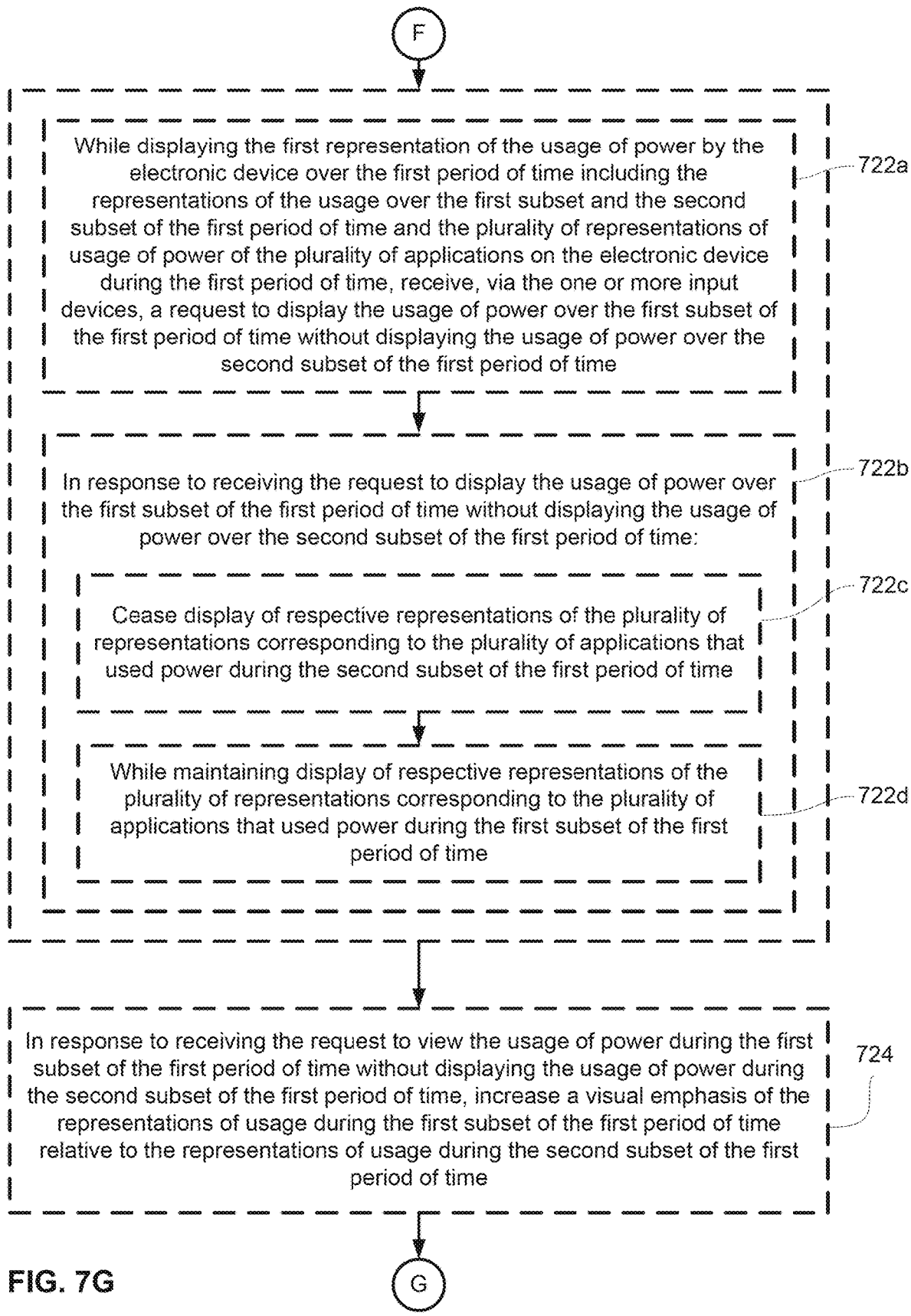
Figure 7H:
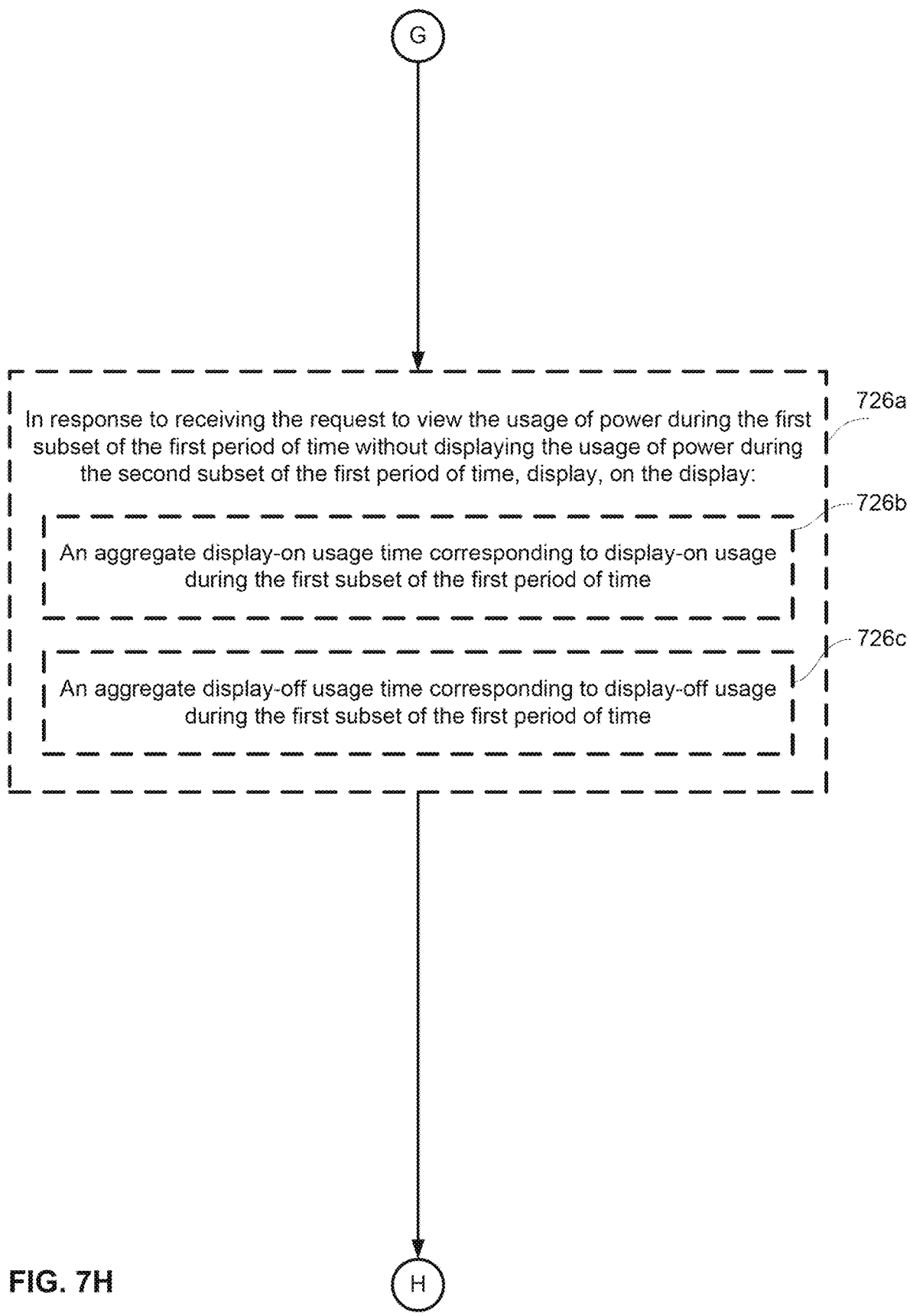
Figure 7I:
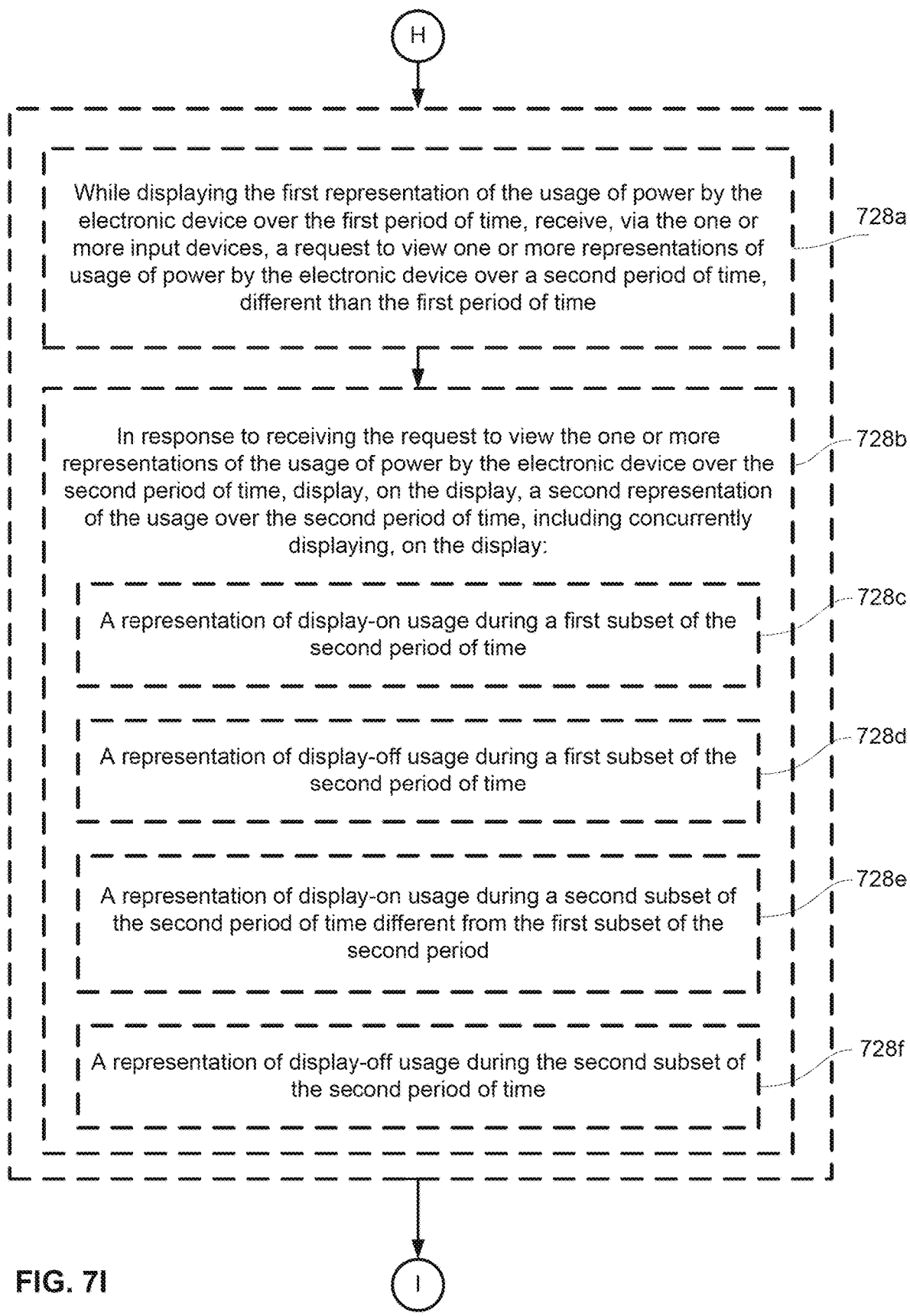
Figure 7J:
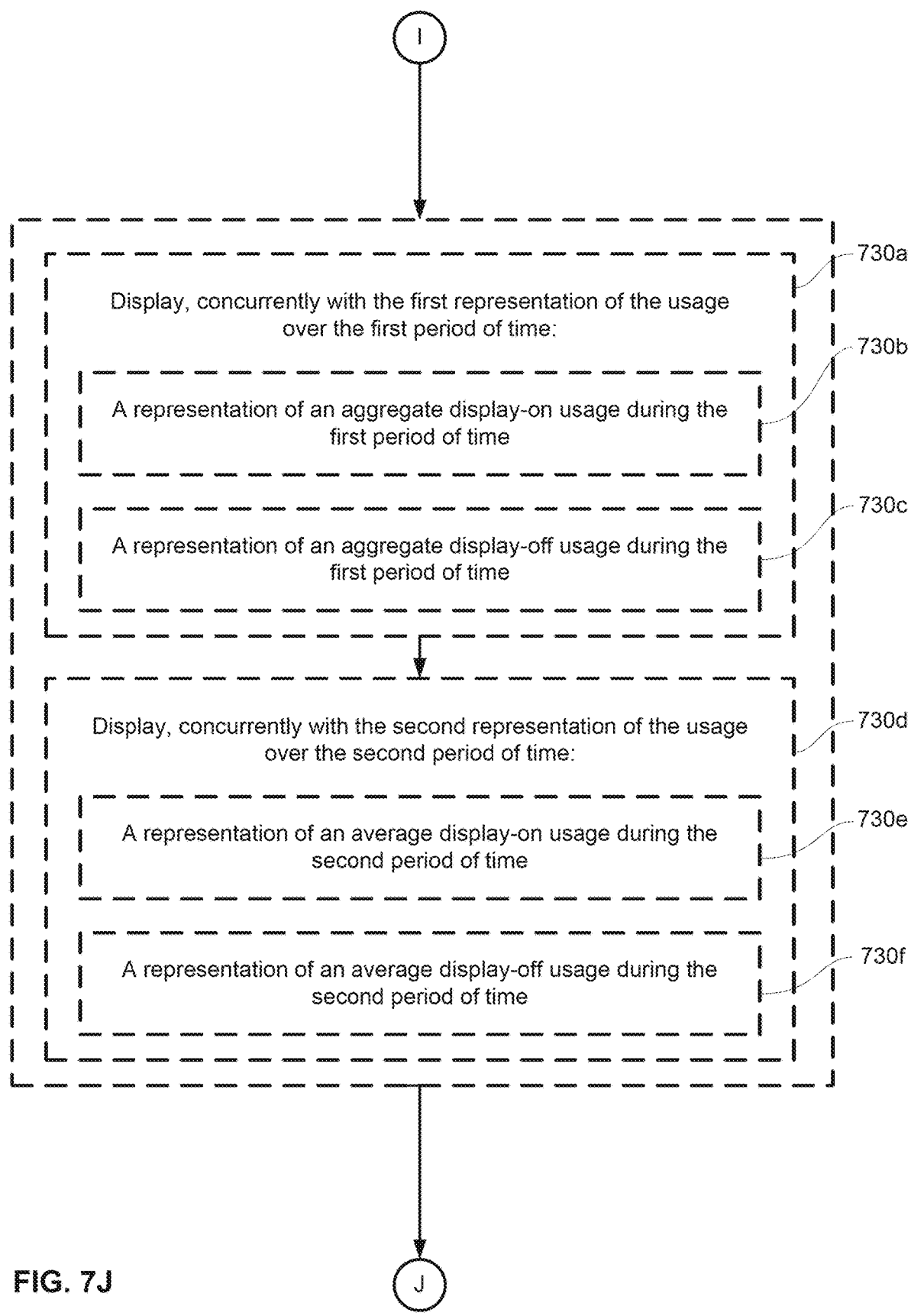
Figure 7K:
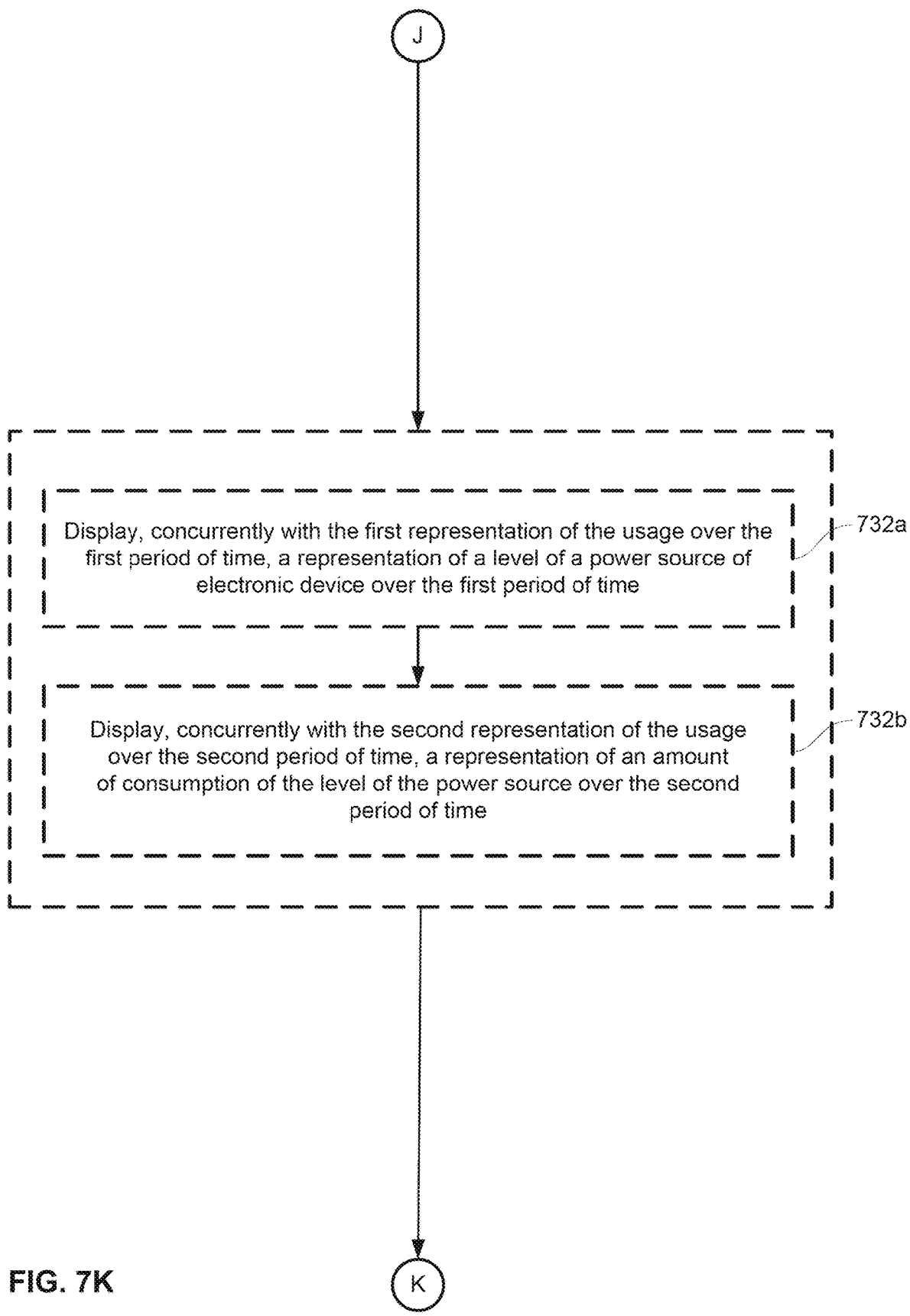
Figure 7L:
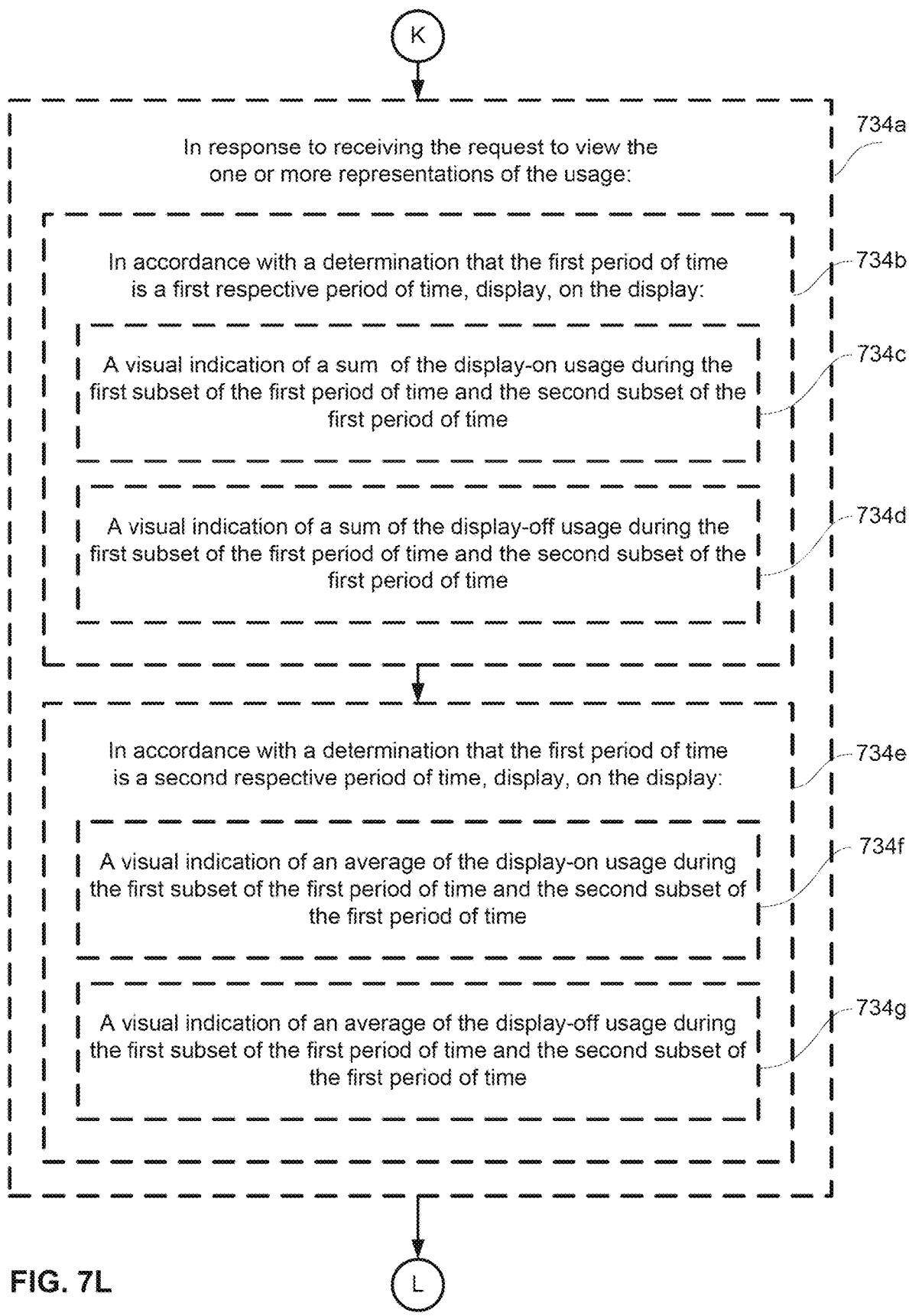
Figure 7M:
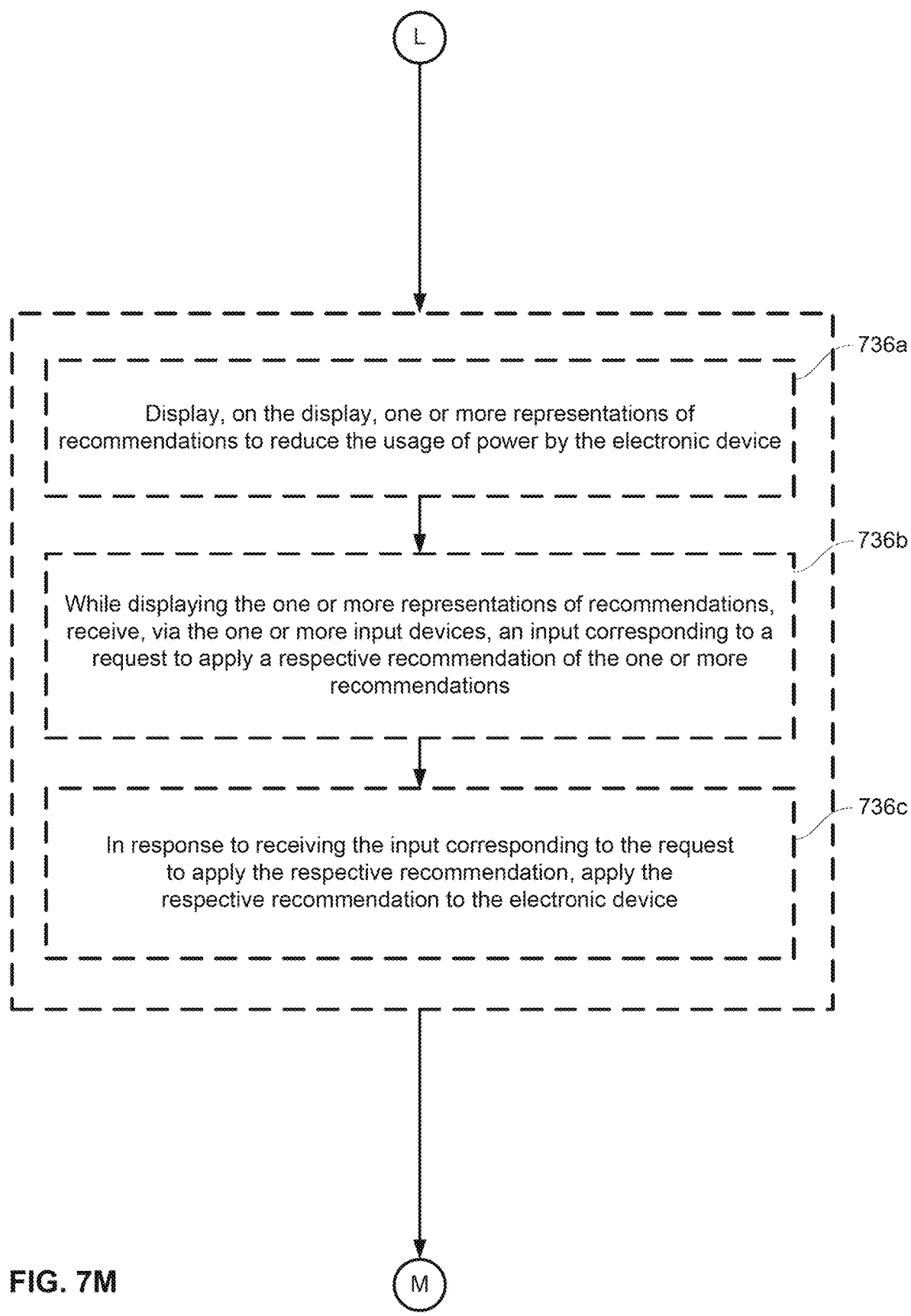
Figure 7N:
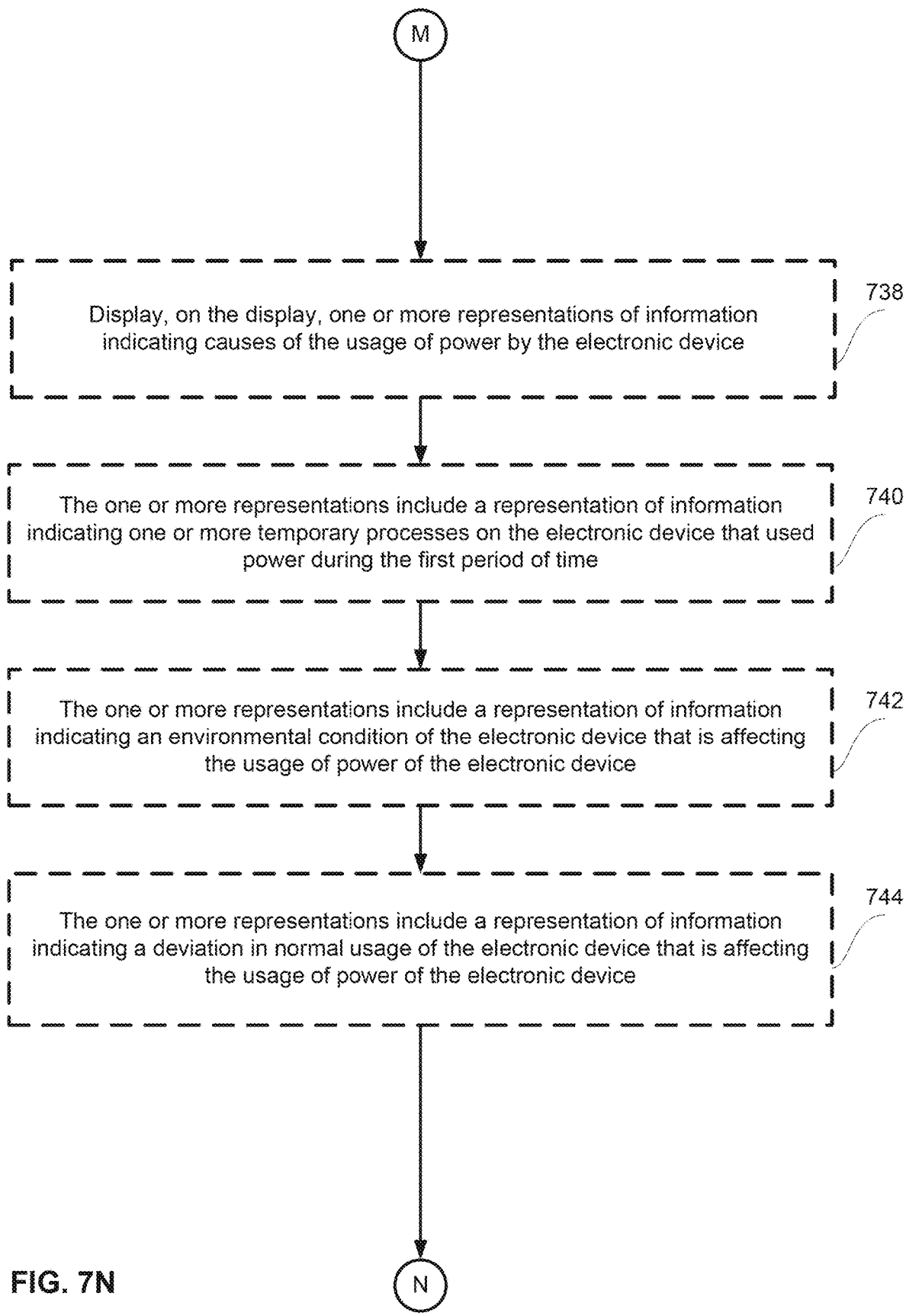
Figure 7O:
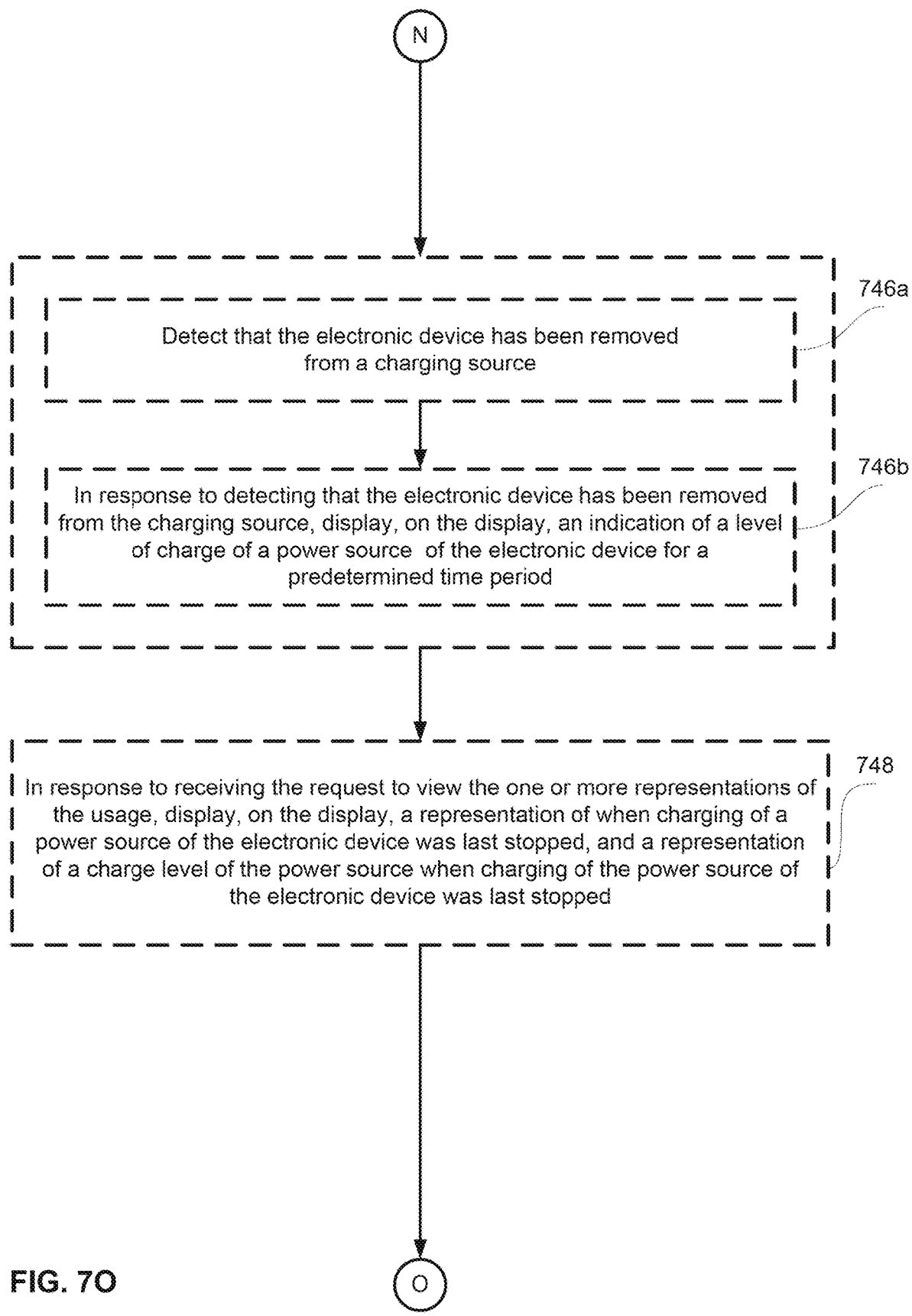
Figure 7P:
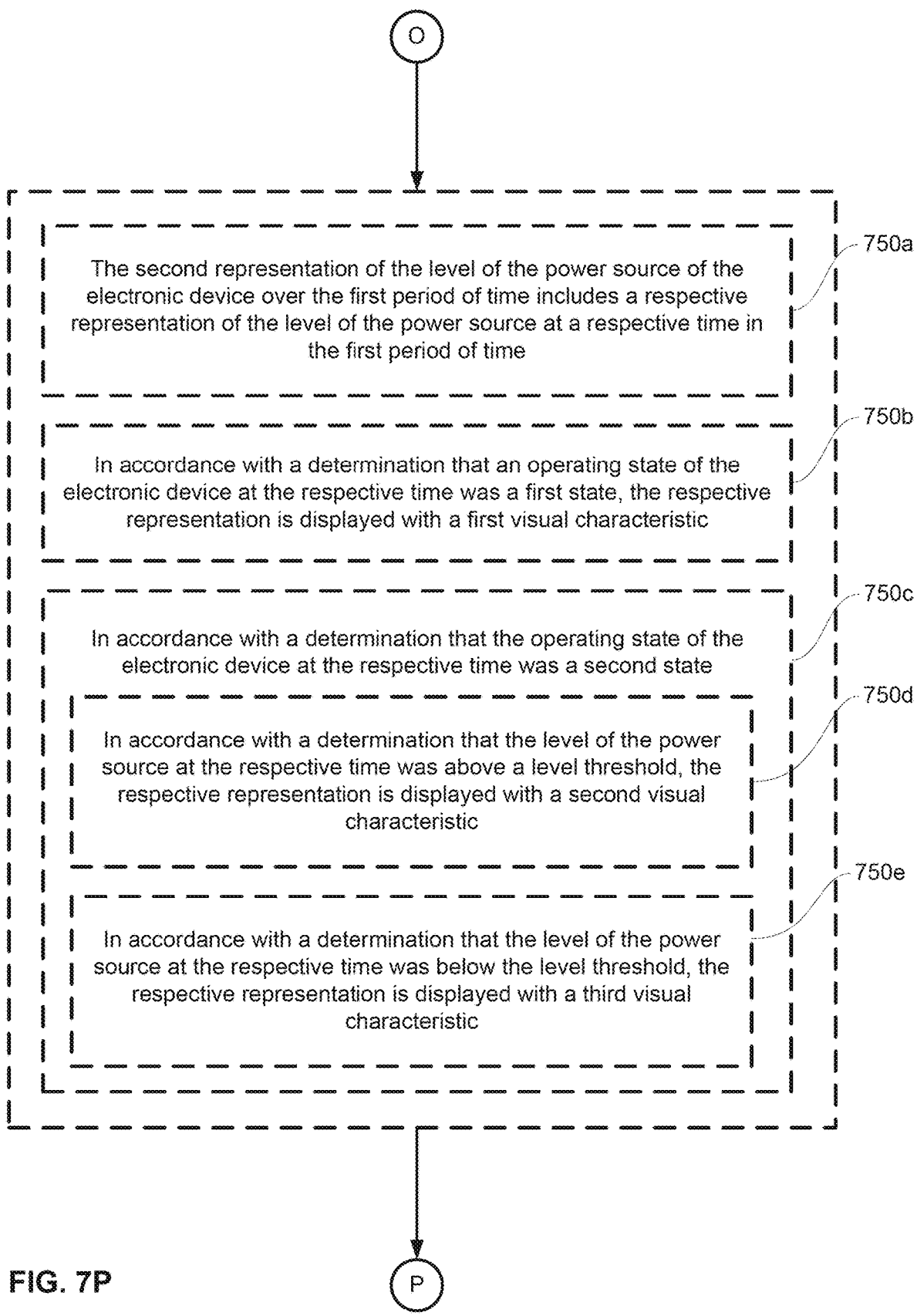
Figure 7Q:
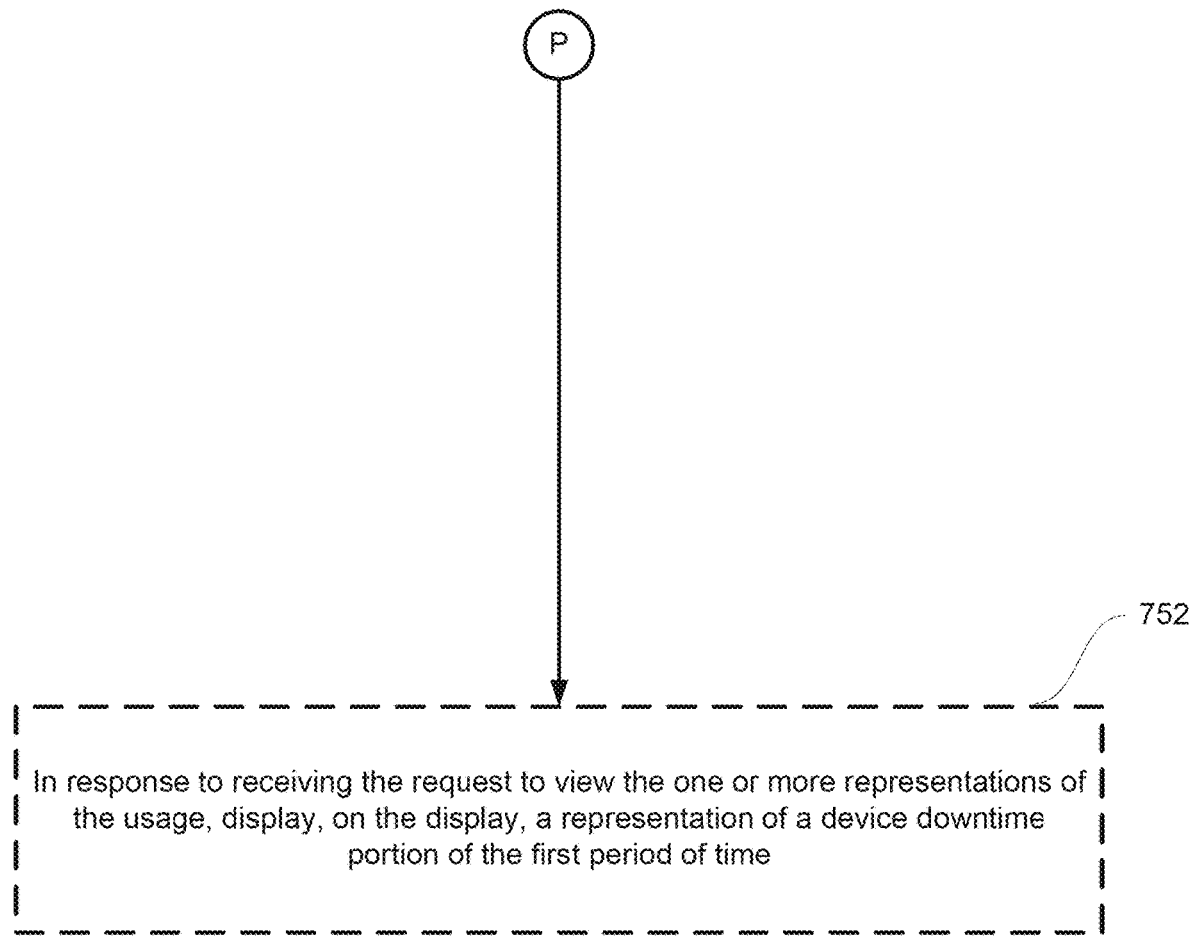

FIGS. 7A-7Q are flow diagrams illustrating a method 700 of displaying battery status and screen time usage for time periods and applications in accordance with some embodiments of the disclosure. The method 700 is optionally performed at an electronic device such as device 100, device 300, or device 500 as described above with reference to FIGS. 1A-1B, 2-3, 4A-4B and 5A-5H. Some operations in method 700 are, optionally, combined and/or the order of some operations is, optionally, changed.

As described below, the method 700 provides ways to display battery status and screen time usage for time periods and applications. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a smart watch, a tablet computer, etc., such as device 500) in communication with a display (e.g., a television, a display of the electronic device, a touch screen of the electronic device, such as touch screen 504) and one or more input devices (e.g., a touch screen of the electronic device, such as touch screen 504, a remote control of the set-top box), receives (702), via the one or more input devices, a request to view one or more representations of usage of power (e.g., battery power or total power used) by the electronic device, such as in FIG. 6A (e.g., a user touching an icon on a touch screen, a user pressing a button on a remote control, and/or a user delivering a voice command to the electronic device, for viewing information about the battery of the electronic device). For example, the user optionally requests, from an operating system user interface of the electronic device (not a user interface of an application running on the electronic device) to view information about battery usage of the electronic device, such as from a settings user interface of the electronic device.

In response to receiving the request to view the one or more representations of the usage, electronic device 500 displays (704a), on the display, a first representation (e.g., bar graph) of the usage over a first period of time (e.g. over a 24-hour period, over a 10-day period), such as in FIG. 6A For example, in some embodiments, electronic device 500 represents the display-on and display-off usage of the battery in a bar graph, where each bar of the bar graph corresponds to total usage of the battery for a particular time period (e.g., a 3-hour time period of a day, a day of a week, etc.). The bars of the bar graph are optionally color-coded such that portions of the bars that correspond to display-on usage are displayed with a different visual characteristic than portions of the bars that correspond to display-off usage, such as being displayed with different colors. The sum of display-on usage and the sum of display-off usage for the entire first period of time are optionally also displayed.

In some embodiments, displaying the first representation of the usage over the first period of time includes concurrently displaying, on the display: a representation (704b) of display-on usage (e.g., portions of the bars in the bar graph that are shaded a first color, green, that correspond to display-on usage) during a first subset of the first period of time (e.g., a first 3-hour period within a 24-hour period), a representation (704c) of display-off usage (e.g., portions of the bars in the bar graph that are shaded a second color, blue, different from the first color, that correspond to the display-off usage) during the first subset of the first period of time (e.g., the same 3-hour period within a 24-hour period), a representation (704d) of display-on usage (e.g., portions of the bars in the bar graph that are shaded the first color, green, that correspond to display-on usage) during a second subset of the first period of time different from the first subset of the first period (e.g., a second 3-hour period within a 24-hour period different from the first 3-hour period), and a representation (704e) of display-off usage (e.g., portions of the bars in the bar graph that are shaded the second color, blue, that correspond to the display-off usage) during the second subset of the first period of time (e.g., the second 3-hour period within a 24-hour period), such as in FIG. 6A.

The above-described manner of displaying a representation of battery usage of the electronic device that reflects battery usage both for periods of the display being on and periods of the display being off, allows the electronic device to simplify the presentation of battery usage information to the user and interactions with the user, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, the usage of power comprises usage of a power source of electronic device 500 (e.g. a battery). Electronic device 500 optionally tracks (708a) the usage, by electronic device 500, of the power source (e.g., battery) of electronic device 500 over time, such as in FIG. 6A (e.g. tracking battery usage by one or more applications on electronic device 500 over a 24-hour period, over a 10-day period, over a month, over a year). The tracked usage optionally comprises display-on usage (708b), by electronic device 500, of the power source that occurs while electronic device 500 displays content on the display and display-off usage (708c), by electronic device 500, of the power source that occurs while electronic device 500 does not display content on the display, such as in FIG. 6A.

The display-on usage (708b), by electronic device 500, of the power source that occurs while electronic device 500 displays content on the display is optionally the amount or percentage of energy of the battery consumed by electronic device 500 while the display is on over a particular period of time, such as in FIG. 6A. In some embodiments, this usage is tracked on a per-application basis such that portions of the above amount or percentage are associated with respective applications on electronic device 500. In some embodiments, electronic device 500 tracks the amount of time one or more particular applications were in use and displayed on the display over the particular period of time on a per-application basis.

The display-off usage (708c), by electronic device 500, of the power source that occurs while electronic device 500 does not display content on the display is optionally the amount or percentage of energy of the battery consumed by electronic device 500 while the display is off over a particular period of time, such as in FIG. 6A. In some embodiments, this usage is tracked on a per-application basis such that portions of the above amount or percentage are associated with respective applications on electronic device 500. In some embodiments, electronic device 500 tracks the amount of time one or more particular applications were in use and not displayed on the display over the particular period of time on a per-application basis.

The above-described manner of displaying a representation of battery usage of the electronic device that further reflects "display-on usage" and "display-off usage" allow the electronic device to simplify the presentation of battery usage information to the user and interactions with the user, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, the first representation (710a) of the usage of power by electronic device 500 is a bar chart comprising a plurality of bars (e.g., each bar corresponds to a bucket or range of time during the first period of time; y-axis is time), as shown in FIG. 6A, wherein a first bar (710b) of the plurality of bars corresponds to the first subset of the first period of time (e.g. a 3-hour subset of a 24-hour period; a 1-day subset of a 10-day period) and a second bar (710c) of the plurality of bars corresponds to the second subset of the first period of time (e.g. a different 3-hour subset of a 24-hour period; a different 1-day subset of a 10-day period). Optionally, as shown in FIG. 6A, the representation (710d) of display-on usage during the first subset of the first period of time is a first portion of the first bar (e.g. the bottom portion of the first bar), the representation (710e) of display-off usage during the first subset of the first period of time is a second portion of the first bar (e.g. the top portion of the first bar. In some embodiments, the first bar is partitioned such that the different partitions of the first bar reflect the display-on and display-off usage, respectively, of electronic device 500 during the first subset of the first period of time), the representation (710f) of display-on usage during the second subset of the first period of time is a first portion of the second bar (e.g. the bottom portion of the second bar), and the representation (710g) of display-off usage during the second subset of the first period of time is a second portion of the second bar (e.g. the top portion of the second bar. In some embodiments, the second bar is partitioned such that the different partitions of the second bar reflect the display-on and display-off usage, respectively, of electronic device 500 during the second subset of the first period of time).

The above-described manner of displaying a representation of battery usage of the electronic device that reflects battery usage using a bar chart corresponding to various sub periods within a period of time where each bar is partitioned into display-on usage and display-off usage allows the electronic device to simplify the presentation of battery usage information to the user and interactions with the user, which enhances the operability of the device and makes the user-device interface more efficient (e.g., by providing an intuitive visual presentation of battery usage information over discrete time periods to the user), which, additionally, reduces power usage and improves battery life of the device by enabling the user to use the device more quickly and efficiently.

In some embodiments, in response to receiving the request to view the one or more representations of the usage, electronic device 500 displays (712), on the display, as shown in FIG. 6A, a second representation of a level of a power source of electronic device 500 over the first period of time. For example, the second representation is a line graph corresponding to the energy level in the power source as a function of time over the first period of time. In some embodiments, the portions of the line graph corresponding to the periods of time in the first period of time when the power source was charging are visually emphasized (e.g., visual emphasis is increased) relative to the periods of time in the first period of time when the power source was not charging. In some embodiments, the range of possible values for the line graph is fully discharged (e.g., 0% charged) to fully charged (e.g., 100% charged).

The above-described manner of displaying a representation of battery level using a line graph corresponding to battery level over a period of time allows the electronic device to simplify the presentation of battery usage and/or level information to the user and interactions with the user, which enhances the operability of the device and makes the user-device interface more efficient (e.g., by providing an intuitive visual presentation of battery level information over continuous time to the user), which, additionally, reduces power usage and improves battery life of the device by enabling the user to use the device more quickly and efficiently.

In some embodiments, as shown in FIGS. 6H, 6I, 6L, and 6M, while displaying the first representation of the usage over the first period of time including the representations of the display-on usage and the representations of the display-off usage (e.g., electronic device 500 is displaying the power usage with both display-on usage and display-off usage shown), electronic device 500 receives (714a), via the one or more input devices, a request to display display-on usage without displaying display-off usage. The request is optionally a user touching an icon on a touch screen, a user pressing a button on a remote control, and/or a user delivering a voice command to electronic device 500 for displaying usage information that reflects display-on usage but not display-off usage of electronic device 500. In some embodiments, the input for requesting this view is selection of a representation of aggregate display-on usage during the first time period that is displayed concurrently with the one or more representations of usage over the first time period (e.g., displayed concurrently with the usage bar graph described above).

In some embodiments, as shown in FIGS. 6H, 6I, 6L, and 6M, in response to receiving the request to display the display-on usage without displaying the display-off usage, electronic device 500 updates (714b) the first representation of the usage by: ceasing (714c) display of: the representation (714d) of the display-off usage during the first subset of the first period of time (e.g. a 3-hour subset of a 24-hour period; a 1-day subset of a 10-day period), and the representation (714e) of the display-off usage during the second subset of the first period of time (e.g. a different 3-hour subset of a 24-hour period; a different 1-day subset of a 10-day period. For example, the portions of the bars in the usage bar graph that are attributable to display-off usage are removed, deemphasized (e.g., decreasing the visual emphasis of relative to the relevant quantity), or otherwise obscured from the bar graph).

In some embodiments, as shown in FIGS. 6H, 6I, 6L, and 6M, the cessation (714c) occurs while maintaining (714f) display of: the representation (714g) of the display-on usage during the first subset of the first period of time, and the representation (714h) of the display-on usage during the second subset of the first period of time. For example, the portions of the bars in the usage bar graph that are attributable to display-on usage are maintained or emphasized (e.g., increasing the visual emphasis of relative to the relevant quantity) in the bar graph such that the bar graph clearly conveys display-on usage information.

The above-described manner of allowing a user to request an update of the representation of battery usage of the electronic device to show only display-on usage enables the user to focus on display-on usage, allows the electronic device to provide insights that may not be clear from showing both display-on usage and display-off usage together, such as in situations where the visual markers corresponding to display-on usage are small compared to display-off usage or total usage, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIGS. 6J, 6K, 6N, and 6O, while displaying the first representation of the usage over the first period of time including the representations of the display-on usage and the representations of the display-off usage (e.g., electronic device 500 is displaying the power usage with both display-on usage and display-off usage shown), electronic device 500 receives (716a), via the one or more input devices, a request to display display-off usage without displaying display-on usage. The request is optionally a user touching an icon on a touch screen, a user pressing a button on a remote control, and/or a user delivering a voice command to electronic device 500 for displaying usage information that reflects display-off usage but not display-on usage of electronic device 500. In some embodiments, the input for requesting this view is selection of a representation of aggregate display-off usage during the first time period that is displayed concurrently with the one or more representations of usage over the first time period (e.g., displayed concurrently with the usage bar graph described above).

In some embodiments, as shown in FIGS. 6J, 6K, 6N, and 6O, in response to receiving the request to display display-off usage without displaying display-on usage, electronic device 500 updates (716*b*) the first representation of the usage by: ceasing (716*c*) display of: the representation (716*d*) of the display-on usage during the first subset of the first period of time (e.g. a 3-hour subset of a 24-hour period; a 1-day subset of a 10-day period), and the representation (716*e*) of the display-on usage during the second subset of the first period of time (e.g. a different 3-hour subset of a 24-hour period; a different 1-day subset of a 10-day period). For example, the portions of the bars in the usage bar graph that are attributable to display-on usage are removed or deemphasized (e.g., decreasing the visual emphasis of relative to the relevant quantity), or otherwise obscured from the bar graph).

In some embodiments, as shown in FIGS. 6J, 6K, 6N, and 6O, the cessation (716*c*) occurs while maintaining (716*f*) display of: the representation (716*g*) of the display-off usage during the first subset of the first period of time, and the representation (716*h*) of the display-off usage during the second subset of the first period of time. Optionally, the portions of the bars in the usage bar graph that are attributable to display-off usage are maintained or emphasized (e.g., increasing the visual emphasis of relative to the relevant quantity) in the bar graph such that the bar graph clearly conveys display-off usage information.

The above-described manner of allowing a user to request an update of the representation of battery usage of the electronic device to show only display-off usage enables the user to focus on display-off usage, allows the electronic device to provide insights that may not be clear from showing both display-on usage and display-off usage together, such as in situations where the visual markers corresponding to display-off usage are small compared to display-on usage or total usage, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIGS. 6P, 6Q, 6R, and 6S, in response to receiving the request to view the one or more representations of the usage (e.g., a user touching an icon on a touch screen, a user pressing a button on a remote control, and/or a user delivering a voice command to electronic device 500), electronic device 500 displays (718*a*), on the display, a plurality of representations of usage of power of a plurality of applications (e.g., applications installed on electronic device 500) on electronic device 500 during the first period of time (e.g., a 24-hour period, a 10-day period), including concurrently displaying, on the display: a representation (718*b*) of usage of power of a first application (e.g., the application's icon along with the display-off usage and/or display-on usage for the application) during the first period of time; and a representation (718*c*) of usage of power of a second application during the first period of time (e.g., the usage bar graph is optionally displayed concurrently with a list of applications (or more generally representations of applications) whose usage is reflected in the usage bar graph. The applications in the list are optionally displayed with information about the amount of usage of power attributable to those applications (e.g., respective display-on usage (e.g., time) for the applications during the first time period, respective display-off usage (e.g., time) for the applications during the first time period, respective total usage (e.g., aggregate of display-on and display-off time) for the applications during the first time period, and/or respective percentage of usage of power over the first time period for which the applications are responsible).

The above-described manner of allowing a user to request viewing the battery usage of the electronic device organized by various applications, allows the electronic device to enable the user to see which applications are using comparatively more or less power than the other applications, which enhances the operability of the device and makes the user-device interface more efficient (e.g., by helping the user decide which application to use less), which, additionally, reduces power usage and improves battery life of the device by enabling the user to use the device more quickly and efficiently.

In some embodiments, as shown in FIGS. 6P, 6Q, 6R, and 6S, in response to receiving the request to view the one or more representations of the usage (e.g., a user touching an application icon on a touch screen, a user pressing a button on a remote control, and/or a user delivering a voice command to electronic device 500), electronic device 500 displays (720*a*), on the display, one or more representations of usage of power for one or more applications on electronic device 500 during the first period of time, including concurrently displaying, on the display: a representation (720*b*) of display-on usage for a first application of the one or more applications; and a representation (720*c*) of display-off usage for the first application (e.g., indicating the display-on and display-off usage for one or more applications during the first time period). In some embodiments, the displayed usage is usage information for a single (or selected subset) of applications that used power during the first time period. For example, in the case of a usage bar graph, only bars reflecting power usage (e.g., aggregate display-on and display-off usage) by the single (or selected subset) of applications are included. In some embodiments, the usage bar graph is focused on the single (or selected subset) of applications in response to user input for doing so (e.g., selection of an application displayed in the above-described list of applications), which results in bars (or portions of bars) of the usage graph that do not correspond to the single (or selected subset) application to be removed from the usage bar graph.

The above-described manner of allowing a user to request viewing the battery usage of the electronic device corresponding to a particular application, allows the electronic device to enable the user to see more detailed usage information regarding that application, which enhances the operability of the device and makes the user-device interface more efficient (e.g., by helping the user decide which various time periods to use the application less), which, additionally, reduces power usage and improves battery life of the device by enabling the user to use the device more quickly and efficiently.

In some embodiments, as shown in FIGS. 6T and 6U, while displaying the first representation of the usage of power by electronic device 500 over the first period of time including the representations of the usage over the first subset and the second subset of the first period of time (e.g., two 3-hour sub periods of a 24-hour period, two 1-day sub periods of a 10-day period) and the plurality of representations of usage of power of the plurality of applications on electronic device 500 during the first period of time (e.g., while the usage bar graph reflects power used over multiple sub periods of time in the first period of time, and while representations of applications that used power during those multiple sub periods of time are displayed), electronic device 500 receives (722*a*), via the one or more input devices, a request to display the usage of power over the first subset of the first period of time without displaying the usage of power over the second subset of the first period of time (e.g., detecting a user touching an icon such as a bar in the bar graph on a touch screen to select a time sub period corresponding to the selected bar, a user pressing a button on a remote control, and/or a user delivering a voice command to electronic device 500).

In some embodiments, as shown in FIGS. 6T and 6U, in response (722*b*) to receiving the request to display the usage of power over the first subset of the first period of time without displaying the usage of power over the second subset of the first period of time: the electronic device 500 ceases (722*c*) display of respective representations of the plurality of representations corresponding to the plurality of applications that used power during the second subset of the first period of time (e.g., removing from the list of applications displayed with the usage bar graph those applications that used power only during unselected sub periods of time in the first period of time) while maintaining (722*d*) display of respective representations of the plurality of representations corresponding to the plurality of applications that used power during the first subset of the first period of time (e.g., maintaining display of, in the list of applications, those applications that used power during the selected sub period(s) of time in the first time period).

The above-described manner of allowing a user to request viewing the battery usage of the electronic device corresponding to a particular time sub period, allows the electronic device to enable the user to see more detailed usage information regarding that time sub period, including usage by various mobile applications during that time sub period, which enhances the operability of the device and makes the user-device interface more efficient (e.g., by helping the user decide which applications and in which time sub periods to use less), which, additionally, reduces power usage and improves battery life of the device by enabling the user to use the device more quickly and efficiently.

In some embodiments, as shown in FIGS. 6T and 6U, in response to receiving the request to view the usage of power during the first subset of the first period of time without displaying the usage of power during the second subset of the first period of time (e.g., a user touching an icon such as a bar in the bar graph on a touch screen to select a time sub period, a user pressing a button on a remote control, and/or a user delivering a voice command to electronic device 500), electronic device 500 increases (724) a visual emphasis of the representations of usage during the first subset of the first period of time relative to the representations of usage during the second subset of the first period of time. The emphasis optionally entails increasing an emphasis of the representations of usage during the first subset of the first time period, for example by boldfacing text and thickening lines for the selected time sub period(s), using darker colors for areas, rendering the portions of the bar graph corresponding to the selected sub period(s) of time in color or otherwise emphasizing the usage information in the representation of usage that corresponds to the selected sub period(s) of time and/or deemphasizing the usage information for non-selected time periods, for example by greying out or lightening text/lines/areas corresponding to non-selected time sub periods, rendering the portions of the bar graph corresponding to the unselected sub periods in grayscale or otherwise deemphasizing the usage information in the representation of usage that corresponds to the unselected sub period(s) of time.

The above-described manner of emphasizing the battery usage of the electronic device corresponding to a particular time sub period, allows the electronic device to enable the user to more easily visually compare the usage information regarding that time sub period against other time sub periods, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIGS. 6T and 6U, in response to receiving the request to view the usage of power during the first subset of the first period of time without displaying the usage of power during the second subset of the first period of time (e.g., a user touching an icon such as a bar in the bar graph on a touch screen to select a time sub period, a user pressing a button on a remote control, and/or a user delivering a voice command to electronic device 500), electronic device 500 displays (726*a*), on the display: an aggregate display-on usage time (726*b*) corresponding to display-on usage during the first subset of the first period of time; and an aggregate display-off usage time (726*c*) corresponding to display-off usage during the first subset of the first period of time (e.g. separate representations of the aggregate display-on usage and the aggregate display-off usage of electronic device 500 during the selected sub period of the first period of time). In some embodiments, the aggregate display-on usage time and aggregate display-off usage time were displayed prior to receiving the request to view info for the selected sub period of time (e.g., were displaying respective aggregate display-on and display-off usage for the entirety of the first period of time), and in response to the request are updated to reflect display-on and display-off usage for the selected sub period of time without reflecting usage during other (e.g., unselected) subperiods of time.

The above-described manner of allowing a user to view total display-on usage and total display-off usage in response to a request to view the battery usage of the electronic device corresponding to a particular time sub period, allows the electronic device to enable the user to see more numerical usage information regarding that time sub period, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIGS. 6B and 6C, while displaying the first representation of the usage of power by electronic device 500 over the first period of time, electronic device receives (728*a*), via the one or more input devices, a request to view one or more representations of usage of power by electronic device 500 over a second period of time, different than the first period of time. In some embodiments, if the first period is a 24-hour period, then second period is a 10-day period, and vice versa. In some embodiments, this input is selection of a toggle that toggles the representation of usage between reflecting usage over the last 24 hours and usage over the last 10 days. Optionally, in response to receiving the request to view the one or more representations of the usage of power by electronic device 500 over the second period of time, electronic device 500 displays (728*b*), on the display, a second representation (e.g., a second usage bar graph) of the usage over the second period of time, including concurrently displaying, on the display: a representation (728c) of display-on usage (e.g., portions of the bars in the bar graph that are shaded a first color, green, that correspond to display-on usage) during a first subset of the second period of time (e.g., a first day within a 10-day period); a representation (728d) of display-off usage (e.g., portions of the bars in the bar graph that are shaded a second color, blue, different from the first color, that correspond to the display-off usage) during the first subset of the second period of time (e.g., the same first day period within a 10-day period); a representation (728e) of display-on usage (e.g., portions of the bars in the bar graph that are shaded the first color, green, that correspond to display-on usage) during a second subset of the second period of time different from the first subset of the second period (e.g., a second day period within a 10-day period different from the first day period); and a representation (728f) of display-off usage (e.g., portions of the bars in the bar graph that are shaded the second color, blue, that correspond to the display-off usage) during the second subset of the second period of time (e.g., the second day period within a 10-day period). In some embodiments, the usage bar graph that reflected usage over the first period of time (e.g., 24 hr. period of time) is replaced with a bar graph that reflects usage over the second period of time (e.g., 10-day period of time).

The above-described manner of allowing a user to switch the view of battery usage of the electronic device from one time period (e.g. 24 hours) to another time period (e.g. 10 days), allows the electronic device to enable the user understand battery usage information over various scales of time, which enhances the operability of the device and makes the user-device interface more efficient (e.g., by revealing various patterns of usage that the user may consider in deciding which sub periods to use the electronic device less in order to save battery), which, additionally, reduces power usage and improves battery life of the device by enabling the user to use the device more quickly and efficiently.

In some embodiments, as shown in FIGS. 6B and 6C, electronic device 500 displays (730a), concurrently with the first representation of the usage over the first period of time (e.g. first period is a 24-hour period): a representation (730b) of an aggregate display-on usage during the first period of time (e.g. when the usage information is displayed for a 24-hour period, the total or aggregate display-on usage during that period is also displayed); and a representation (730c) of an aggregate display-off usage during the first period of time (e.g. when the usage information is displayed for a 24-hour period, the total or aggregate display-off usage during that period is also displayed); and displays (730d), concurrently with the second representation of the usage over the second period of time (e.g. second period is a 10-day period): a representation (730e) of an average display-on usage during the second period of time (e.g. when the usage information is displayed for a 10-day period, an average, as opposed to aggregate, display-on usage for that period is also displayed); and a representation 730f of an average display-off usage during the second period of time (e.g. when the usage information is displayed for a 10-day period, an average (as opposed to aggregate) display-off usage for that period is also displayed). In some embodiments, the average display-on usage is an average per day during the 10-day period, or any other average or normalized usage amount, other than an aggregate usage amount. In some embodiments, the average display-off usage is an average per day during the 10-day period, or any other average or normalized usage amount, other than an aggregate usage amount.

The above-described manner of viewing total display-on usage and total display-off usage over a shorter period of time (e.g. a 24-hour period) and viewing the average display-on usage and average display-off usage over a longer period of time (e.g. a 10-day period) allows the electronic device to enable the user understand battery usage information over various scales of time, which enhances the operability of the device and makes the user-device interface more efficient (e.g., by revealing various patterns of usage that the user may consider in deciding which sub periods to use the electronic device less in order to save battery), which, additionally, reduces power usage and improves battery life of the device by enabling the user to use the device more quickly and efficiently.

In some embodiments, as shown in FIG. 6A, electronic device 500 displays (732a), concurrently with the first representation of the usage over the first period of time (e.g., a 24-hour period), a representation of a level of a power source of electronic device over the first period of time. The additional representation is optionally a line graph corresponding to the energy level in the power source as a function of time over the first period of time, and wherein the additional representation optionally includes a first indication corresponding to the periods of time in the first period of time when the power source was charging. In some embodiments, the range of the level of the power source is 0% (e.g., fully discharged) to 100% (e.g., fully charged). In some embodiments, as shown in FIG. 6C, electronic device 500 displays (732b), concurrently with the second representation of the usage over the second period of time (e.g., a 10-day period), a representation of an amount of consumption of the level of the power source over the second period of time. The additional representation for this second period of time is optionally a bar graph with each bar corresponding to the total usage of the power source within a sub period of the second period of time. In some embodiments, the range of the amount of consumption of the level of the power source is 0% (e.g., none of the power source consumed) to more than 100% (e.g., more than a full charge of power source consumed in cases where the user charged the power source during a sub period of time and also used that power during that sub period of time).

The above-described manner of viewing a continuous-time line graph over a shorter period of time (e.g. a 24-hour period) and viewing a bar graph over a longer period of time (e.g. a 10-day period) of battery level of the electronic device, allows the electronic device to enable the user understand battery level information over various scales of time, which enhances the operability of the device and makes the user-device interface more efficient (e.g., by revealing various patterns of usage that the user may consider in deciding which sub periods to use the electronic device less in order to save battery), which, additionally, reduces power usage and improves battery life of the device by enabling the user to use the device more quickly and efficiently.

In some embodiments, as shown in FIGS. 6A and 6C, in response to receiving (734a) the request to view the one or more representations of the usage (e.g., a user touching an icon on a touch screen to select a time sub period, a user pressing a button on a remote control, and/or a user delivering a voice command to electronic device 500): in accordance with a determination that the first period of time is a first respective period of time (e.g., a 24-hour period), electronic device 500 displays (734b), on the display, as shown in FIG. 6A: a visual indication (734c) of a sum (e.g., aggregation of) of the display-on usage during the first subset of the first period of time and the second subset of the first period of time (e.g., sum of the display-on usage for all 3-hour buckets of the 24-hour period); and a visual indication (734d) of a sum of the display-off usage during the first subset of the first period of time and the second subset of the first period of time (e.g., sum of the display-off usage for all 3-hour buckets of the 24-hour period).

In some embodiments, in accordance with a determination that the first period of time is a second respective time period (e.g., a 10-day period), electronic device 500 displays (734e), on the display, as shown in FIG. 6C: a visual indication (734f) of an average of the display-on usage during the first period of time (e.g., the daily average of the display-on usage over the 10-day period); and a visual indication (734g) of an average of the display-off usage during the first period of time (e.g., the daily average of the display-off usage over the 10-day period). In some embodiments, the above sums are displayed concurrently with per-application display-on and/or display-off usage information. In such embodiments, the above sums are optionally different than (e.g., less than) the sum of the display-off or display-on usage information displayed on a per-application basis, because in some circumstances multiple applications are running (either display-on or display-off) concurrently. In such circumstances, the above sums optionally do not double-count such concurrent usage of applications, and rather reflect the total time power was used while the display was on and while the display was off. For example, if applications A and B were running concurrently for 1 hr. with the display on, the display-on usage sum would optionally reflect 1 hour (not 2 hours).

The above-described manner of viewing total display-on usage and total display-off usage over a shorter period of time (e.g. a 24-hour period) and viewing the average display-on usage and average display-off usage over a longer period of time (e.g. a 10-day period) of battery usage of the electronic device, allows the electronic device to enable the user understand battery usage information over various scales of time, which enhances the operability of the device and makes the user-device interface more efficient (e.g., by revealing various patterns of usage that the user may consider in deciding which sub periods to use the electronic device less in order to save battery), which, additionally, reduces power usage and improves battery life of the device by enabling the user to use the device more quickly and efficiently.

In some embodiments, as shown in FIG. 6Y, electronic device 500 displays (736a), on the display, one or more representations of recommendations to reduce the usage of power by electronic device 500. In some embodiments, recommendations including text describing what setting to change that would reduce power usage, such as reducing brightness of the display of electronic device 500, enabling auto-brightness for the display of electronic device 500 to set display brightness based on ambient brightness, enabling auto-lock to automatically turn off the display of electronic device 500 after a period of inactivity (or to reduce that set period of inactivity), changing location setting for apps with high background location usage to reduce or eliminate the ability of one or more applications to check the location of electronic device 500 while those applications are not running, changing background setting for apps with high background CPU usage to reduce or eliminate the ability of one or more applications to run in the background, changing mail account settings if there is high power drain due to push email settings or frequent fetching of emails, changing an option to set less aggressive cellular network searching when electronic device 500 is in a low signal area).

In some embodiments, as shown in FIG. 6Z, while displaying the one or more representations of recommendations, electronic device 500 receives (736b), via the one or more input devices, an input corresponding to a request to apply a respective recommendation of the one or more recommendations. In some embodiments, the above recommendations are displayed concurrently with respective selectable affordances that, when selected, cause the corresponding power-saving change to be implemented on the device. In some embodiments, this change is implemented without leaving the user interface in which the recommendations are displayed.

In some embodiments, as shown in FIG. 6AA, in response to receiving the input corresponding to the request to apply the respective recommendation, electronic device 500 applies (736c) the respective recommendation to electronic device 500 (applying the power-saving recommendation and optionally indicating that the recommendation has been implemented by changing an appearance of the selectable affordance for applying the recommendation, such as by updating an "enable" affordance to "enabled"). In some embodiments, the recommendations are displayed with information about how much of the power source (e.g., a percentage of the power source, a time-capacity of the power source, etc.) would have been conserved over the current time period (today or last 10 days) had the recommendation been in effect. In some embodiments, respective ones of the recommendations are dismissible by the user.

The above-described manner of displaying battery usage recommendations with affordances for easily changing settings affecting power usage allows the electronic device to enable the user to understand which settings would help save battery (and optionally by how much), which enhances the operability of the device and makes the user-device interface more efficient (e.g., by providing the user control in deciding which settings to apply), which, additionally, reduces power usage and improves battery life of the device by enabling the user to use the device more quickly and efficiently.

In some embodiments, as shown in FIG. 6Y, electronic device 500 displays (738), on the display, one or more representations of information indicating causes of the usage of power by electronic device 500. The one or more representations optionally include prose/natural language descriptions of conditions that are causing the device to use more or less battery than usual or than expected, an indication of when the conditions will end (e.g., after an initial cloud backup or indexing operation is complete), or how to avoid the conditions (e.g., by turning down screen brightness or accessing a Wi-Fi network).

The above-described manner of displaying battery usage insights enables the user to understand how current usage of the device or current external conditions are affecting battery usage, which allows the electronic device to simplify the presentation of battery usage information to the user and interactions with the user, which enhances the operability of the device and makes the user-device interface more efficient (e.g., by allowing the user to change device usage or external conditions), which, additionally, reduces power usage and improves battery life of the device by enabling the user to use the device more quickly and efficiently.

In some embodiments, as shown in FIG. 6Y, the one or more representations include (740) a representation of information indicating one or more temporary processes on electronic device 500 that used power during the first period of time. The representation of information optionally includes which applications are consuming more battery than usual or are consuming more battery than other applications are, or restoration/backup operations occurring on the device that don't normally occur but are consuming battery during the current time period, uploading of photos from the device to a cloud storage account.

The above-described manner of displaying information about temporary processes that are consuming more battery than normal allows the electronic device to enable the user to understand temporary causes of differences in battery performance, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIG. 6Y, the one or more representations include (742) a representation of information indicating an environmental condition of electronic device 500 that is affecting the usage of power of electronic device 500. The representation of information optionally includes low ambient temperature causing a reduction in the capacity of the battery, ambient humidity causing a reduction in the capacity of the battery, or poor cellular signal causing the device to use more power to search for the cellular signal than normal.

The above-described manner of displaying how environmental conditions of the device are affecting battery usage allows the electronic device to enable the user to understand causes of differences in battery performance due to environmental effects, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIG. 6Y, the one or more representations include (744) a representation of information indicating a deviation in normal usage of electronic device 500 that is affecting the usage of power of electronic device 500. The representation of information optionally includes an indication that the user is interacting with/using the device more than usual (e.g., after a hardware or software upgrade), an indication that there is higher usage of power by electronic device 500 after setting the display to a higher resolution, or an indication that there is higher usage of electronic device 500 after leaving Wi-Fi/Bluetooth on for a continuous period of time.

The above-described manner of indicating a deviation in normal device usage affecting battery usage allows the electronic device to enable the user to decide whether to alter device usage or device settings, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIGS. 6BB and 6CC, electronic device 500 detects (746a) that electronic device 500 has been removed from a charging source; and in response to detecting that electronic device 500 has been removed from the charging source (e.g. unplugged from a charging cable, removed from a wireless charging source), electronic device displays (746b), on the display, an indication of a level of charge of a power source (e.g., battery) of electronic device 500 (e.g. actual percentage of maximum battery level charged up, a shaded bar whose shaded area corresponds to percentage of maximum battery level charged up) for a predetermined time period (e.g., 3, 5, or 7 seconds). Thus, in some embodiments, electronic device 500 displays (optionally, on a wake or lock screen of electronic device 500), for a period of time (e.g., 3, 5, or 7 seconds) after being removed from a charging source, an indication of the battery level at the time charging stopped. In some embodiments, the device only displays this indication if the battery level is less than 100% (e.g., fully charged), and otherwise does not display this indication.

The above-described manner of indicating the battery level after the electronic device is removed from the charging source allows the electronic device to enable the user to easily see the current level of charge in the battery soon afterwards, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIG. 6A, in response to receiving the request to view the one or more representations of the usage, electronic device 500 displays (748), on the display, a representation of when charging of a power source of electronic device 500 was last stopped, and a representation of a charge level of the power source when charging of the power source of electronic device 500 was last stopped. In some embodiments, the time that charging of the battery of electronic device 500 was last stopped is displayed (e.g., last charged at 11 p.m.) concurrently with the battery level of the battery when the charging was last stopped (e.g., last charged to 86%).

The above-described manner of indicating the last charge time and the last charge amount allows the electronic device to enable the user to easily see how long it has been since the device was last charged and how far from the last-charged battery level the device currently is, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIG. 6V, the second representation (750a) of the level of the power source of electronic device 500 over the first period of time includes a respective representation of the level of the power source at a respective time in the first period of time (e.g., a portion of the battery level line chart the indicates the battery level at the respective time), in accordance with a determination that an operating state of electronic device 500 at the respective time was a first state (e.g., electronic device 500 was operating in a low power mode at the respective time during which one or more functions or components of electronic device 500 operate at less than full speed, such as at slower speeds or not at all), the respective representation is displayed (750b) with a first visual characteristic (e.g., the portion of the battery level line chart is color-coded yellow), and in accordance with a determination (750c) that the operating state of electronic device 500 at the respective time was a second state (e.g., electronic device 500 was operating in a normal power mode at the respective time during which the one or more functions or components of electronic device 500 operate at their regular or full speed): in accordance with a determination that the level of the power source at the respective time was above a level threshold (e.g., more than 5%, 10%, 15%, 20%, 25%, etc. battery level), the respective representation is displayed (750*d*) with a second visual characteristic (e.g., the portion of the battery level line chart is color-coded green), and in accordance with a determination that the level of the power source at the respective time was below the level threshold (e.g., less than 5%, 10%, 15%, 20%, 25%, etc. battery level), the respective representation is displayed (750*e*) with a third visual characteristic (e.g., the portion of the battery level line chart is color-coded red).

The above-described manner of displaying different portions of the battery level chart based on device operating state and/or battery level allows the electronic device to efficiently display device operating state and/or battery level information in the battery level chart, which enhances the operability of the device and makes the user-device interface more efficient (e.g., by allowing the user to view more information with fewer inputs), which, additionally, reduces power usage and improves battery life of the device by enabling the user to use the device more quickly and efficiently.

In some embodiments, as shown in FIG. 6A, in response to receiving the request to view the one or more representations of the usage, electronic device 500 displays (752), on the display, a representation of a device downtime portion of the first period of time. For example, the battery usage chart over the 24-hour time period includes an indication (e.g., a shaded portion of the chart, or a portion that is visually distinguished from the non-downtime portions) during that 24-hour time period of when the device was in a downtime operating mode (e.g., a period of time designated as the user's bedtime or a period of time designated as a period of time when usage of electronic device 500 should be or is somewhat limited, such as limiting or not generating notifications in response to events occurring at the device that would otherwise cause electronic device 500 to generate notifications (e.g., receiving text messages, receiving emails, receiving phone calls, etc.)). In some embodiments, the device downtime (e.g., bedtime) is based on a bedtime clock or setting set by the user of electronic device 500, or is based on an automatically determined bedtime, by electronic device 500, based on when electronic device 500 detects that usage of electronic device 500 generally ceases for the night, when the usage of electronic device 500 generally begins in the morning (the time between which is optionally designated as "bedtime"), and/or what time alarms in the mornings are generally set for, etc. In some embodiments, the portions of the battery usage chart that correspond to the device bedtime also include an icon that represents the device bedtime, and the portions of the battery usage chart that do not correspond to the device bedtime do not include the icon that represents the device bedtime.

The above-described manner of displaying the portions of the battery usage chart corresponding to a device bedtime with a different visual characteristic than the portions of the battery usage chart corresponding to non-bedtime times allows the electronic device to efficiently display device operating state information in the battery usage chart, which enhances the operability of the device and makes the user-device interface more efficient (e.g., by allowing the user to view more information with fewer inputs), which, additionally, reduces power usage and improves battery life of the device by enabling the user to use the device more quickly and efficiently.

It should be understood that the particular order in which the operations in FIGS. 7A-7Q have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7Q are, optionally, implemented by components depicted in FIGS. 1A-1B. For example, receiving operation 702 and displaying operation 704*a* are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of battery usage information or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted battery usage information that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of battery usage information, the present technology can be configured to allow users to select to "opt in" or "opt out" of participation in the collection of personal information data during registration for services or anytime thereafter. In another example, users can select not to provide battery usage information for battery information presentation and/or recommendation/insight generation. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, battery usage information and/or recommendations/insights can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
tracking, by the electronic device, usage of power by the electronic device over time;
receiving, via the one or more input devices, a request to view one or more representations of the usage of power by the electronic device; and
in response to receiving the request to view the one or more representations of the usage, displaying, on the display, a first representation of the usage over a first period of time, including concurrently displaying, on the display:
a visual representation of display-on usage during a first subset of the first period of time, wherein the visual representation of the display-on usage during the first subset of the first period of time is displayed based on the tracked usage of power by the electronic device;
a visual representation of display-off usage during the first subset of the first period of time, wherein the visual representation of the display-off usage during the first subset of the first period of time is displayed based on the tracked usage of power by the electronic device;
a visual representation of display-on usage during a second subset of the first period of time different from the first subset of the first period, wherein the visual representation of the display-on usage during the second subset of the first period of time is displayed based on the tracked usage of power by the electronic device; and
a visual representation of display-off usage during the second subset of the first period of time, wherein the visual representation of the display-off usage during the second subset of the first period of time is displayed based on the tracked usage of power by the electronic device.

2. The method of claim 1, wherein the usage of power comprises usage of a power source of the electronic device, the method further comprising:
tracking the usage, by the electronic device, of the power source of the electronic device over time, wherein the tracked usage comprises:
display-on usage, by the electronic device, of the power source that occurs while the electronic device displays content on the display, and display-off usage, by the electronic device, of the power source that occurs while the electronic device does not display content on the display.

3. The method of claim 1, wherein:
the first representation of the usage of power by the electronic device is a bar chart comprising a plurality of bars,
   a first bar of the plurality of bars corresponds to the first subset of the first period of time,
   a second bar of the plurality of bars corresponds to the second subset of the first period of time,
   the visual representation of display-on usage during the first subset of the first period of time is a first portion of the first bar,
   the visual representation of display-off usage during the first subset of the first period of time is a second portion of the first bar,
   the visual representation of display-on usage during the second subset of the first period of time is a first portion of the second bar, and
   the visual representation of display-off usage during the second subset of the first period of time is a second portion of the second bar.

4. The method of claim 1, further comprising:
in response to receiving the request to view the one or more representations of the usage, displaying, on the display, a second representation of a level of a power source of the electronic device over the first period of time.

5. The method of claim 4, wherein:
the second representation of the level of the power source of the electronic device over the first period of time includes a respective representation of the level of the power source at a respective time in the first period of time,
in accordance with a determination that an operating state of the electronic device at the respective time was a first state, the respective representation is displayed with a first visual characteristic, and
in accordance with a determination that the operating state of the electronic device at the respective time was a second state:
   in accordance with a determination that the level of the power source at the respective time was above a level threshold, the respective representation is displayed with a second visual characteristic, and
   in accordance with a determination that the level of the power source at the respective time was below the level threshold, the respective representation is displayed with a third visual characteristic.

6. The method of claim 1, further comprising:
while displaying the first representation of the usage over the first period of time including the visual representations of the display-on usage and the visual representations of the display-off usage, receiving, via the one or more input devices, a request to display display-on usage without displaying display-off usage; and
in response to receiving the request to display the display-on usage without displaying the display-off usage, updating the first representation of the usage by:
   ceasing display of:
      the visual representation of the display-off usage during the first subset of the first period of time, and
      the visual representation of the display-off usage during the second subset of the first period of time,
   while maintaining display of:
      the visual representation of the display-on usage during the first subset of the first period of time, and
      the visual representation of the display-on usage during the second subset of the first period of time.

7. The method of claim 1, further comprising:
while displaying the first representation of the usage over the first period of time including the visual representations of the display-on usage and the visual representations of the display-off usage, receiving, via the one or more input devices, a request to display display-off usage without displaying display-on usage; and
in response to receiving the request to display display-off usage without displaying display-on usage, updating the first representation of the usage by:
   ceasing display of:
      the visual representation of the display-on usage during the first subset of the first period of time, and
      the visual representation of the display-on usage during the second subset of the first period of time,
   while maintaining display of:
      the visual representation of the display-off usage during the first subset of the first period of time, and
      the visual representation of the display-off usage during the second subset of the first period of time.

8. The method of claim 1, further comprising:
in response to receiving the request to view the one or more representations of the usage, displaying, on the display, a plurality of representations of usage of power of a plurality of applications on the electronic device during the first period of time, including concurrently displaying, on the display:
   a representation of usage of power of a first application during the first period of time; and
   a representation of usage of power of a second application during the first period of time.

9. The method of claim 8, further comprising:
while displaying the first representation of the usage of power by the electronic device over the first period of time including the representations of the usage over the first subset and the second subset of the first period of time and the plurality of representations of usage of power of the plurality of applications on the electronic device during the first period of time, receiving, via the one or more input devices, a request to display the usage of power over the first subset of the first period of time without displaying the usage of power over the second subset of the first period of time; and
in response to receiving the request to display the usage of power over the first subset of the first period of time without displaying the usage of power over the second subset of the first period of time:
   ceasing display of respective representations of the plurality of representations corresponding to the plurality of applications that used power during the second subset of the first period of time,
   while maintaining display of respective representations of the plurality of representations corresponding to the plurality of applications that used power during the first subset of the first period of time.

10. The method of claim 9, further comprising:
in response to receiving the request to view the usage of power during the first subset of the first period of time without displaying the usage of power during the second subset of the first period of time, increasing a visual emphasis of the representations of usage during the first subset of the first period of time relative to the representations of usage during the second subset of the first period of time.

11. The method of claim 9, further comprising:
in response to receiving the request to view the usage of power during the first subset of the first period of time without displaying the usage of power during the second subset of the first period of time, displaying, on the display:
   an aggregate display-on usage time corresponding to display-on usage during the first subset of the first period of time; and
   an aggregate display-off usage time corresponding to display-off usage during the first subset of the first period of time.

12. The method of claim 1, further comprising:
in response to receiving the request to view the one or more representations of the usage, displaying, on the display, one or more representations of usage of power for one or more applications on the electronic device during the first period of time, including concurrently displaying, on the display:
   a visual representation of display-on usage for a first application of the one or more applications; and
   a visual representation of display-off usage for the first application.

13. The method of claim 1, further comprising:
while displaying the first representation of the usage of power by the electronic device over the first period of time, receiving, via the one or more input devices, a request to view one or more representations of usage of power by the electronic device over a second period of time, different than the first period of time; and
in response to receiving the request to view the one or more representations of the usage of power by the electronic device over the second period of time, displaying, on the display, a second representation of the usage over the second period of time, including concurrently displaying, on the display:
   a visual representation of display-on usage during a first subset of the second period of time;
   a visual representation of display-off usage during the first subset of the second period of time;
   a visual representation of display-on usage during a second subset of the second period of time different from the first subset of the second period; and
   a visual representation of display-off usage during the second subset of the second period of time.

14. The method of claim 13, further comprising:
displaying, concurrently with the first representation of the usage over the first period of time:
   a visual representation of an aggregate display-on usage during the first period of time; and
   a visual representation of an aggregate display-off usage during the first period of time; and
displaying, concurrently with the second representation of the usage over the second period of time:
   a visual representation of an average display-on usage during the second period of time; and
   a visual representation of an average display-off usage during the second period of time.

15. The method of claim 13, further comprising:
displaying, concurrently with the first representation of the usage over the first period of time, a representation of a level of a power source of electronic device over the first period of time; and
displaying, concurrently with the second representation of the usage over the second period of time, a representation of an amount of consumption of the level of the power source over the second period of time.

16. The method of claim 1, further comprising:
in response to receiving the request to view the one or more representations of the usage:
   in accordance with a determination that the first period of time is a first respective period of time:
      displaying, on the display:
         a visual indication of a sum of the display-on usage during the first subset of the first period of time and the second subset of the first period of time; and
         a visual indication of a sum of the display-off usage during the first subset of the first period of time and the second subset of the first period of time;
   in accordance with a determination that the first period of time is a second respective time period:
      displaying, on the display:
         a visual indication of an average of the display-on usage during the first period of time; and
         a visual indication of an average of the display-off usage during the first period of time.

17. The method of claim 1, further comprising:
displaying, on the display, one or more representations of recommendations to reduce the usage of power by the electronic device;
while displaying the one or more representations of recommendations, receiving, via the one or more input devices, an input corresponding to a request to apply a respective recommendation of the one or more recommendations; and
in response to receiving the input corresponding to the request to apply the respective recommendation, applying the respective recommendation to the electronic device.

18. The method of claim 1, further comprising:
displaying, on the display, one or more representations of information indicating causes of the usage of power by the electronic device.

19. The method of claim 18, wherein the one or more representations include a representation of information indicating one or more temporary processes on the electronic device that used power during the first period of time.

20. The method of claim 18, wherein the one or more representations include a representation of information indicating an environmental condition of the electronic device that is affecting the usage of power of the electronic device.

21. The method of claim 18, wherein the one or more representations include a representation of information indicating a deviation in normal usage of the electronic device that is affecting the usage of power of the electronic device.

22. The method of claim 1, further comprising:
detecting that the electronic device has been removed from a charging source; and
in response to detecting that the electronic device has been removed from the charging source, displaying, on the display, an indication of a level of charge of a power source of the electronic device for a predetermined time period.

23. The method of claim 1, further comprising:
in response to receiving the request to view the one or more representations of the usage, displaying, on the display, a representation of when charging of a power source of the electronic device was last stopped, and a representation of a charge level of the power source when charging of the power source of the electronic device was last stopped.

24. The method of claim 1, further comprising:
in response to receiving the request to view the one or more representations of the usage, displaying, on the display, a representation of a device downtime portion of the first period of time.

25. An electronic device, comprising:
one or more processors;
memory; and
one or more programs, wherein the one or more programs are stored in the memory and configured to be executed by the one or more processors, the one or more programs including instructions for:
tracking, by the electronic device, usage of power by the electronic device over time;
receiving, via one or more input devices, a request to view one or more representations of the usage of power by the electronic device; and
in response to receiving the request to view the one or more representations of the usage, displaying, on a display, a first representation of the usage over a first period of time, including concurrently displaying, on the display:
a visual representation of display-on usage during a first subset of the first period of time, wherein the visual representation of the display-on usage during the first subset of the first period of time is displayed based on the tracked usage of power by the electronic device;
a visual representation of display-off usage during the first subset of the first period of time, wherein the visual representation of the display-off usage during the first subset of the first period of time is displayed based on the tracked usage of power by the electronic device;
a visual representation of display-on usage during a second subset of the first period of time different from the first subset of the first period, wherein the visual representation of the display-on usage during the second subset of the first period of time is displayed based on the tracked usage of power by the electronic device; and
a visual representation of display-off usage during the second subset of the first period of time, wherein the visual representation of the display-off usage during the second subset of the first period of time is displayed based on the tracked usage of power by the electronic device.

26. The electronic device of claim 25, wherein the usage of power comprises usage of a power source of the electronic device, the instructions further for:
tracking the usage, by the electronic device, of the power source of the electronic device over time, wherein the tracked usage comprises:
display-on usage, by the electronic device, of the power source that occurs while the electronic device displays content on the display, and
display-off usage, by the electronic device, of the power source that occurs while the electronic device does not display content on the display.

27. The electronic device of claim 25, wherein:
the first representation of the usage of power by the electronic device is a bar chart comprising a plurality of bars,
a first bar of the plurality of bars corresponds to the first subset of the first period of time,
a second bar of the plurality of bars corresponds to the second subset of the first period of time,
the visual representation of display-on usage during the first subset of the first period of time is a first portion of the first bar,
the visual representation of display-off usage during the first subset of the first period of time is a second portion of the first bar,
the visual representation of display-on usage during the second subset of the first period of time is a first portion of the second bar, and
the visual representation of display-off usage during the second subset of the first period of time is a second portion of the second bar.

28. The electronic device of claim 25, the instructions further for:
in response to receiving the request to view the one or more representations of the usage, displaying, on the display, a second representation of a level of a power source of the electronic device over the first period of time.

29. The electronic device of claim 28, wherein:
the second representation of the level of the power source of the electronic device over the first period of time includes a respective representation of the level of the power source at a respective time in the first period of time,
in accordance with a determination that an operating state of the electronic device at the respective time was a first state, the respective representation is displayed with a first visual characteristic, and
in accordance with a determination that the operating state of the electronic device at the respective time was a second state:
in accordance with a determination that the level of the power source at the respective time was above a level threshold, the respective representation is displayed with a second visual characteristic, and
in accordance with a determination that the level of the power source at the respective time was below the level threshold, the respective representation is displayed with a third visual characteristic.

30. The electronic device of claim 25, the instructions further for:
while displaying the first representation of the usage over the first period of time including the visual representations of the display-on usage and the visual representations of the display-off usage, receiving, via the one or more input devices, a request to display display-on usage without displaying display-off usage; and
in response to receiving the request to display the display-on usage without displaying the display-off usage, updating the first representation of the usage by:
ceasing display of:
the visual representation of the display-off usage during the first subset of the first period of time, and
the visual representation of the display-off usage during the second subset of the first period of time, while maintaining display of:
the visual representation of the display-on usage during the first subset of the first period of time, and
the visual representation of the display-on usage during the second subset of the first period of time.

31. The electronic device of claim 25, the instructions further for:
while displaying the first representation of the usage over the first period of time including the visual representations of the display-on usage and the visual representations of the display-off usage, receiving, via the one or more input devices, a request to display display-off usage without displaying display-on usage; and
in response to receiving the request to display display-off usage without displaying display-on usage, updating the first representation of the usage by:
ceasing display of:
the visual representation of the display-on usage during the first subset of the first period of time, and
the visual representation of the display-on usage during the second subset of the first period of time;
while maintaining display of:
the visual representation of the display-off usage during the first subset of the first period of time, and
the visual representation of the display-off usage during the second subset of the first period of time.

32. The electronic device of claim 25, the instructions further for:
in response to receiving the request to view the one or more representations of the usage, displaying, on the display, a plurality of representations of usage of power of a plurality of applications on the electronic device during the first period of time, including concurrently displaying, on the display:
a representation of usage of power of a first application during the first period of time; and
a representation of usage of power of a second application during the first period of time.

33. The electronic device of claim 32, the instructions further for:
while displaying the first representation of the usage of power by the electronic device over the first period of time including the representations of the usage over the first subset and the second subset of the first period of time and the plurality of representations of usage of power of the plurality of applications on the electronic device during the first period of time, receiving, via the one or more input devices, a request to display the usage of power over the first subset of the first period of time without displaying the usage of power over the second subset of the first period of time; and
in response to receiving the request to display the usage of power over the first subset of the first period of time without displaying the usage of power over the second subset of the first period of time:
ceasing display of respective representations of the plurality of representations corresponding to the plurality of applications that used power during the second subset of the first period of time,
while maintaining display of respective representations of the plurality of representations corresponding to the plurality of applications that used power during the first subset of the first period of time.

34. The electronic device of claim 33, the instructions further for:
in response to receiving the request to view the usage of power during the first subset of the first period of time without displaying the usage of power during the second subset of the first period of time, increasing a visual emphasis of the representations of usage during the first subset of the first period of time relative to the representations of usage during the second subset of the first period of time.

35. The electronic device of claim 33, the instructions further for:
in response to receiving the request to view the usage of power during the first subset of the first period of time without displaying the usage of power during the second subset of the first period of time, displaying, on the display:
an aggregate display-on usage time corresponding to display-on usage during the first subset of the first period of time; and
an aggregate display-off usage time corresponding to display-off usage during the first subset of the first period of time.

36. The electronic device of claim 25, the instructions further for:
in response to receiving the request to view the one or more representations of the usage, displaying, on the display, one or more representations of usage of power for one or more applications on the electronic device during the first period of time, including concurrently displaying, on the display:
a visual representation of display-on usage for a first application of the one or more applications; and
a visual representation of display-off usage for the first application.

37. The electronic device of claim 25, the instructions further for:
while displaying the first representation of the usage of power by the electronic device over the first period of time, receiving, via the one or more input devices, a request to view one or more representations of usage of power by the electronic device over a second period of time, different than the first period of time; and
in response to receiving the request to view the one or more representations of the usage of power by the electronic device over the second period of time, displaying, on the display, a second representation of the usage over the second period of time, including concurrently displaying, on the display:
a visual representation of display-on usage during a first subset of the second period of time;
a visual representation of display-off usage during the first subset of the second period of time;
a visual representation of display-on usage during a second subset of the second period of time different from the first subset of the second period; and
a visual representation of display-off usage during the second subset of the second period of time.

38. The electronic device of claim 37, the instructions further for:
displaying, concurrently with the first representation of the usage over the first period of time:
a visual representation of an aggregate display-on usage during the first period of time; and
a visual representation of an aggregate display-off usage during the first period of time; and displaying, concurrently with the second representation of the usage over the second period of time:
   a visual representation of an average display-on usage during the second period of time; and
   a visual representation of an average display-off usage during the second period of time.

39. The electronic device of claim 37, the instructions further for:
  displaying, concurrently with the first representation of the usage over the first period of time, a representation of a level of a power source of electronic device over the first period of time; and
  displaying, concurrently with the second representation of the usage over the second period of time, a representation of an amount of consumption of the level of the power source over the second period of time.

40. The electronic device of claim 25, the instructions further for:
  in response to receiving the request to view the one or more representations of the usage:
   in accordance with a determination that the first period of time is a first respective period of time:
    displaying, on the display:
     a visual indication of a sum of the display-on usage during the first subset of the first period of time and the second subset of the first period of time; and
     a visual indication of a sum of the display-off usage during the first subset of the first period of time and the second subset of the first period of time;
   in accordance with a determination that the first period of time is a second respective time period:
    displaying, on the display:
     a visual indication of an average of the display-on usage during the first period of time; and
     a visual indication of an average of the display-off usage during the first period of time.

41. The electronic device of claim 25, the instructions further for:
  displaying, on the display, one or more representations of recommendations to reduce the usage of power by the electronic device;
  while displaying the one or more representations of recommendations, receiving, via the one or more input devices, an input corresponding to a request to apply a respective recommendation of the one or more recommendations; and
  in response to receiving the input corresponding to the request to apply the respective recommendation, applying the respective recommendation to the electronic device.

42. The electronic device of claim 25, the instructions further for:
  displaying, on the display, one or more representations of information indicating causes of the usage of power by the electronic device.

43. The electronic device of claim 42, wherein the one or more representations include a representation of information indicating one or more temporary processes on the electronic device that used power during the first period of time.

44. The electronic device of claim 42, wherein the one or more representations include a representation of information indicating an environmental condition of the electronic device that is affecting the usage of power of the electronic device.

45. The electronic device of claim 42, wherein the one or more representations include a representation of information indicating a deviation in normal usage of the electronic device that is affecting the usage of power of the electronic device.

46. The electronic device of claim 25, the instructions further for:
  detecting that the electronic device has been removed from a charging source; and
  in response to detecting that the electronic device has been removed from the charging source, displaying, on the display, an indication of a level of charge of a power source of the electronic device for a predetermined time period.

47. The electronic device of claim 25, the instructions further for:
  in response to receiving the request to view the one or more representations of the usage, displaying, on the display, a representation of when charging of a power source of the electronic device was last stopped, and a representation of a charge level of the power source when charging of the power source of the electronic device was last stopped.

48. The electronic device of claim 25, the instructions further for:
  in response to receiving the request to view the one or more representations of the usage, displaying, on the display, a representation of a device downtime portion of the first period of time.

49. A non-transitory computer readable storage medium storing one or more programs, the one or more programs comprising instructions, which when executed by one or more processors of an electronic device, cause the electronic device to:
  track, by the electronic device, usage of power by the electronic device over time;
  receive, via one or more input devices, a request to view one or more representations of the usage of power by the electronic device; and
  in response to receiving the request to view the one or more representations of the usage, display, on a display, a first representation of the usage over a first period of time, including concurrently displaying, on the display:
   a visual representation of display-on usage during a first subset of the first period of time, wherein the visual representation of the display-on usage during the first subset of the first period of time is displayed based on the tracked usage of power by the electronic device;
   a visual representation of display-off usage during the first subset of the first period of time, wherein the visual representation of the display-off usage during the first subset of the first period of time is displayed based on the tracked usage of power by the electronic device;
   a visual representation of display-on usage during a second subset of the first period of time different from the first subset of the first period, wherein the visual representation of the display-on usage during the second subset of the first period of time is displayed based on the tracked usage of power by the electronic device; and
   a visual representation of display-off usage during the second subset of the first period of time, wherein the visual representation of the display-off usage during the second subset of the first period of time is displayed based on the tracked usage of power by the electronic device.

50. The non-transitory computer readable storage medium of claim 49, wherein the usage of power comprises usage of a power source of the electronic device, wherein the instructions further cause the device to:
   track the usage, by the electronic device, of the power source of the electronic device over time, wherein the tracked usage comprises:
      display-on usage, by the electronic device, of the power source that occurs while the electronic device displays content on the display, and
      display-off usage, by the electronic device, of the power source that occurs while the electronic device does not display content on the display.

51. The non-transitory computer readable storage medium of claim 49, wherein:
   the first representation of the usage of power by the electronic device is a bar chart comprising a plurality of bars,
      a first bar of the plurality of bars corresponds to the first subset of the first period of time,
      a second bar of the plurality of bars corresponds to the second subset of the first period of time,
      the visual representation of display-on usage during the first subset of the first period of time is a first portion of the first bar,
      the visual representation of display-off usage during the first subset of the first period of time is a second portion of the first bar,
      the visual representation of display-on usage during the second subset of the first period of time is a first portion of the second bar, and
      the visual representation of display-off usage during the second subset of the first period of time is a second portion of the second bar.

52. The non-transitory computer readable storage medium of claim 49, wherein the instructions further cause the device to:
   in response to receiving the request to view the one or more representations of the usage, display, on the display, a second representation of a level of a power source of the electronic device over the first period of time.

53. The non-transitory computer readable storage medium of claim 52, wherein:
   the second representation of the level of the power source of the electronic device over the first period of time includes a respective representation of the level of the power source at a respective time in the first period of time,
   in accordance with a determination that an operating state of the electronic device at the respective time was a first state, the respective representation is displayed with a first visual characteristic, and
   in accordance with a determination that the operating state of the electronic device at the respective time was a second state:
      in accordance with a determination that the level of the power source at the respective time was above a level threshold, the respective representation is displayed with a second visual characteristic, and
      in accordance with a determination that the level of the power source at the respective time was below the level threshold, the respective representation is displayed with a third visual characteristic.

54. The non-transitory computer readable storage medium of claim 49, wherein the instructions further cause the device to:
   while displaying the first representation of the usage over the first period of time including the visual representations of the display-on usage and the visual representations of the display-off usage, receive, via the one or more input devices, a request to display display-on usage without displaying display-off usage; and
   in response to receiving the request to display the display-on usage without displaying the display-off usage, update the first representation of the usage by:
      ceasing display of:
         the visual representation of the display-off usage during the first subset of the first period of time, and
         the visual representation of the display-off usage during the second subset of the first period of time,
      while maintaining display of:
         the visual representation of the display-on usage during the first subset of the first period of time, and
         the visual representation of the display-on usage during the second subset of the first period of time.

55. The non-transitory computer readable storage medium of claim 49, wherein the instructions further cause the device to:
   while displaying the first representation of the usage over the first period of time including the visual representations of the display-on usage and the visual representations of the display-off usage, receive, via the one or more input devices, a request to display display-off usage without displaying display-on usage; and
   in response to receiving the request to display display-off usage without displaying display-on usage, update the first representation of the usage by:
      ceasing display of:
         the visual representation of the display-on usage during the first subset of the first period of time, and
         the visual representation of the display-on usage during the second subset of the first period of time,
      while maintaining display of:
         the visual representation of the display-off usage during the first subset of the first period of time, and
         the visual representation of the display-off usage during the second subset of the first period of time.

56. The non-transitory computer readable storage medium of claim 49, wherein the instructions further cause the device to:
   in response to receiving the request to view the one or more representations of the usage, display, on the display, a plurality of representations of usage of power of a plurality of applications on the electronic device during the first period of time, including concurrently displaying, on the display:
      a representation of usage of power of a first application during the first period of time; and
      a representation of usage of power of a second application during the first period of time.

57. The non-transitory computer readable storage medium of claim 56, wherein the instructions further cause the device to:
   while displaying the first representation of the usage of power by the electronic device over the first period of time including the representations of the usage over the first subset and the second subset of the first period of time and the plurality of representations of usage of power of the plurality of applications on the electronic device during the first period of time, receive, via the one or more input devices, a request to display the usage of power over the first subset of the first period of time without displaying the usage of power over the second subset of the first period of time; and in response to receiving the request to display the usage of power over the first subset of the first period of time without displaying the usage of power over the second subset of the first period of time:

cease display of respective representations of the plurality of representations corresponding to the plurality of applications that used power during the second subset of the first period of time, while maintaining display of respective representations of the plurality of representations corresponding to the plurality of applications that used power during the first subset of the first period of time.

58. The non-transitory computer readable storage medium of claim 57, wherein the instructions further cause the device to:

in response to receiving the request to view the usage of power during the first subset of the first period of time without displaying the usage of power during the second subset of the first period of time, increase a visual emphasis of the representations of usage during the first subset of the first period of time relative to the representations of usage during the second subset of the first period of time.

59. The non-transitory computer readable storage medium of claim 57, wherein the instructions further cause the device to:

in response to receiving the request to view the usage of power during the first subset of the first period of time without displaying the usage of power during the second subset of the first period of time, display, on the display:

an aggregate display-on usage time corresponding to display-on usage during the first subset of the first period of time; and an aggregate display-off usage time corresponding to display-off usage during the first subset of the first period of time.

60. The non-transitory computer readable storage medium of claim 49, wherein the instructions further cause the device to:

in response to receiving the request to view the one or more representations of the usage, display, on the display, one or more representations of usage of power for one or more applications on the electronic device during the first period of time, including concurrently displaying, on the display:

a visual representation of display-on usage for a first application of the one or more applications; and a visual representation of display-off usage for the first application.

61. The non-transitory computer readable storage medium of claim 49, wherein the instructions further cause the device to:

while displaying the first representation of the usage of power by the electronic device over the first period of time, receive, via the one or more input devices, a request to view one or more representations of usage of power by the electronic device over a second period of time, different than the first period of time; and in response to receiving the request to view the one or more representations of the usage of power by the electronic device over the second period of time, display, on the display, a second representation of the usage over the second period of time, including concurrently displaying, on the display:

a visual representation of display-on usage during a first subset of the second period of time;

a visual representation of display-off usage during the first subset of the second period of time;

a visual representation of display-on usage during a second subset of the second period of time different from the first subset of the second period; and a visual representation of display-off usage during the second subset of the second period of time.

62. The non-transitory computer readable storage medium of claim 61, wherein the instructions further cause the device to:

display, concurrently with the first representation of the usage over the first period of time:

a visual representation of an aggregate display-on usage during the first period of time; and a visual representation of an aggregate display-off usage during the first period of time; and displaying, concurrently with the second representation of the usage over the second period of time:

a visual representation of an average display-on usage during the second period of time; and a visual representation of an average display-off usage during the second period of time.

63. The non-transitory computer readable storage medium of claim 61, wherein the instructions further cause the device to:

display, concurrently with the first representation of the usage over the first period of time, a representation of a level of a power source of electronic device over the first period of time; and display, concurrently with the second representation of the usage over the second period of time, a representation of an amount of consumption of the level of the power source over the second period of time.

64. The non-transitory computer readable storage medium of claim 49, wherein the instructions further cause the device to:

in response to receiving the request to view the one or more representations of the usage:

in accordance with a determination that the first period of time is a first respective period of time:

display, on the display:

a visual indication of a sum of the display-on usage during the first subset of the first period of time and the second subset of the first period of time; and a visual indication of a sum of the display-off usage during the first subset of the first period of time and the second subset of the first period of time;

in accordance with a determination that the first period of time is a second respective time period:

display, on the display:

a visual indication of an average of the display-on usage during the first period of time; and a visual indication of an average of the display-off usage during the first period of time.

65. The non-transitory computer readable storage medium of claim 49, wherein the instructions further cause the device to:
- display, on the display, one or more representations of recommendations to reduce the usage of power by the electronic device;
- while displaying the one or more representations of recommendations, receive, via the one or more input devices, an input corresponding to a request to apply a respective recommendation of the one or more recommendations; and
- in response to receiving the input corresponding to the request to apply the respective recommendation, apply the respective recommendation to the electronic device.

66. The non-transitory computer readable storage medium of claim 49, wherein the instructions further cause the device to:
- display, on the display, one or more representations of information indicating causes of the usage of power by the electronic device.

67. The non-transitory computer readable storage medium of claim 66, wherein the one or more representations include a representation of information indicating one or more temporary processes on the electronic device that used power during the first period of time.

68. The non-transitory computer readable storage medium of claim 66, wherein the one or more representations include a representation of information indicating an environmental condition of the electronic device that is affecting the usage of power of the electronic device.

69. The non-transitory computer readable storage medium of claim 66, wherein the one or more representations include a representation of information indicating a deviation in normal usage of the electronic device that is affecting the usage of power of the electronic device.

70. The non-transitory computer readable storage medium of claim 49, wherein the instructions further cause the device to:
- detect that the electronic device has been removed from a charging source; and
- in response to detecting that the electronic device has been removed from the charging source, display, on the display, an indication of a level of charge of a power source of the electronic device for a predetermined time period.

71. The non-transitory computer readable storage medium of claim 49, wherein the instructions further cause the device to:
- in response to receiving the request to view the one or more representations of the usage, displaying, on the display, a representation of when charging of a power source of the electronic device was last stopped, and a representation of a charge level of the power source when charging of the power source of the electronic device was last stopped.

72. The non-transitory computer readable storage medium of claim 49, wherein the instructions further cause the device to:
- in response to receiving the request to view the one or more representations of the usage, display, on the display, a representation of a device downtime portion of the first period of time.

* * * * *